Jan. 2, 1951 W. A. ANDERSON 2,536,524
FRONT-FEED DEVICE
Filed June 27, 1946 19 Sheets-Sheet 1

INVENTOR
WALTER A. ANDERSON
BY
L. G. Julihn
ATTORNEY

Jan. 2, 1951 W. A. ANDERSON 2,536,524
FRONT-FEED DEVICE
Filed June 27, 1946 19 Sheets-Sheet 2
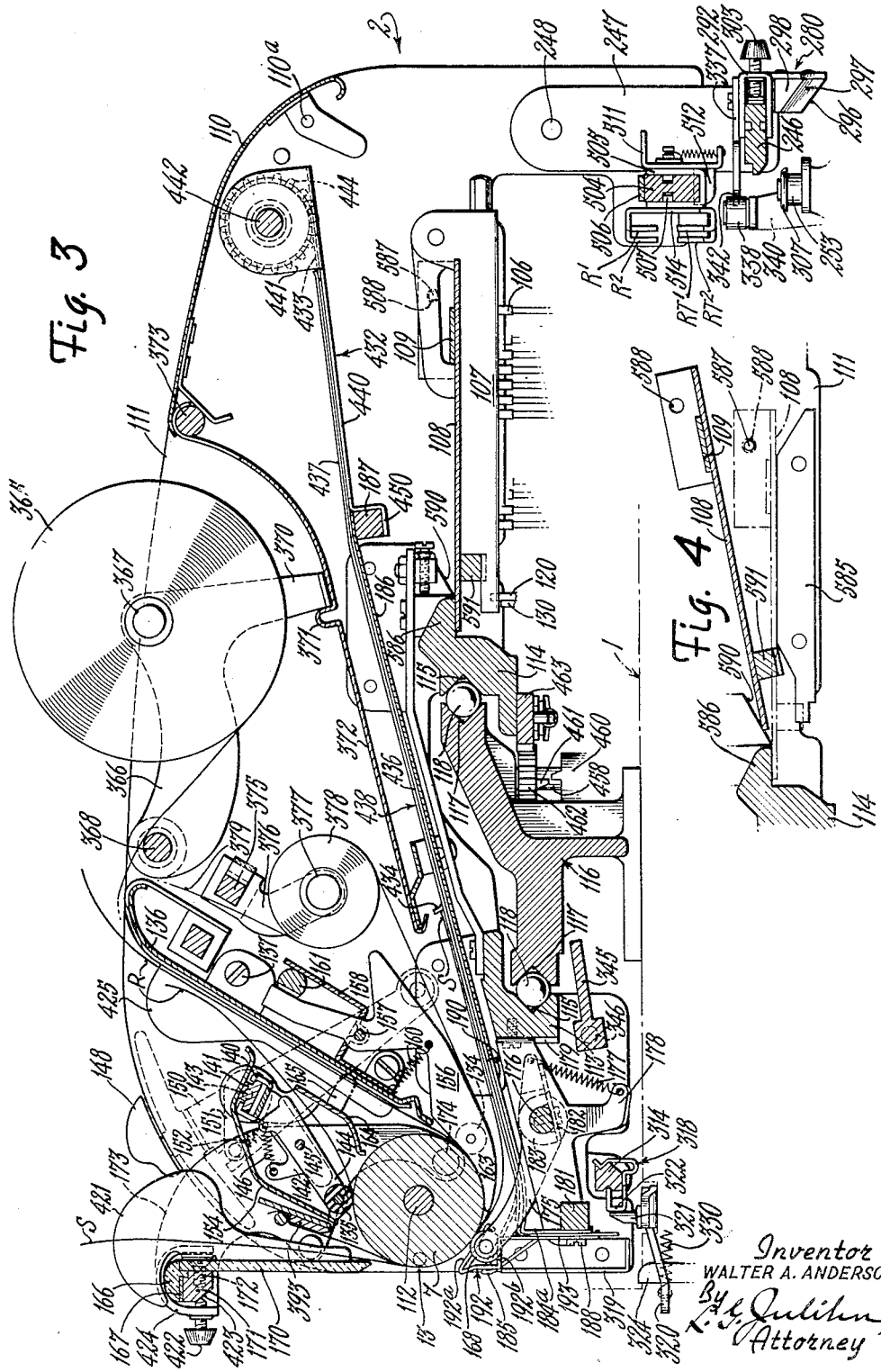
Inventor
WALTER A. ANDERSON
By
Attorney Jan. 2, 1951  W. A. ANDERSON  2,536,524
FRONT-FEED DEVICE
Filed June 27, 1946  19 Sheets-Sheet 3
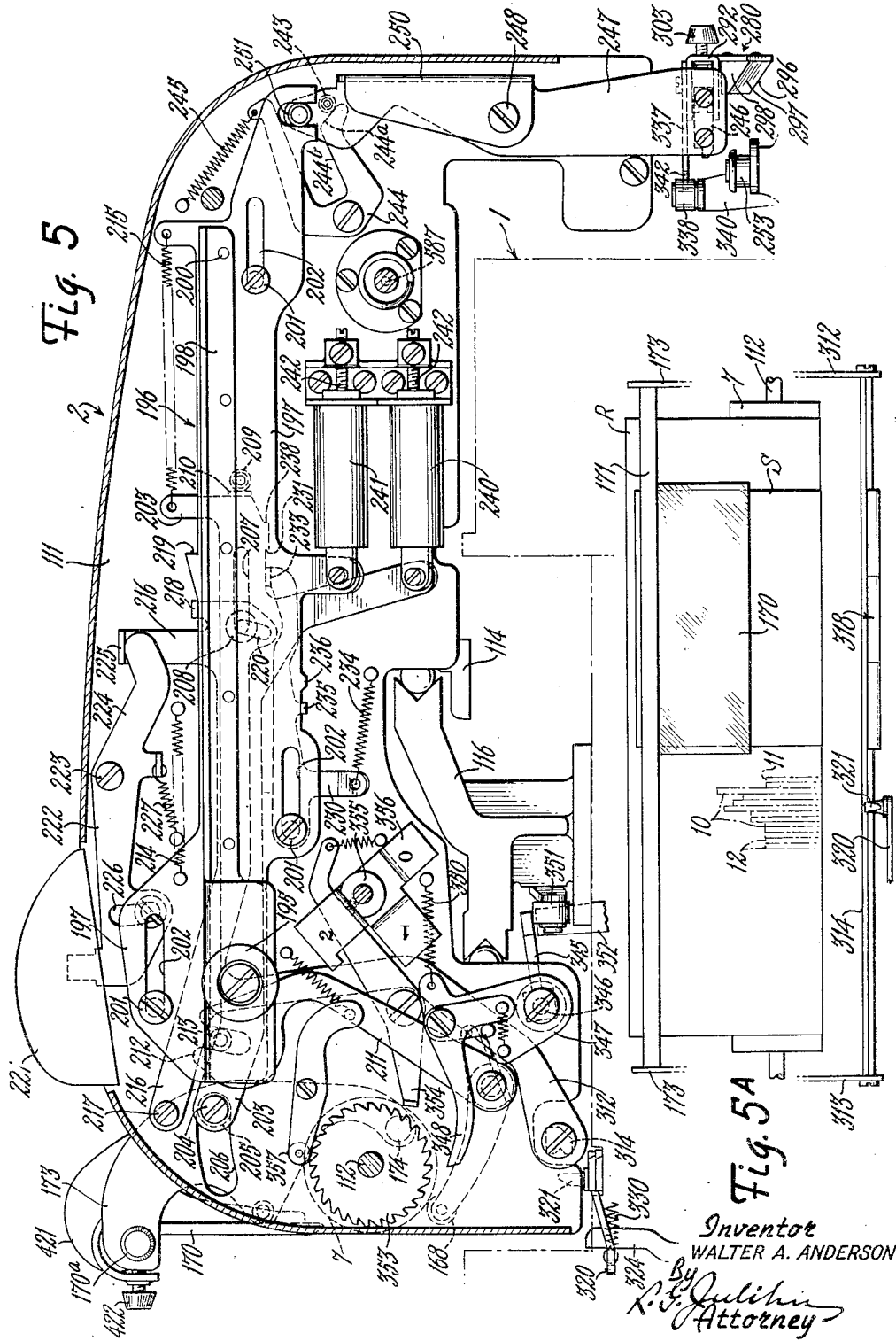
Inventor
WALTER A. ANDERSON
By L. G. Julihn
Attorney

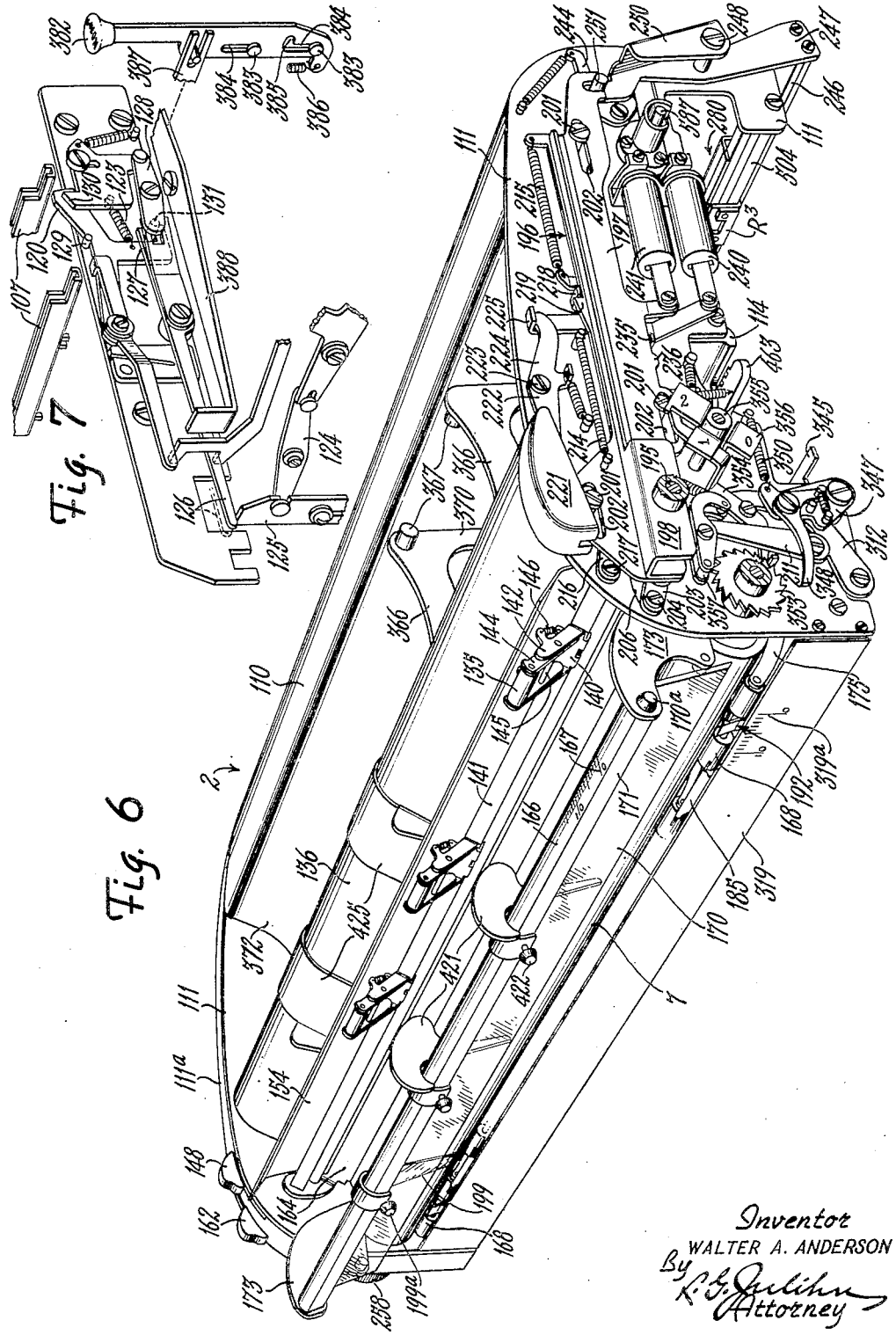

Jan. 2, 1951 W. A. ANDERSON 2,536,524
FRONT-FEED DEVICE
Filed June 27, 1946 19 Sheets-Sheet 5
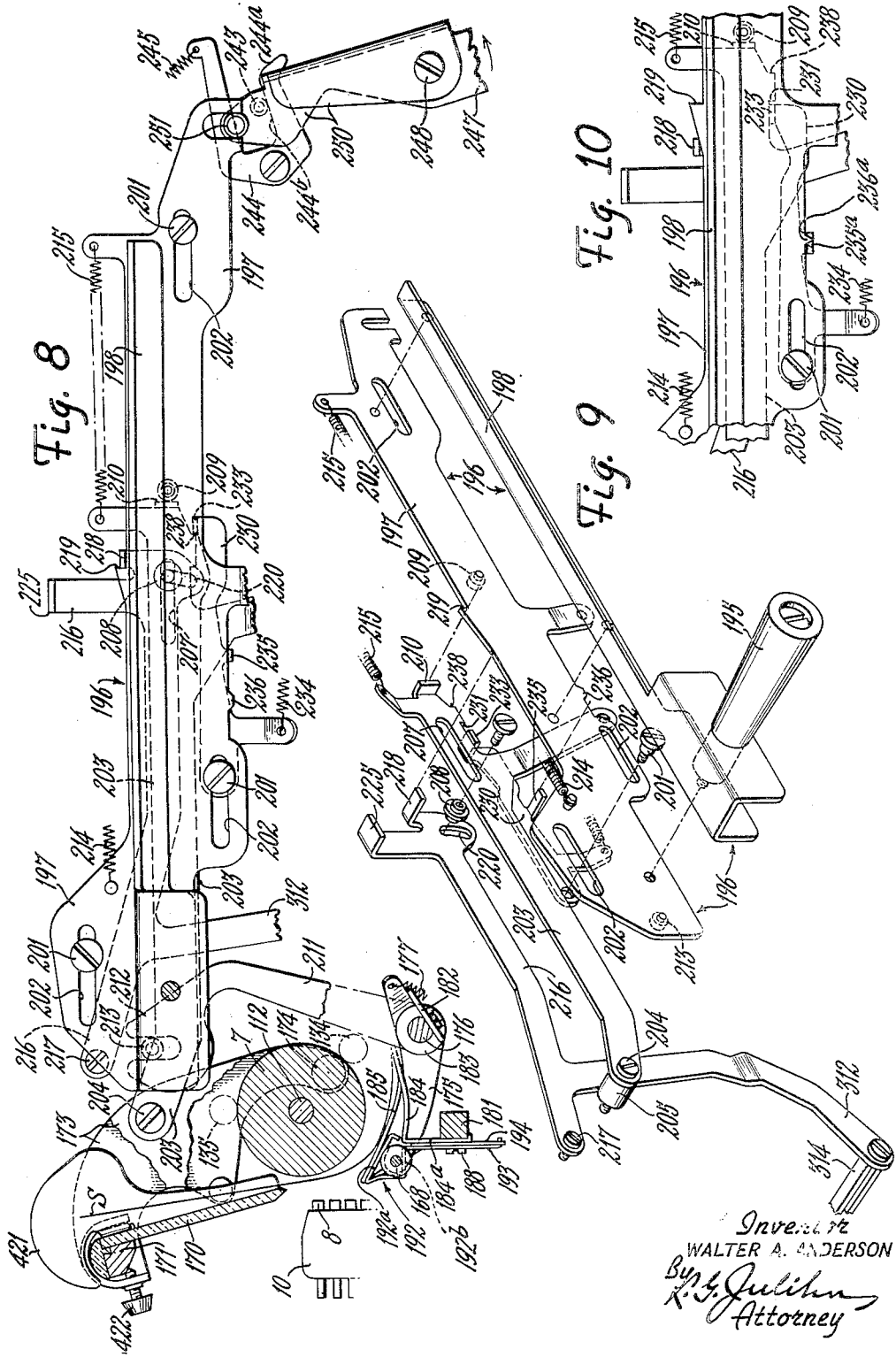
Inventor
WALTER A. ANDERSON
By R. G. Julihn
Attorney

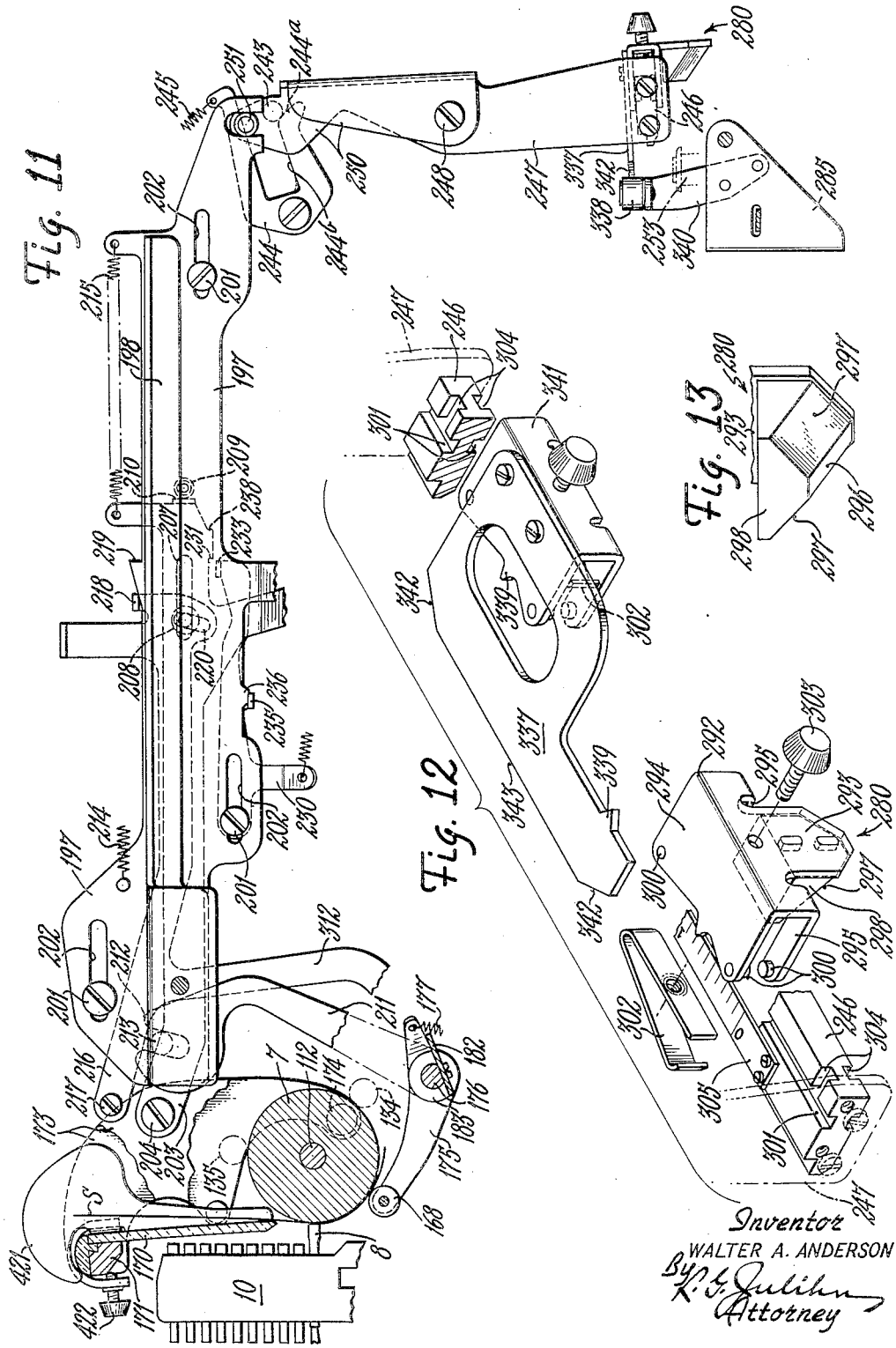

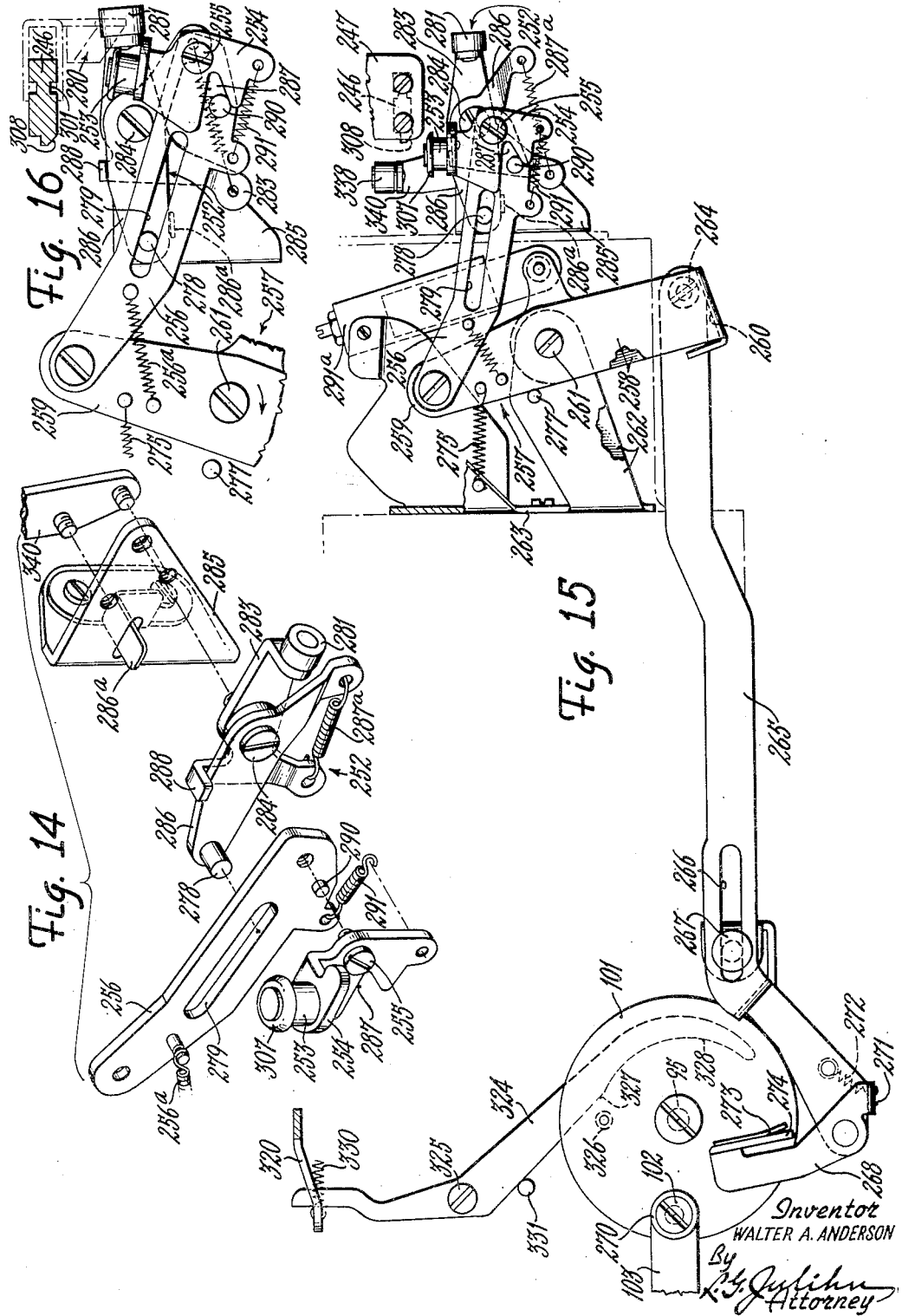

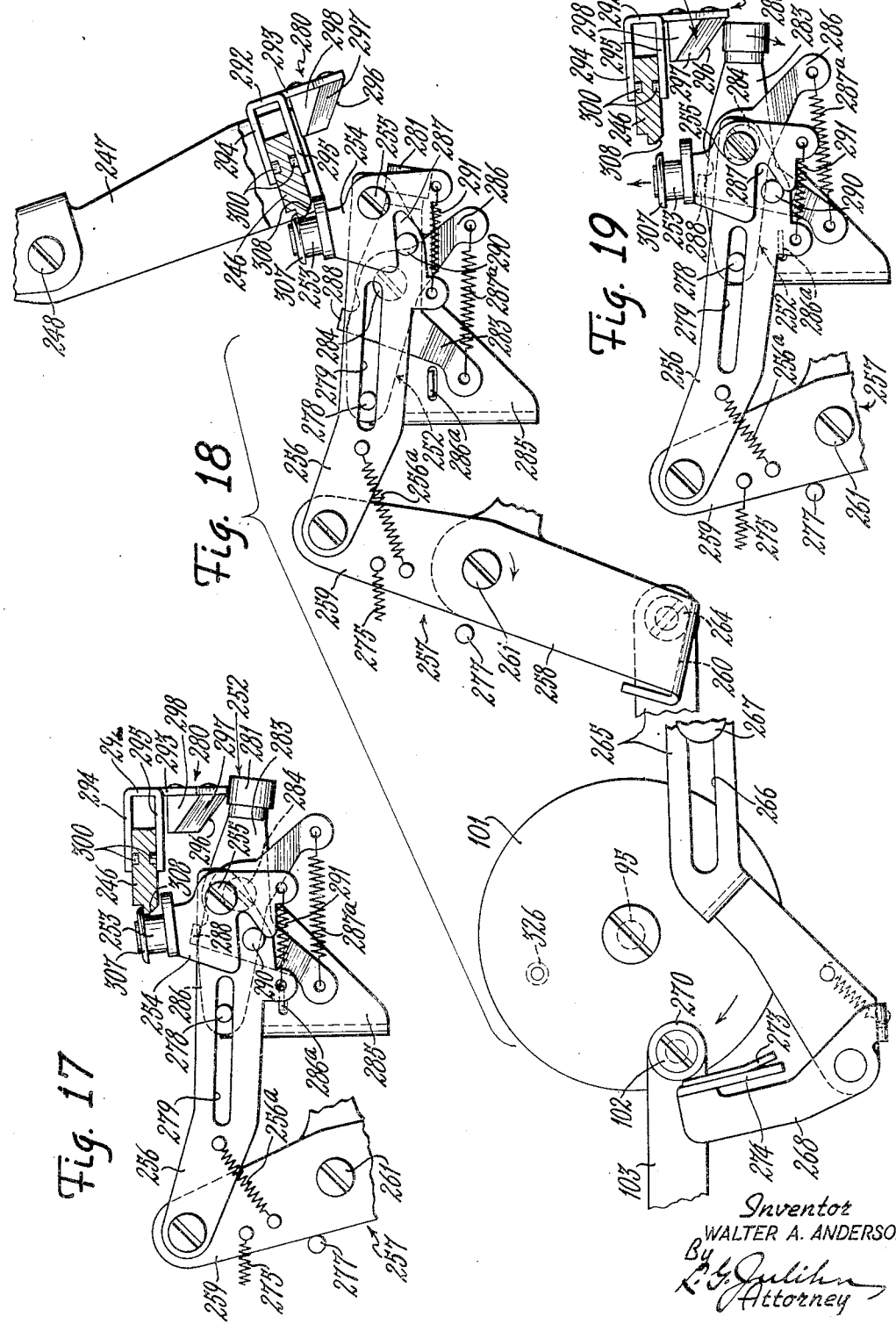

Jan. 2, 1951  W. A. ANDERSON  2,536,524
FRONT-FEED DEVICE
Filed June 27, 1946  19 Sheets-Sheet 9
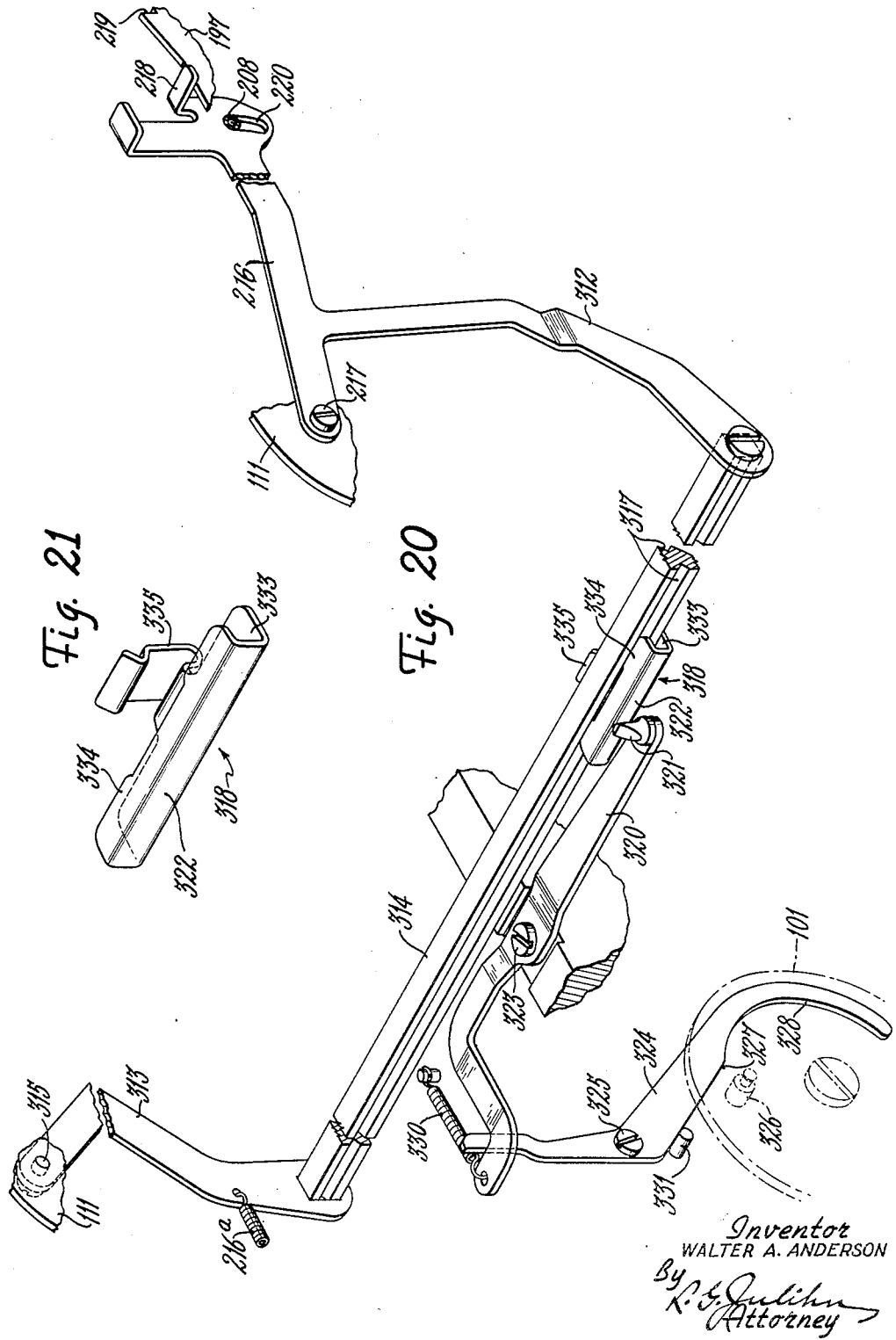
Inventor
WALTER A. ANDERSON
By R. G. Julihn
Attorney Jan. 2, 1951 W. A. ANDERSON 2,536,524
FRONT-FEED DEVICE
Filed June 27, 1946 19 Sheets-Sheet 10
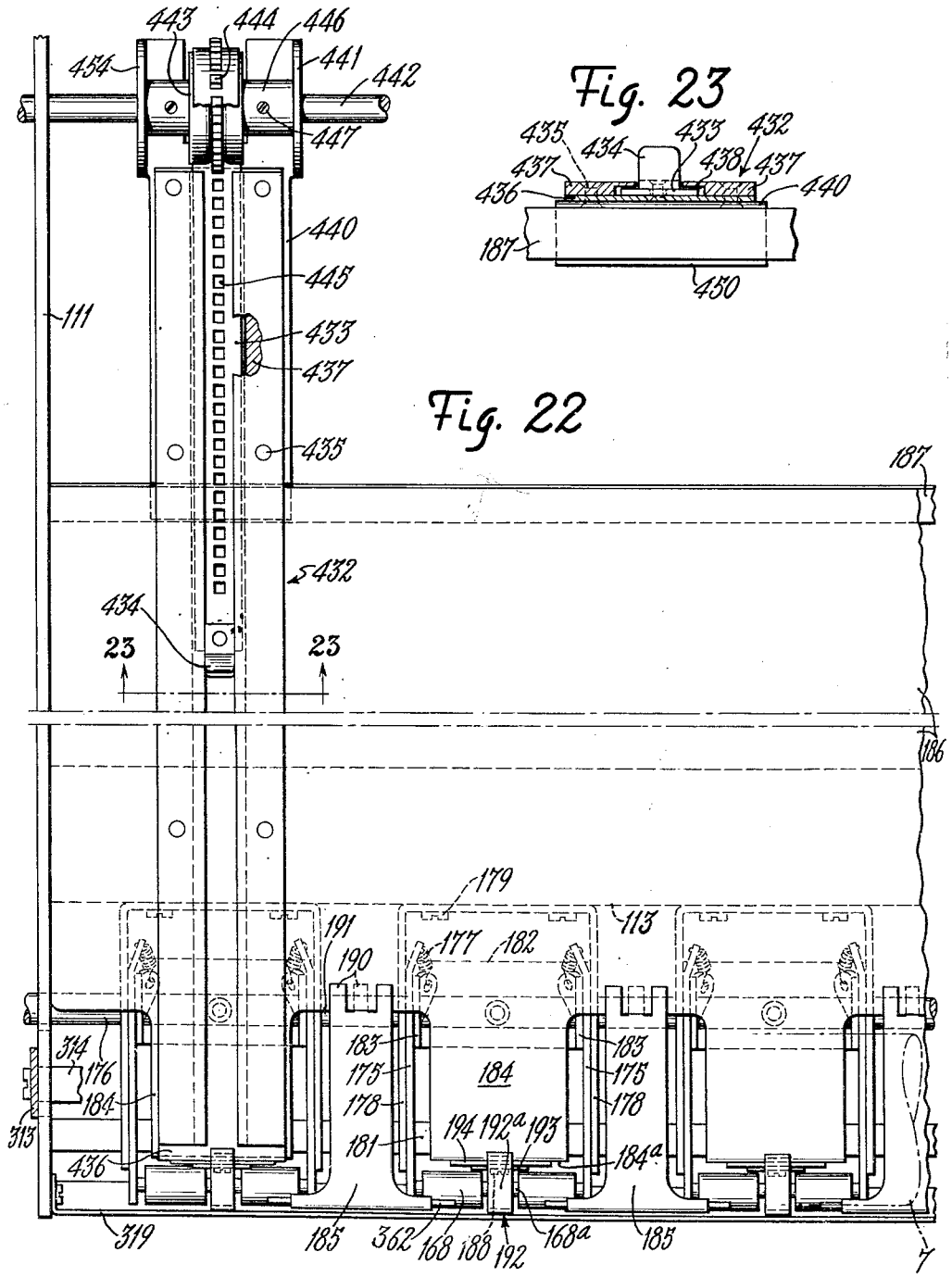
Inventor
WALTER A. ANDERSON
By L. G. Julihn
Attorney

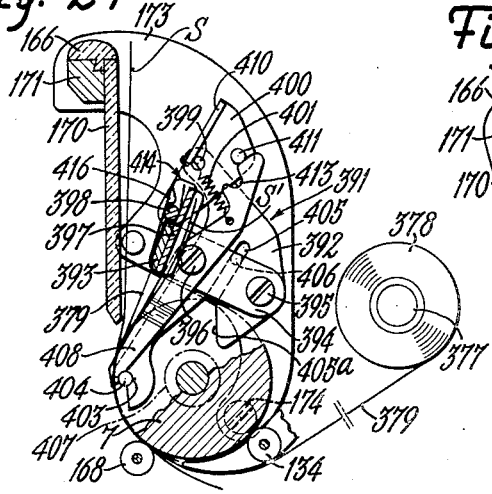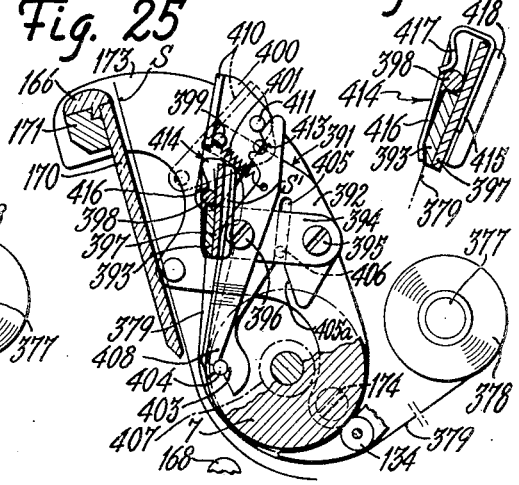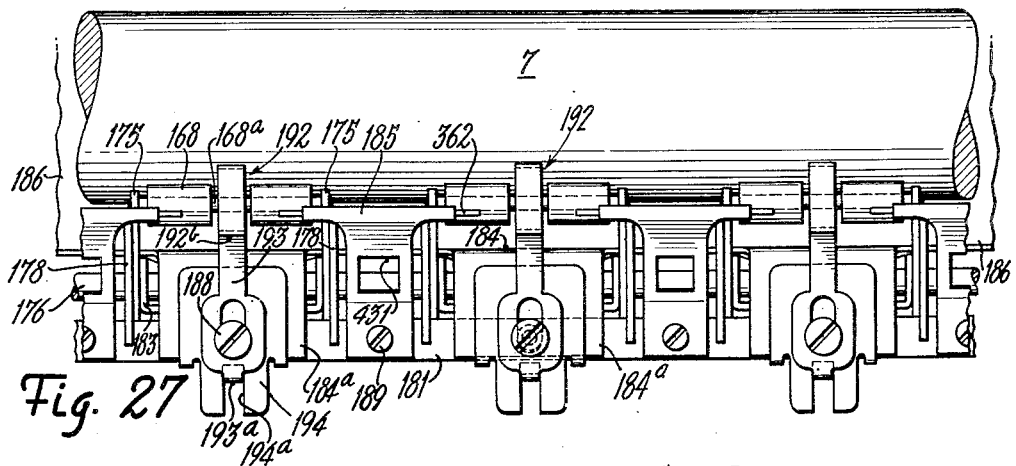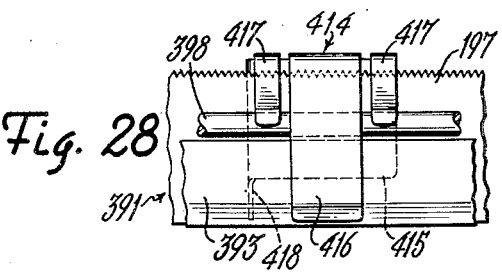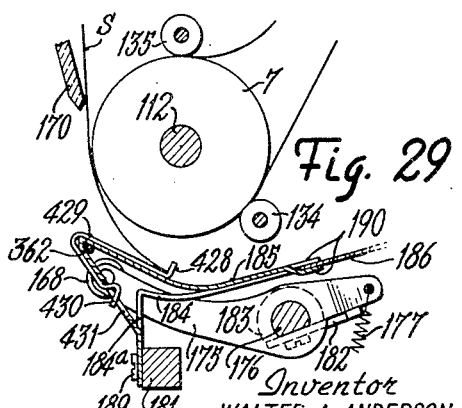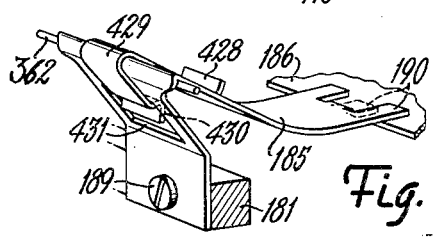

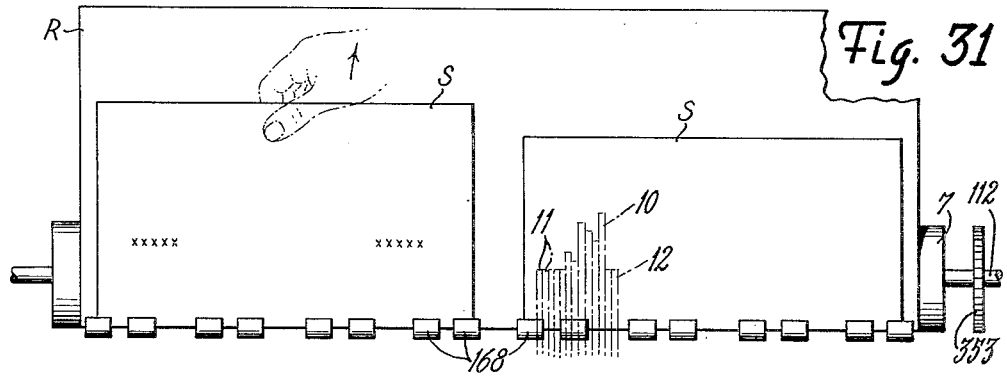
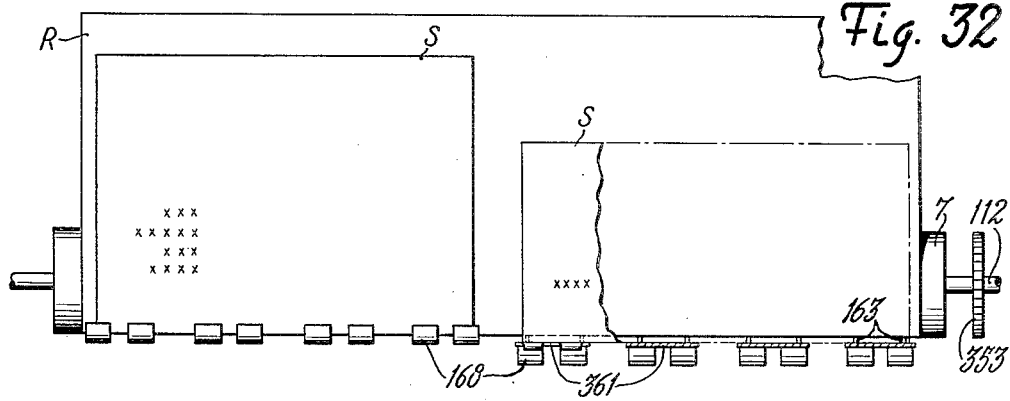
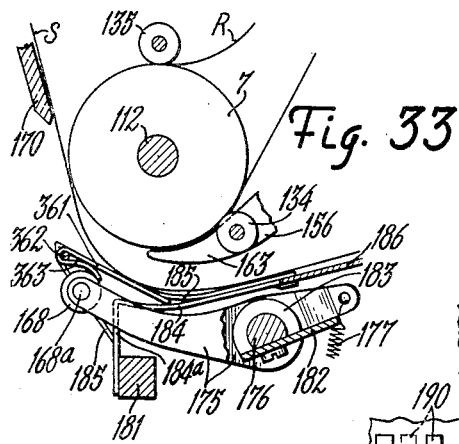
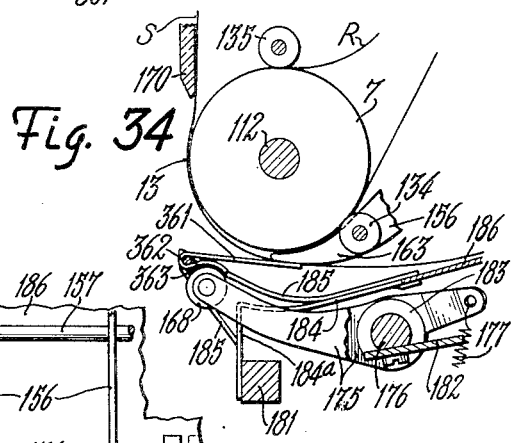
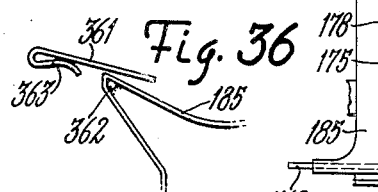
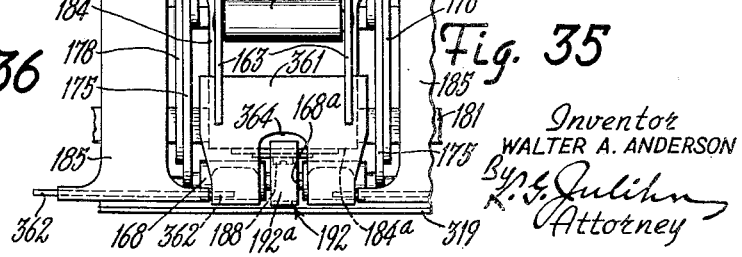

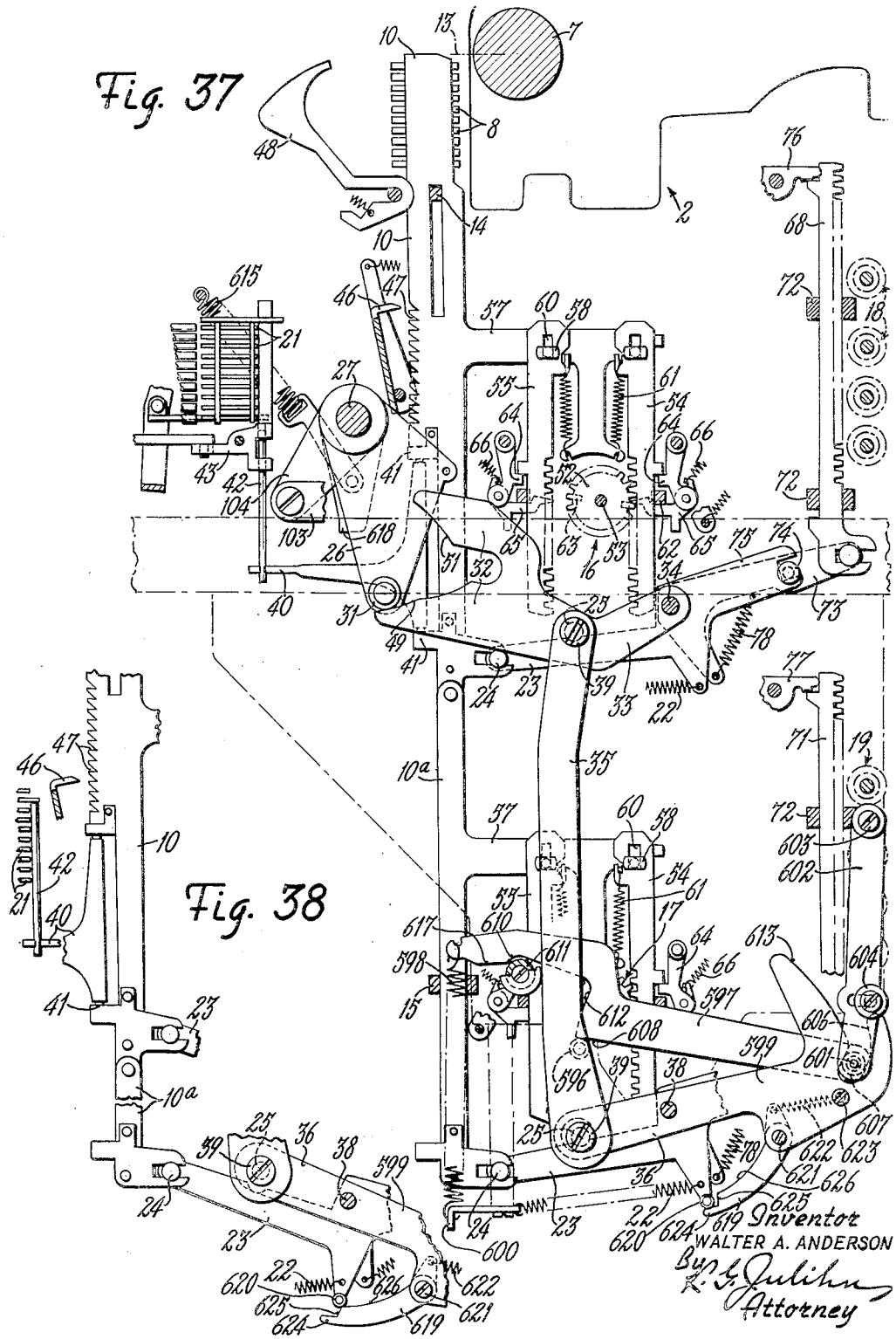

Jan. 2, 1951 W. A. ANDERSON 2,536,524
FRONT-FEED DEVICE
Filed June 27, 1946 19 Sheets-Sheet 14
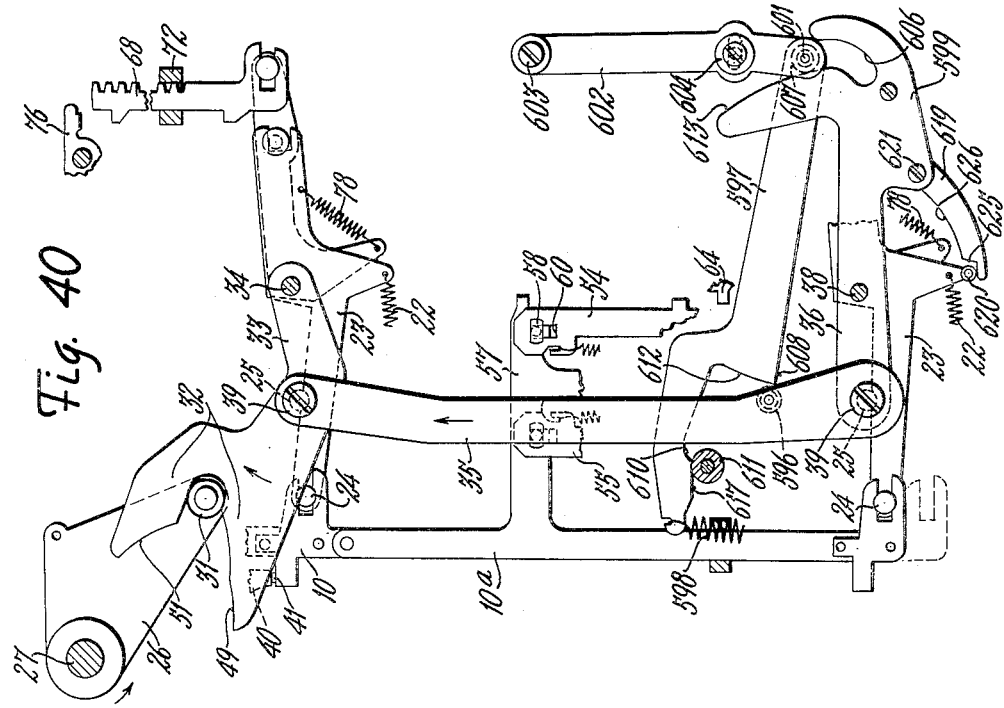
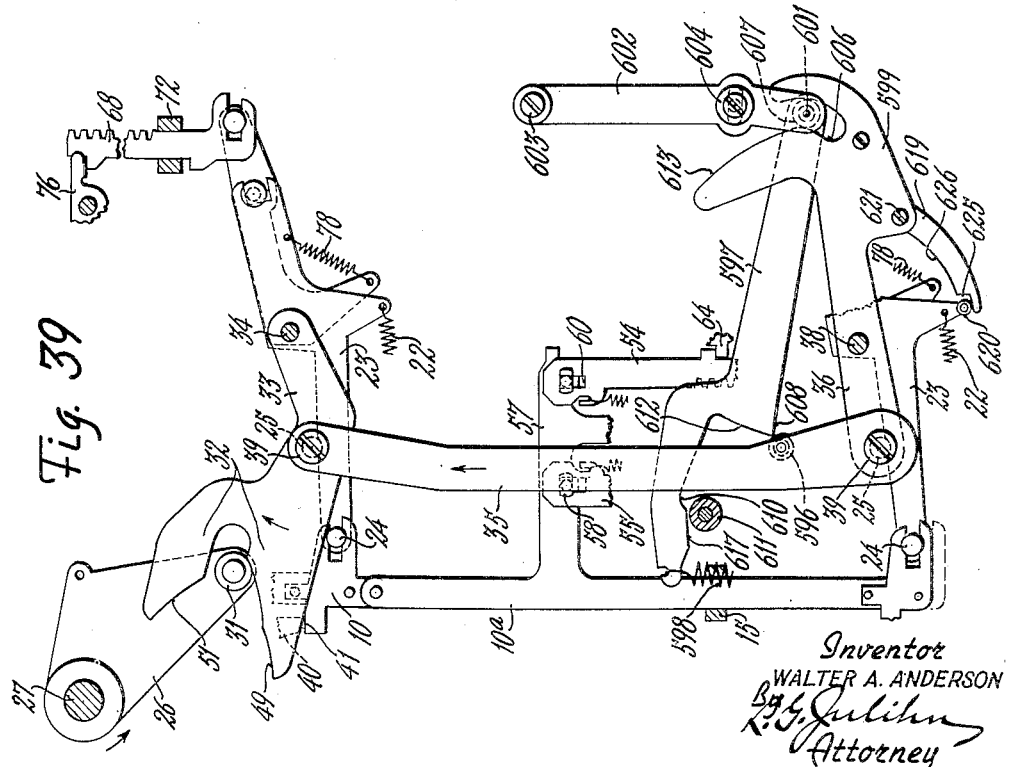
Inventor
WALTER A. ANDERSON
Attorney Jan. 2, 1951 — W. A. ANDERSON — 2,536,524
FRONT-FEED DEVICE
Filed June 27, 1946 — 19 Sheets-Sheet 15
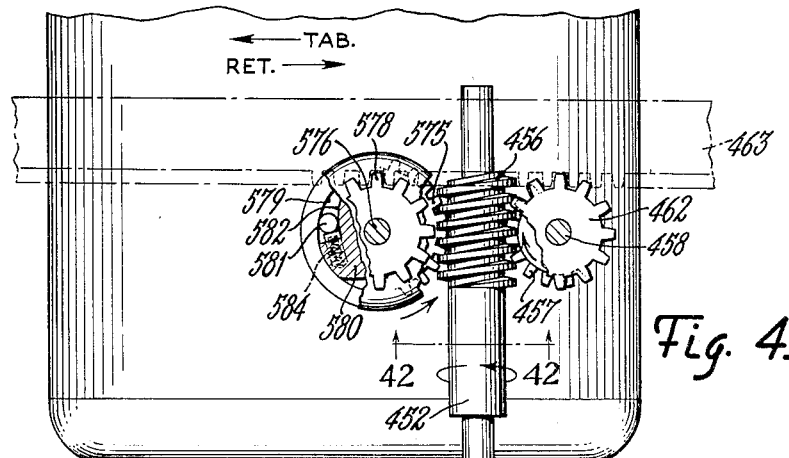
Fig. 41
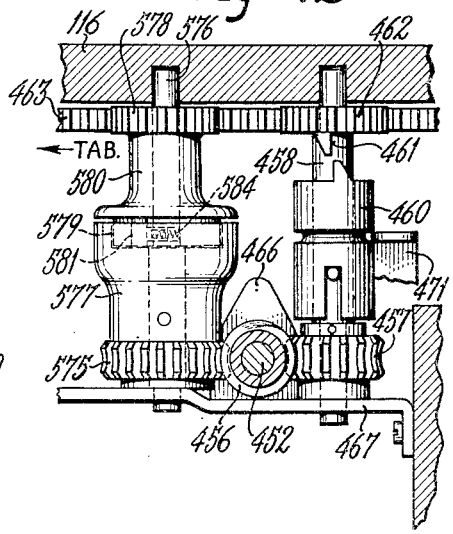
Fig. 42
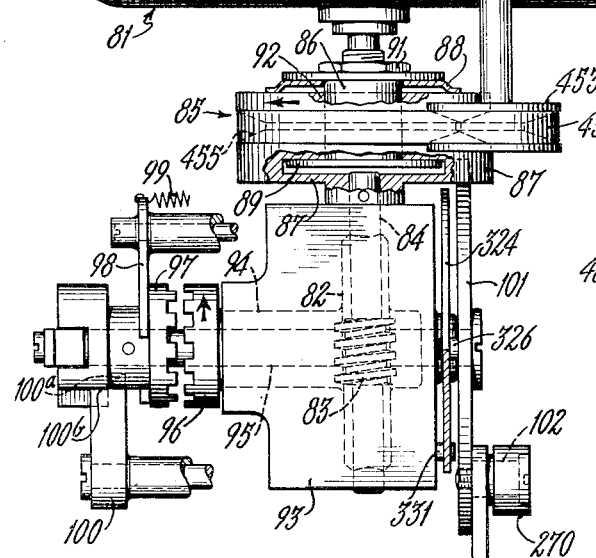
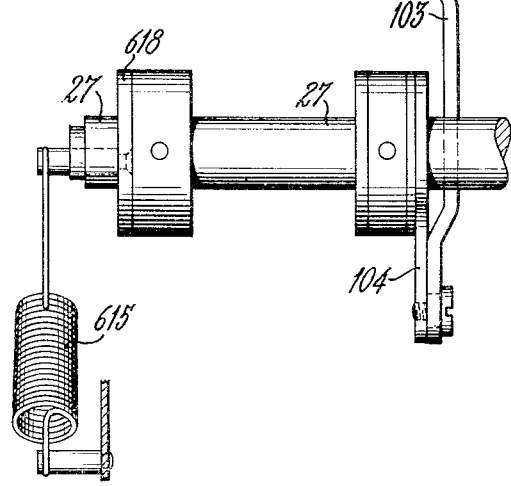
Inventor
WALTER A. ANDERSON
By *L. G. Julihn*
Attorney Jan. 2, 1951 W. A. ANDERSON 2,536,524
FRONT-FEED DEVICE
Filed June 27, 1946 19 Sheets-Sheet 16
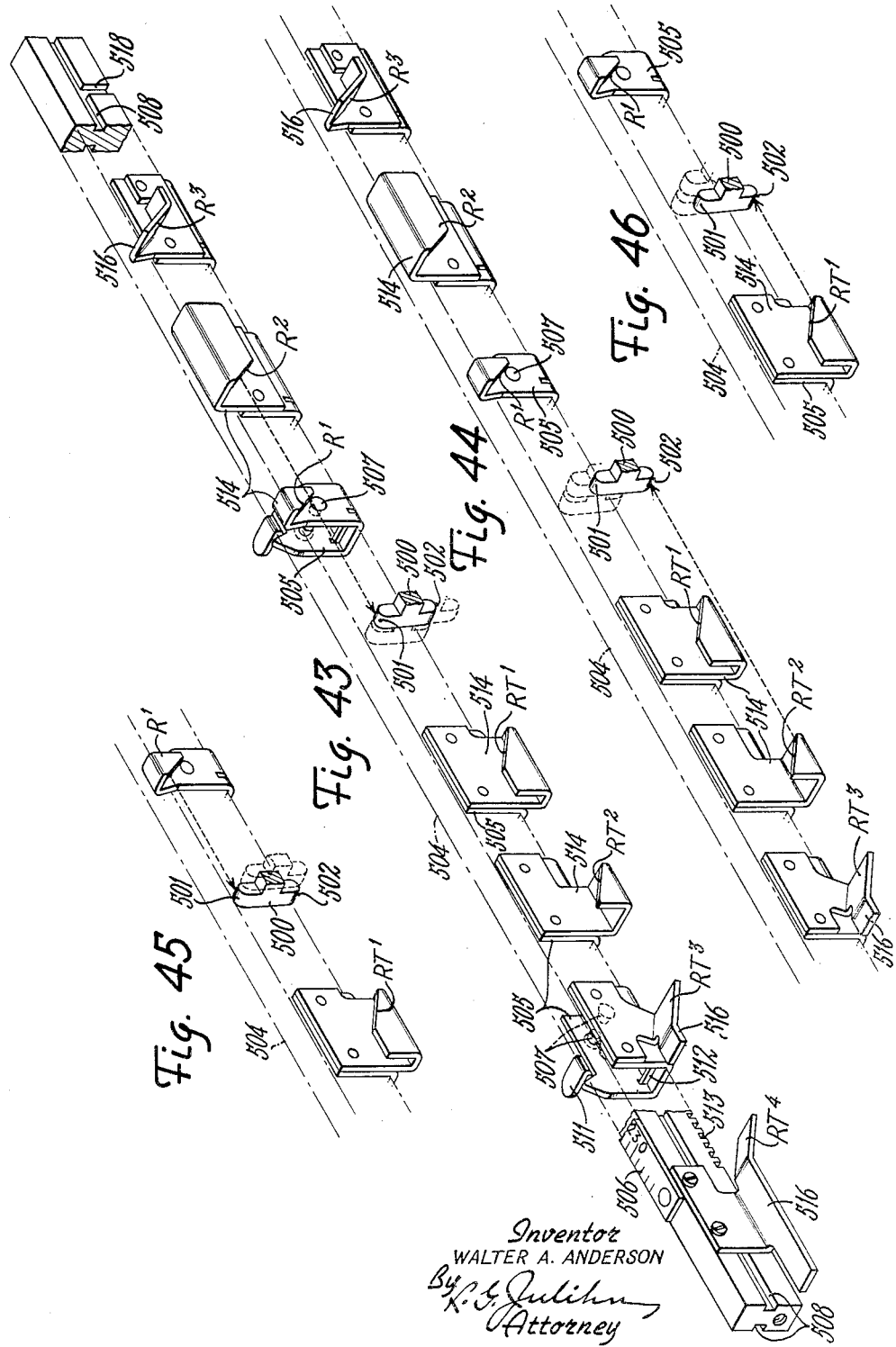
Inventor
WALTER A. ANDERSON
By K. G. Julihn
Attorney Jan. 2, 1951  W. A. ANDERSON  2,536,524
FRONT-FEED DEVICE
Filed June 27, 1946  19 Sheets-Sheet 17
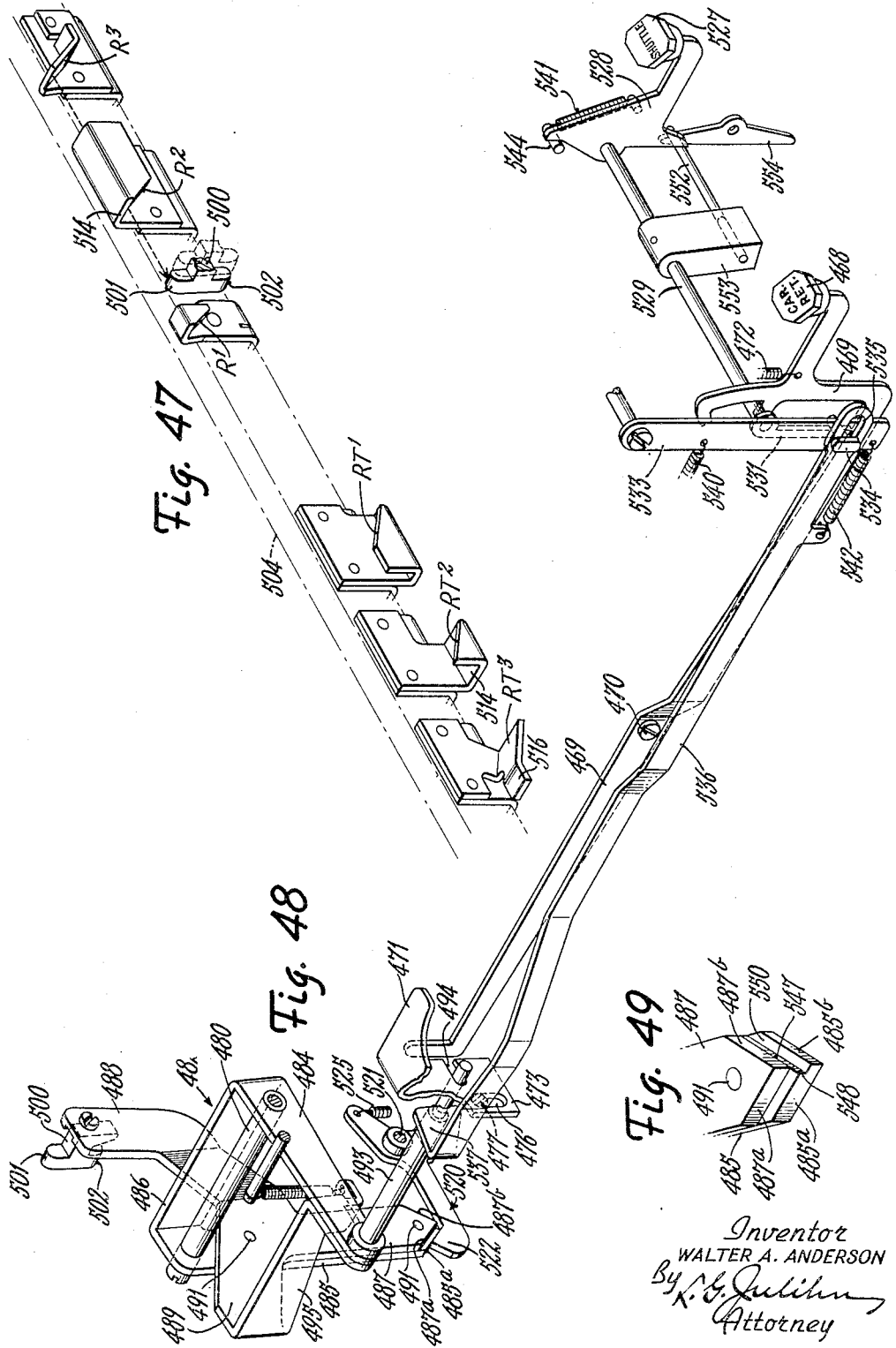
Inventor
WALTER A. ANDERSON
By [signature]
Attorney

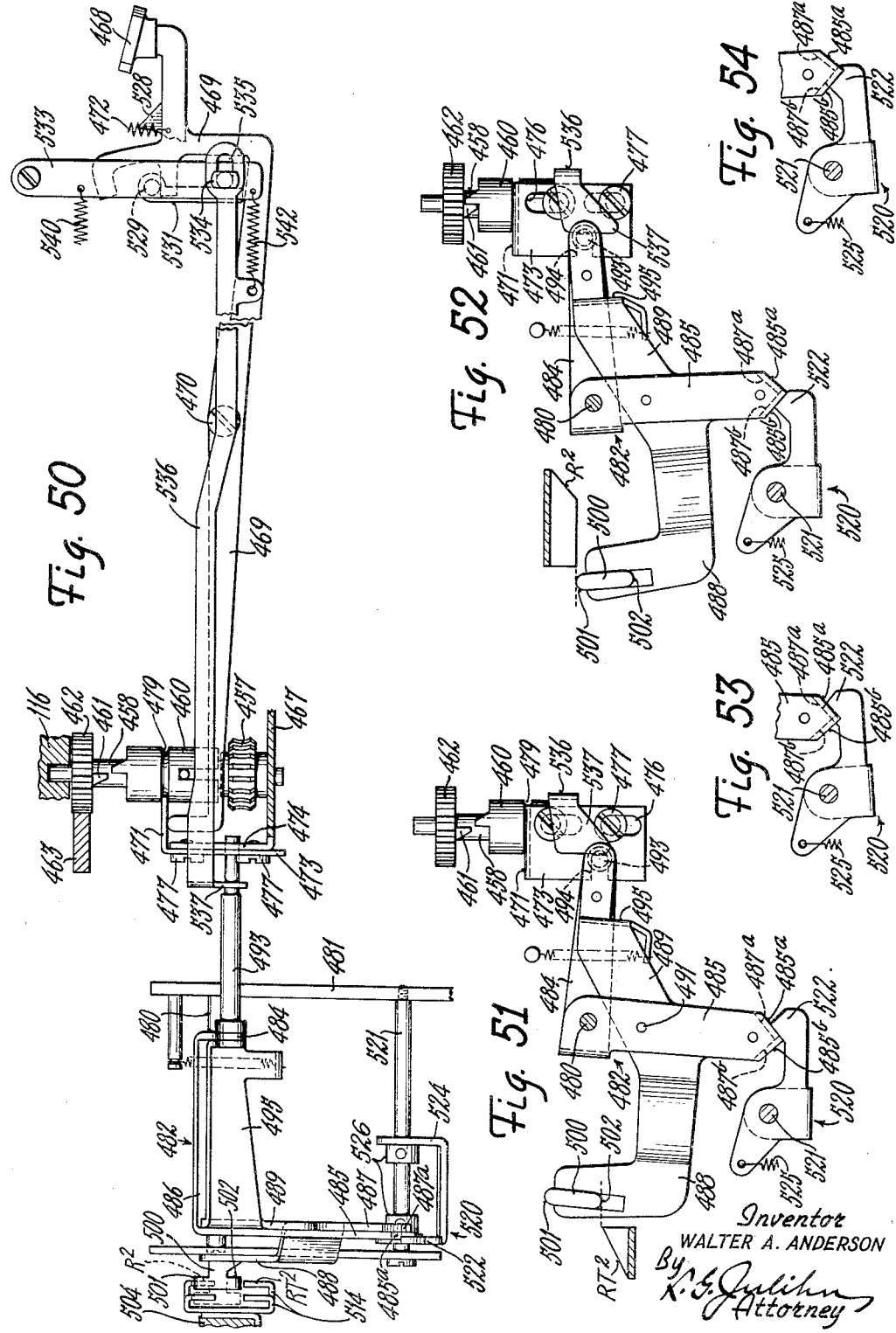

Jan. 2, 1951 W. A. ANDERSON 2,536,524
FRONT-FEED DEVICE
Filed June 27, 1946 19 Sheets-Sheet 19
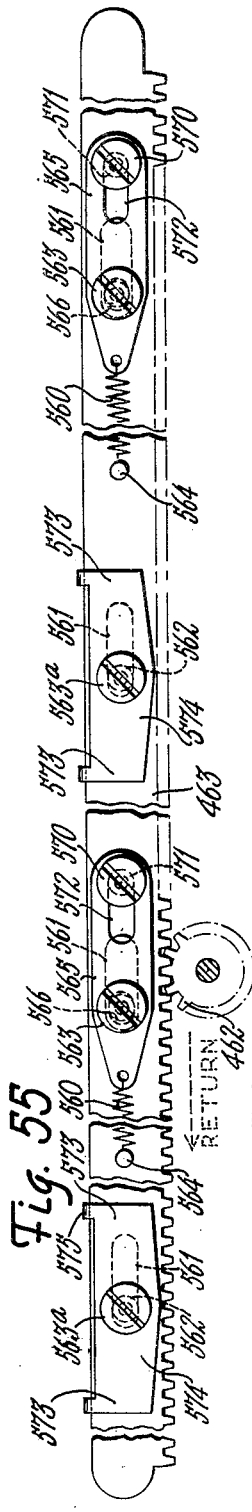
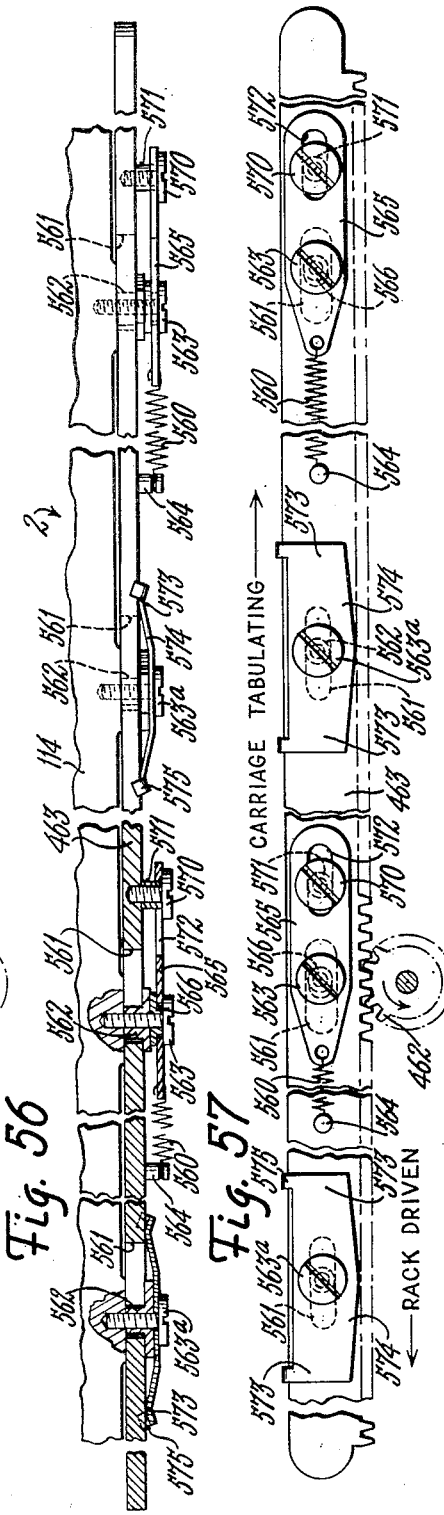
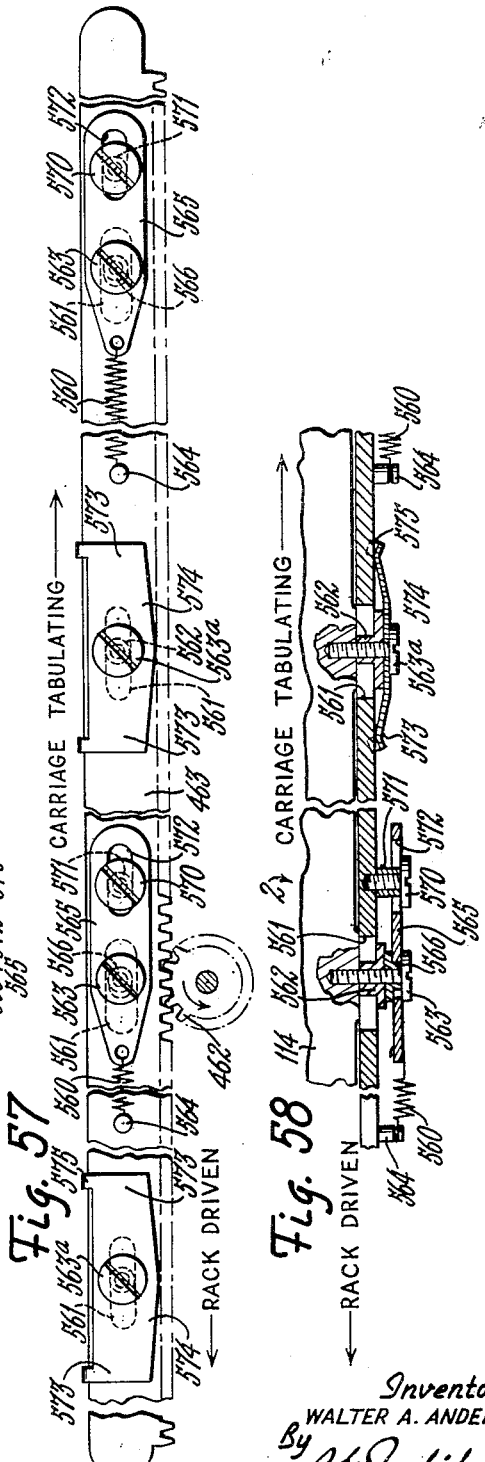
Inventor
WALTER A. ANDERSON
By R. G. Julihn
Attorney

UNITED STATES PATENT OFFICE 2,536,524

FRONT-FEED DEVICE

Walter A. Anderson, Bridgeport, Conn., assignor to Underwood Corporation, New York, N. Y., a corporation of Delaware Application June 27, 1946, Serial No. 679,722

22 Claims. (Cl. 197—128)

This invention relates to front-feeding devices for business machines, such as accounting machines, and particularly to such devices which involve a partial opening feature.

There are disclosed herein, but not claimed, inventive features relating to front-feeding facilities which have no particular cooperative relation to any partial opening provision. Such features, as well as others not constituting part of the present invention, are however contributory to producing an exceptionally efficient, reliably operative and extremely versatile accounting machine. These unclaimed features are the subject matter of the following divisional applications by the same inventor: Serial No. 718,913, filed December 28, 1946; Serial No. 20,888, filed April 14, 1948; Serial No. 33,305, filed June 16, 1948; Serial No. 35,039, filed June 24, 1948, and since issued as Patent No. 2,493,799, dated January 10, 1950; Serial No. 63,965, filed December 7, 1948; Serial No. 134,537, filed December 22, 1949; and Serial No. 135,479, filed December 28, 1949.

It is one general object of the present invention to widen the scope of usefulness and increase the flexibility of accounting machines such as the well-known Sundstrand accounting machine.

Another object of the invention is to provide in efficient association with means for fully opening a front-feed device for work-sheet reception, efficient means to place the front-feed device in a partially open state, thereby to facilitate convenient and expeditious removal of one or more work-sheets.

Another object of the invention is to provide with efficient front-feeding facilities, efficient provision to facilitate withdrawal of one of several work-sheets while the machine may be cycling.

Particularly also, it is an object of the instant invention to provide an efficient front-feed mechanism embodying a non-elevatable platen, and constructed to facilitate front-feeding and particularly also withdrawal of work-sheets with extreme dispatch and ease.

It is furthermore an object of the invention to produce front and/or rear feeding facilities which are suited for advantageous handling and production of records, and which satisfy an almost unlimited number of different business requirements or systems, such as systems wherein, for example, a plurality of front-fed work-sheets require introduction alongside or in front of each other, or both, or in other relative positions.

Especially, it is also an object to provide for a partial opening of a front-feed throat to an extent insufficient for front-fed work-sheets to lose their desired locations in the machine, and also insufficient for the front-feeding facilities to interfere with the operation of the typing instrumentalities, but yet sufficient to allow convenient, substantially unrestricted withdrawal of any front-fed work-sheet or sheets.

It is also an object to provide efficient carriage-controlled means to fully or partially open the front-feed device.

An object ancillary to the last noted object, is to open the front-feed device to fully open position by power derived from machine cycling action, and to open it partially under carriage control independently of machine cycling action.

In association with a front-feed device which is capable of partial and full opening operation, it is also an object to provide efficient means to effect closure of the device after a full opening operation, efficiently under supplemental control of the paper supporting carriage and an operable part, the latter of which may be in the form of a machine cycling or other key.

An object ancillary to the several preceding ones is to provide for flexibility of the control wielded by the carriage, thereby to expand greatly the versatility of the machine for use in different business applications.

Also to the end of greater versatility of the machine, it is an object to provide in combination with carriage-controlled facilities for partially opening a front-feed device, efficient means to open and close the front-feed device fully, such means embodying independent carriage controls for controlling both such actions.

It is also contrived to provide simple means to render a front-feed table incapable of being drawn to a fully open front-feed position and into conflicting relation with the typing instrumentalities, by application of manual force applied on said table.

In addition to the above specifically noted objects, the invention has many other objects which are in part obvious and in part pointed out specifically as the description of the preferred embodiment of the invention proceeds.

The invention has been worked out and is illustrated and described as embodied in the well-known Class D Sundstrand accounting machine, the main conventional features of which are disclosed in the patents to Sundstrand, Nos. 2,194,270 and 2,209,240, dated respectively, March 19, 1940 and July 23, 1940. Reference to this machine and these patents may be had for clarification of features and details which are not directly part of the present invention, and which it is not deemed necessary to describe and illustrate.

In the accompanying drawings:

Figure 3 is a right-hand sectional side view of the new paper supporting carriage, the new front-feeding device being shown in the normal position as in Figure 1.

Figure 4 is a fragmentary view, picturing in sectional aspect from the right, an improved structure for mounting a function control plate, the process of application of the plate being illustrated.

Figure 5 is a right-hand side elevation of the new front-feed carriage with all parts in normal position, the side wall of an end-cover being shown cut away.

Figure 5a depicts in frontal aspect, diagrammatically, a narrow front-feed table in association with an automatic front-feed closure-controlling feature set up to cause closure thereof when the machine is cycled with the types positioned in front of the short table.

Figure 6 is a front perspective view of the new carriage with the right side turned to view, showing the front-feeding device in front-feed condition, and showing top feed-rolls for a record sheet cast off the platen.

Figure 7 is a fragmentary perspective view of a conventional tabulating control mechanism for the carriage, including also an incapacitating or normalizer key control therefor.

Figure 8 is a fragmentary, right-hand side elevation showing the front-feed device moved to and latched in front-feed position.

Figure 9 shows a number of controlling and operating parts of the front-feeding device, which are carried on the right carriage end, in perspective aspect as in Figure 6, but disassembled and spread apart.

Figure 10 is closely related to Figure 11 and is directed to a modification whereby upon movement of the front-feed device to an intermediate position, the front-feed table is blocked against being pulled into the operating path of type-bars.

Figure 11 is a fragmentary side elevation showing the front-feed device partially opened under carriage control to facilitate removal of a front-fed sheet.

Figure 12 is a fragmentary rear perspective view depicting a carriage control for causing full opening of the front-feed device, and depicting also a carriage control for partially opening the front-feed device, these controls being shown in association with a supporting bar for these controls.

Figure 1:
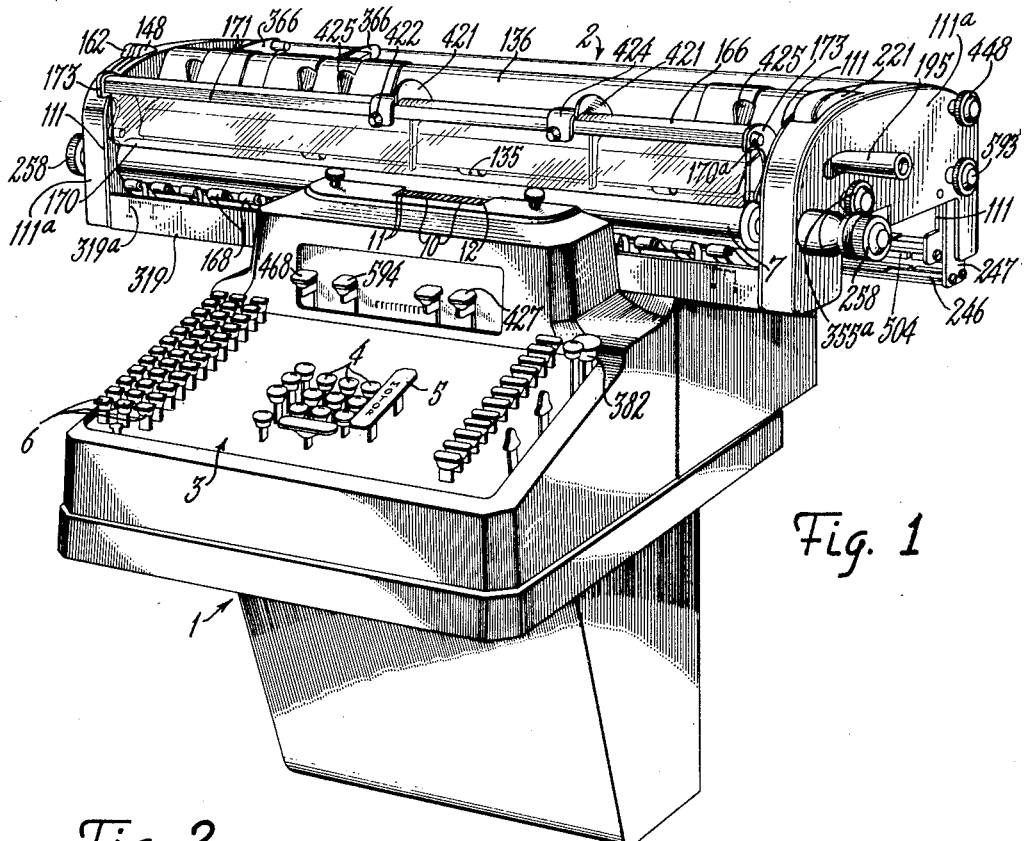
Figure 1 is a perspective view of a Sundstrand accounting machine embodying the new features of invention, and showing the front-feeding device in normal position giving clearance for typing.

Figure 13 pictures a control cam proper, for fully opening the front-feed device, the cam being viewed from the right front side thereof.

Figure 14 is a rear perspective of certain parts of an automatic power opening mechanism for the front-feed device, in disassembled relation.

Figure 15 shows in side elevation, a portion of a machine cycling mechanism, and devices power operable thereby for opening and closing the front-feed device, the parts being shown in normal inactive position.

Figure 16 illustrates a portion of the power operating device of Figure 15 in an idly operated state.

Figure 17 shows a portion of the actuating mechanism for opening the throat, the mechanism having been conditioned under carriage control for effective operation at the next machine cycle.

Figure 18 is a side view similar to Figure 15 but illustrates the actuating mechanism for opening the throat as having been power-moved effectively to operated position.

Figure 19 pictures the actuating mechanism for opening the front-feed device, in the process of being reconditioned for another effective operation incidental to the next cycling operation.

Figure 20 is a front perspective view, looking down at an angle from the right of the machine, and showing a controlling mechanism providing for restoration of the front-feed device to closed position under carriage control by the machine cycling mechanism.

Figure 21 is an enlarged detail view of a control clip shown also in Figure 20.

Figure 22 is a fragmentary plan view of a considerable left portion of the carriage, some of the upper structure of the carriage and the platen having been removed to expose to view certain sheet-guiding, clamping, and rear edge gaging features.

Figure 23 is a sectional view taken along line 23—23 in Figure 22 and showing a channel structure for adjustably supporting a flexible strip carrying a rear edge gage.

Figure 24 is a fragmentary sectional side view taken intermediate the carriage ends, illustrating diagrammatically the front-feed device of the invention in closed position and a removable carbon anchorage fixture in association therewith.

Figure 25 is similar to Figure 24, but the front-feed device is represented in front-feed position, and the carbon anchorage fixture is shown moved to a related position.

Figure 26 is an enlarged view of a carbon anchorage bar and an associated clip seen in Figures 24 and 25.

Figure 27 shows in front elevation certain structural details of the paper-feeding and guiding mechanism.

Figure 28 shows part of the bar and the clip of Figure 26 as viewed from the front.

Figure 29 is a fragmentary side section illustrating a removably applicable bottom-edge gage in use and in association with related carriage parts.

Figure 30 is a perspective view of the bottom-gage of Figure 29 and its manner of support on a part of the machine.

Figure 31 is a schematic front view representing a partially open condition of the front-feed device wherein a front-fed sheet S at the left is freely removable while a printing operation on another front-fed sheet S, to the right thereof, may be in progress.

Figure 32 is a schematic front view showing feed-rolls for a right front-fed sheet incapacitated and showing such sheet immovably held between companion clipping elements, while a left front-fed sheet is contacted and pressed against the platen for line-feeding movement thereby.

Figure 33 is a fragmentary, sectional side view of the carriage, directed to the feature of Figure 32, and showing the companion sheet clipping elements of said figure in an open-throat condition for receiving a front-fed sheet.

Figure 34 is similar to Figure 33, but the companion clipping elements are shown in sheet holding position as they will be when the front-fed device of the machine is closed.

Figure 35 is a fragmentary plan view of a pair of companion sheet-clipping elements featured in Figures 32, 33 and 34, together with related and neighboring parts.

Figure 36 depicts in side elevation a lower one of said clipping elements and in the act of being applied or removed from a supporting part on the carriage.

Figure 37 is a right-hand sectional side elevation, illustrating in normal position the major parts of the printing and computing devices of the machine, inclusive of a novel spring device for counteracting the power of carry-over springs during a phase of the cycle when they are stressed, and inclusive also of a provision to counteract rebounding of the differentially movable type-bars at the instant of their arrest.

Figure 38 repeats some of the parts seen in Figure 37, and more particularly shows a differentially actuatable type-bar at the instant of differential arrest during a machine cycle, and means in the act of opposing the rebounding tendency of the type-bar.

Figure 39 shows a portion of the mechanism seen in Figure 37 in the position it assumes when a cycle has been started and the type-bars have been allowed to rise a short distance. The view shows the novel spring device of Figure 37 being shifted to ineffective position. The same position of the parts is transitorily reached also near conclusion of the return stroke of the cycle.

Figure 40 is a view similar to Figure 39 but the cycle has further progressed along. The view shows the counteracting spring device of Figures 37 and 39 in an idle, energy storing condition, not resisting the progress of the cycle.

Figure 41 is a fragmentary plan view illustrating the motor drive for cycling and returning the carriage, and a means for controlling the tabulating speed of the carriage.

Figure 42 is a sectional front view taken on line 42—42 of Figure 41, showing a portion of the power drive to the carriage, and the tabulating speed control feature mentioned with reference to Figure 41.

Figure 43 is a frontal perspective view looking rightwardly upon a series of carriage return instituting and carriage return terminating control elements, some of which elements are normally adapted for cooperation with a carriage-return clutch-shifter, and others of which are selectable by placement of the shifter into a rear position. The view depicts a fragment of the shifter, and a return instituting element $R^2$ in the controlling path thereof.

Figure 44 is a perspective view similar to Figure 43, but the clutch shifter is shown moved to a closed clutch position and in the controlling path of a return terminating element $RT^2$.

Figure 45 shows the clutch shifter placed rearwardly into the path of the return instituting element $R^1$.

Figure 46 is similar to Figure 45, but the clutch shifter is shown in closed clutch position and placed to the rear into the controlling path of a return terminating element $RT^1$.

Figure 47 shows the clutch shifter of Figures 43–47 placed into its rear position at the right of the element $R^1$ to provide for extended carriage advance beyond elements $R^1$ and $R^2$, and for possible clutch closing cooperation with an element $R^3$.

Figure 48 is a fragmentary perspective view looking rightwardly and downwardly on a control mechanism in its normal position for closing and opening the carriage return drive, and including provision for placement of the clutch-shifter in forward and rearward position.

Figure 49 is an enlarged fragmentary perspective view looking upwardly and rightwardly against a part that is also seen in Figure 48.

Figure 50 is a fragmentary, left-hand side elevation viewing the clutch closing and opening mechanism that is also shown in the perspective view of Figure 48.

Figure 51 shows, seen from the rear, some of the parts of the clutch controlling mechanism in the normal position of Figure 50.

Figure 52 is a rear view similar to Figure 51, but showing the clutch shifter in closed-clutch position.

Figure 53 is a rear view of a detenting provision also seen in Figures 51 and 52, but illustrating a condition which follows placement of the clutch shifter to the rear, the clutch shifter being in open-clutch position.

Figure 54 is a rear view, as Figure 53, and represents a detenting condition which follows that of Figure 53 when the clutch shifter thereafter is moved to closed-clutch position.

Figure 55 is a bottom view of a carriage return rack and a driving gear, novel shock-cushioning features being associated therewith. The front of the machine is facing the reader and the parts are shown in their normal relations.

Figure 56 is a frontal view of the feature seen in Figure 55, the parts being also shown in their normal relations.

Figure 57 is a bottom view similar to Figure 55 but the carriage return rack is shown as it picks up the carriage with a lag through the intermediary of elastic elements.

Figure 58 is a frontal, fragmentary representation of some of the parts illustrated in Figure 57 in the same positions.

For convenience of reference and study of the invention, the description is divided into the following headings:

1. Old Sundstrand accounting machine features
2. Improved machine cycling mechanism, and control therefor
3. Paper supporting carriage and tabulating control therefor
4. Record and statement sheet feeding—General
5. Record sheet holding and feeding devices
6. Front-feed table and throat
7. Manual front-feed conditioning
8. Manual restoration of front-feed device
9. Locking and timing devices for front-feed device
10. Automatic front-feed conditioning
11. Automatic restoration of front-feed device
12. Normalizer key, and heading balances
13. Partial opening of front-feed device
14. Line spacing
15. Provision for line-feed of one sheet independently of others
16. Tally roll paper supply
17. Carbon paper supply and related features
18. Lateral positioning facilities for the work sheets
19. Locating work sheets at desired writing line
20. Power return mechanism for carriage 21. Carriage return shock cushioning
22. Carriage tabulating speed control
23. Control plate mounting
24. Improvement for load equalization during machine cycles
25. Rebound prevention for differentially movable elements
26. Conclusion 1. *Old Sundstrand accounting machine features*

Referring now more particularly to Figure 1, the machine comprises a stationary machine section generally designated by the numeral 1, and a paper supporting carriage 2 movable transversely on said stationary section. A key board 3 embodied in the stationary section includes the usual amount indexing or digit keys 4, a cycling key or bar 5, a group of date printing keys 6, and many other controls, the function and purposes of which are well known, and such as are more intimately connected with the present invention will be specifically set forth as the description of the machine proceeds. The carriage 2 is provided with the customary platen roller 7 which serves to support work-sheets for receiving impressions from amount-printing and other types 8 carried on a series of laterally adjacent amount printing type-bars 10, several date printing type-bars 11, and a signal printing type-bar 12. The said type-bars 10, 11 and 12, see Figure 37, are supported in the stationary section 1 of the machine, as at 14 and 15, for differential vertical sliding movements from retired positions below a typing line at 13, as seen in Figure 37, to various raised positions, presenting the proper types in front of said typing line 13. The amount printing type-bars 10 have associated therewith an upper and a lower main register respectively numbered 16 and 17, each capable of addition as well as subtraction. These registers 16 and 17 henceforth will be referred to as crossfooters. The said amount printing type-bars 10 have also associated therewith an upper and a lower group of plain adding registers, all disposed to the rear of the crossfooters, the registers in these two groups being respectively designated by the numerals 18 and 19.

In order to cause the types on the bars 10 to record amounts, the proper amount keys 4 are successively depressed and this sets up proper stopping conditions in a field of stop-pins 21 seen in Figure 37, to predetermine the proper differential extents to which the type-bars 10, and downward extensions 10a for driving the crossfooter 17, are to rise under the tension of springs 22, of the latter of which there is one for each type-bar 10, and one for each extension 10a, each spring 22 being associated with a lift arm 23 that is articulated with a type-bar or its extension, as at 24, at widely different elevations. Normally, as seen in Figure 37 the type-bars 10, 11 and 12 are held in low, retired positions by two universal bars 25, each one overlying a gang of said lift arms 23, and both bars 25 being normally held against rising by the cycling mechanism of the machine.

The cycling mechanism, see Figure 37, comprises two reciprocative crank arms 26, one at each side of the group of type-bars, and both fixed upon a main rock shaft 27 of the machine, and carrying rollers 31 that engage with forked ends 32 of two levers 33, said levers 33 carrying the upper restoring bar 25 and being pivoted upon a stationary rod 34 upon which also the type-bar lifting arms 23 are pivoted. Laterally spaced vertical links 35 connect the opposite cycle-controlled levers 33 with two laterally spaced arms 36 which support the restoring bar 25 for the lower lifting arms 23. Said spaced arms 36 and the lifting arms for the type bar extensions are mounted on a common pivot rod 38. For simplicity of construction the said links 35 are pivoted to the arms 33 and 36 upon laterally extending ends of the universal bars 25, and are held thereto by the heads 39 of screws as shown in Figures 37 and 39. If subsequently to indexing an amount in the key board, a machine cycle is instituted by the depression of the cycle key 5, the two crank arms 26 will move anti-clockwise as seen in Figures 37, 39, and their rollers 31 will move rearwardly and upwardly and will cause the said levers 33 and 36 with their rods 25 to rise, thereby permitting the type-bars 10, 11 and 12 to rise appropriate extents under the power of the springs 22, as predetermined by the stopping conditions established by the setting of the stop pins 21. See Figure 38. To this end, each type bar 10 has a forwardly reaching arm 40 hingedly attached thereto at a vertically disposed axis, as at 41. At their forward ends the arms 40 reach slidably into slots provided in rods 42 which are guided for vertical movement in a denomination shifting slide 43 which incidental to each depression of an amount indexing key 4 moves one step laterally to align the rods in progressively correct denominational relationship with the bed of stop pins 21, as is clearly disclosed in the said patents to Sundstrand. It should be observed that the vertical rods 42 in moving stepwise with the slide 43, maintain their operative connections with the associated type-bars 10 by reason of said hinging connections 41 and the slidable association of the arms 40 afforded by the slots in the rods 42. The type-bars 10, 11 and 12 rise differentially to their appropriate digit or character-representing positions during the first half of the reciprocative cycling movement of the crank arms 26, and are forcibly restored against the tension of the springs 22 by the return reciprocation of the crank arms 26, at the end of which, as seen in Figure 37, the roller 31 has ridden onto a dwell 49, and for which reason all the type-bars are normally locked against spring urged upward movement. At the very beginning of the type-bar restoring movement of the crank arms 26, an aligner blade 46 is caused to move transitorily into whatever one of a series of detent notches 47 on the type-bars has become located oppositely thereto. The operating mechanism for the aligner blade is not shown, but it firmly locates and locks the raised type-bars for operation of those types 8 against the platen which have become located opposite the typing line. The operation of the types is momentarily effected by hammers 48, just subsequently to the operation of the aligner blade 46, the blade, as well as the hammers being restored before the return movement of the type-bar commences. Each of the rollers 31 engages another dwell 51 on the associated lever 33, at the end of the forward half of the cycle, and thereby provides for a delay in the return of the type-bars during which the type hammers 48 can operate and withdraw. The reason for the two sets of spring-urged lifting arms 23 and the two restoring bails 25 is to reduce the total necessary stress on any part of the type-bar and extension, thereby to prevent undue flexure thereof.

It has been stated that besides the amount-printing type-bars 10, there are type-bars 11 and 12 for date and signal printing. These type-bars rise under control of date printing keys 6 and certain function control keys, during machine cycles, similarly to the amount-printing type-bars 10, appropriate distances for selection of appropriate signal and date types, in a manner fully disclosed in said Sundstrand patents.

Each of the crossfooters 16 and 17 comprises a series of pinions 52 rotatably mounted upon a transverse shaft 53. These shafts 53 are mounted for movement fore and aft of the machine, and each of the two sets of pinions 52 is located between two sets of racks 54 and 55, the racks 54 being adding racks and the racks 55 being subtracting racks. The adding racks 54 and the subtracting racks 55 are respectively attached to rearward branches 57 of the type-bars 10 and their extensions 10a, by means of mounting studs 58 which reach from said branches through vertically elongated openings 60 in said racks. At the level of the crossfooters, the racks 54, 55 are guided in transversely slotted horizontal bars 62. Contractile springs 61 associated with said racks 54, 55, and anchored to downward reaches of said branches 57, facilitated by the openings 60, permit arrest of the racks 54, 55 when they have descended distances corresponding to the indexed amount digits, the type-bars 10 to which racks 54, 55 are attached, continuing the downward descent the equivalent of an extra unit for tens transfer purposes, it being understood that the total movement of the type-bars is always one unit in excess of the indexed amount or condition. Conventional automatic and manual controls are provided for causing engagement of the individual crossfooters with either of their associated sets of racks 54, 55 at the beginning of the second half cycle of the machine, to cause the type-bars, during their descent, to drive either or both said crossfooters, either additively or subtractively. Tens transfer blocking elements 64 are capable of arresting the racks 54, 55 after a descent corresponding to the indexed number, but when a register wheel is to receive a transfer from the wheel of the next lower order, a carry tooth 63 on such lower order wheel will trip a transfer control 65 to free it from an edge of the associated rack guiding bar 62, and thereby cause the associated blocking element 64 to move out of blocking position under the urge of a spring 66. In each instance where this occurs, the active rack 54 or 55 descends the full distance with the associated type-bar 10 and will move the register wheel the equivalent of the indexed digit plus a carry unit. In all instances where there is to be no carrying operation, the blocking elements 64 will remain in place and the springs 61 will be stretched after the racks 54 or 55 have become arrested. It might yet be stated that at the end of each amount entering cycle the crossfooters which have been active remain engaged with their racks, pending an appropriate readjustment called for in the next machine cycle.

A common set of racks 68 serves to drive all adding registers 18, and another common set of racks 71 serves to drive all adding registers 19. The racks 68 and 71 are mounted for vertical movement in guides 72. At their lower ends, the various racks 68 and 71 have articulations with arms 73 that are pivotally mounted on the rods 34, 38 on which the aforesaid lifter arms 23 for the type-bars 10 and extensions 10a are respectively mounted. Each of the arms 73 has a loose connection 74 with an arm 75 which is integral with the type-bar lifter arm 23 of the appropriate order and forms therewith a lever, said loose connections affording some capacity for relative movement between the related arms 73 and 75. Thus when the type-bars 10 rise in accordance with the indexed digits, the racks 68, 71 will descend correspondingly. Conversely, as the type-bars descend during the second half cycle of the machine, the racks 68, 71 will rise. Conventional control mechanism is provided to condition the registers 18 and 19 selectively for engagement with their associated sets of racks 68, 71 at the beginning of the return stroke of the cycle, and for the remainder of the cycle, thereby to effect addition in these registers. Such control mechanism, which has also provision for taking and printing totals, is fully described in the aforementioned Patent No. 2,209,240, but it may be added that according to the said patent only one register in each group is selectable at one time. This is because all registers in each group are served by a common set of carry-over controls, indicated for the upper registers 18 and the lower registers 19 respectively at 76 and 77. Springs 78 associated oppositely with the arms 73 and 75, facilitated by said capacity for relative movement between these arms, permit arrest of the racks 67, 71 when they have risen appropriate distances in accordance with the indexed amounts. The arrest of the individual racks 68, 71 occurs under control of carry-over controls 76, 77, such controls being capable of blocking the last-part upward movement of the racks at all times except in the instances where carrying operations are in order. As in the case of the springs 61 for the crossfooter driving racks 54, 55, the springs 78 are stressed during the last unit downward movement of the type bars in all such instances where no carrying operations are to take place.

2. *Improved machine cycling mechanism, and control therefor*

It has been stated that the cycling mechanism includes two reciprocative crank-arms 26 on a rock shaft 27. The means by which the rock shaft 27 is given its cycling reciprocation will now be described. As in the structure disclosed in the above noted Patent No. 2,194,270, an electric motor 81, see Figure 41, drives a worm wheel 82 at greatly reduced speed by means of a worm 83 formed on a spindle 84. However, in the present machine there is interposed between the armature shaft of the motor 81 and the worm-spindle 84 an overload ship-clutch generally designated by the numeral 85. Said over-load clutch comprises a constantly motor-driven driver element 86 and another element 87, the latter fast on the spindle 84 and frictionally driven by the driver element 86. The driver element consists of a cylindrical rotor having two axially spaced flanges 88 and 89, the flange 89 being integral with the rotor element 86, and the flange 88 being made of springy material, formed as shown, and carried upon the rotor for rotation therewith, but axially adjustable to and from the other flange by means including a nut 91. The driven clutch element 87, has an annular section 92 between the flanges 88, 89 of the other element, tension being given the flange 88 by appropriate axial adjustment thereof so that both the flanges bear resiliently against the ends of the annular section 92. It follows thus that the clutch element 86 drives the clutch element 87 impositively through frictional contact. As will be evident later, this is for the purpose of softly picking up the load at the beginning of each cycle, and also to prevent injury to the machine should it become tied up for some reason or other. The impositiveness with which the clutch element 87 is driven provides also for impositive carriage return drive as will become evident later. The worm 83 and the worm gear 82 are both contained in a housing 93. The worm gear is integral with a tubular shaft 94 that is rotatively mounted on a shaft 95 and which, exterior of the housing 93, carries a toothed clutch element 96. Slidably splined on the shaft 95 for engagement with the clutch element 96 is a companion clutch element 97. A clutch shifter 98 under constant tension of a spring 99 tends to move the clutch element 97 into engagement with the other clutch element 96. However, as seen in said Figure 41, the clutch element 97 is normally held out of engagement with the clutch element 96 by a cycle trip dog 100, having a cam face 100a to cam the clutch element 97 to open-clutch position, and having also a shoulder 100b to hold this clutch element 97 against rotation. Said dog 100 is moved or tripped free of the clutch element 97 in response to each depression of the cycle key 5 and also other keys, through conventional means shown in said Sundstrand Patent 2,194,270, and moves again into position before the shaft 95 has received a complete revolution, thus to restrict turning of the shaft 95 to one single revolution for each cycle trip. Each single revolution of the shaft 95 is translated into a single reciprocation of the shaft 27, as required for reciprocation of the type actuators 10, and for other purposes. Specifically, a crank disk 101 has a crank pin 102 to which is pivotally connected one end of a pitman 103, the other end of which has a pivotal connection with an arm 104 fast on the rock shaft 27. A harmonic motion reciprocation will thus be given the arms 26 in response to each depression of the cycle key. The machine provides also for operation of the cycle trip dog 100 under control of the carriage, as shown in Figure 3, by tappets 106 that are on usual function control dogs 107 which are adjustably supported on a supporting plate 108, and which with related parts are fully described in said Patent No. 2,194,270. A scale 109 on the plate 108 aids in properly positioning the control dogs 107 at appropriate positions along the plate.

3. *Paper supporting carriage and tabulating control therefor*

The paper supporting carriage 2, see Figures 1, 3, 5 and 6, comprises two spaced side walls 111 between which the platen 7 is accommodated, the platen being fast on a platen shaft 112 which is rotatably supported in the opposite side walls 111 for paper feeding control. The side walls 111 of the carriage are rigidly interconnected by rail bars 113 and 114 which lie very low and have carriage guide-ways 115 facing towards each other. Between the ways of said rail bars 113, 114 there is a track structure 116 surmounting and fixed to the main frame 1 of the machine. It affords opposite track-ways 117 parallel and contiguous to the guide-ways 115, the parts 113, 114 and 116 being all disposed low to accommodate low-slung guiding means for front-fed sheets, as will become evident later. Anti-friction elements 118 interposed between the guide-ways 115 and the track-ways 117 cooperate therewith to guide the carriage upon the frame in advance and return directions. The carriage is under constant tension of a spring motor, not shown, which tends to advance it leftwardly as seen from the front. Both end plates or walls 111 have flanged side covers 111a which conceal mechanism thereon. Convenient access can be had to the control plate 108 from the top, there being a cover 110 provided for hinged displacement about pivotal points 110a on the plate 111.

Referring now to Figure 7, a vertically swingable escapement element 120, in cooperation with the front end of differently positioned function control dogs 107 on the carriage, is capable of holding the carriage in different tabulating or columnar positions. Whenever the carriage is at rest, the front end of one of the control dogs 107 is abutting against the right end of the escapement element 120, the latter of which normally is resiliently held raised against a stop 129, by a spring 123. Ordinarily when the machine cycles, it is desired that the carriage thereafter execute a tabulating movement from one column to the next. To this end a lever 124 is reversely actuated respectively at the beginning and the end of each cycle to vibrate a slide 125 vertically and to actuate and return a lever 126. The lever occupies normally the position as seen in Figure 7, but when actuated, a bifurcated end 127 thereof acts upon a pin 131 of another lever 128 to temporarily project a holding dog 130 into the path of the active columnar control element 107. Concomitantly with the projection of the holding dog 130, the swingable element 120 is withdrawn below the active function control dog 107, permitting the carriage to advance slightly until arrested by the projected holding dog 130, the element being then under the dog 107. The element 120 receives its downward movement at the actuation of the lever 126 through the medium of the pin 131 on the lever 128. Upon return of the lever 126 to normal position, namely at the end of each machine cycle, the said dog 130 is withdrawn so that the carriage can then tabulate. Resultingly also, the element 120 restores to normal position and will intercept the carriage in the next columnar position as defined by the next control dog 107 to the right of the one which has just escaped. Full particulars of this tabulating mechanism are disclosed in Patent No. 2,194,270, referred to hereinabove, particularly also the connections whereby the lever 124 is reversely actuated during each machine cycle. At appropriate times the carriage is power-returned to come to rest at a desired columnar position, ready to execute renewed tabulating steps. This, however, will be brought out in a special chapter.

4. *Record and statement sheet feeding—General*

The machine herein disclosed is primarily an accounting machine, though certain features thereof are equally applicable to other types of business machines. Usually accounting machines are required to hold a minimum of one journal or record sheet, and a minimum of one ledger or statement sheet. In the drawings said record sheets are designated by the reference character R, and the statement sheets by the reference character S. The record sheets are rear-fed and receive a carbon-record of entries made upon successively front-fed statement sheets, each statement sheet receiving usually only a single-line-entry. The statement sheets are front-fed because they require very frequent handling, whereas the record sheets do not.

5. *Record sheet holding and feeding devices*

According to the present disclosure, see particularly Figure 3, feed-rolls 134, bear normally upon the rear-side of the platen 7, below the level of the platen shaft 112, and other feed-rolls 135 bear normally upon the top-side of the platen, all to hold a record sheet R in typing position on the platen. Above the feed-rolls 134, extending between the carriage ends 111, and inclined rearwardly, there is a sheet supporting table 136 rigidly fastened to the carriage ends 111, as at 137. The record sheets R are rear-fed to the platen, downwardly in front of said table 136, and are rolled between said feed-rolls 134 and the platen, forwardly and upwardly, by turning the platen 7, the leading end of the sheet being directed underneath the top feed-rolls 135.

The top feed-rolls 135 are supported on sliding members 140 that are adjustably movable along an inverted T-shaped bar 141 and have laterally spaced arms 142. The bar 141 extends the full length between the carriage ends 111 and has round ends 143 by means of which it is pivotally carried on the carriage ends. Each sliding member carries one feed roll 135 by means of spaced supporting levers 144 pivotally carried as at 145 on said spaced arms 142. Springs 146 oppositely anchored on said arms 142 and said levers 144 provide some capacity for yield of the feed-rolls with respect to the supporting slide structure. The feed-rolls 135 are movable to and from the platen under control of a finger piece 148 which surmounts a pivoted release lever 150 having a pin-and-slot connection with an arm 151 fast on the left end of the bar 141. A strong spring 152 attached to the arm 151 is seen in Figure 3 to exert tension to press the feed-rolls 135 into feeding contact upon the platen, the springs 146 associated with the various feed-roll carrying arms assuring feeding contact for all rolls 135. Upon rearward movement of the finger piece 148, the said feed-roll carrying slides or units 140 become swung upwardly by the bar 141 as illustrated in Figure 6. The finger piece 148 in being moved rearwardly causes the spring 152 to swing over center and hold the feed rolls 135 away from the platen. An apron 154 attached to the T-shaped bar 141 covers the several feed rolls 135 and supporting slides, but the latter are freely accessible for adjustment along the bar whenever the feed-rolls are released as seen in Figure 6. As will become evident later, the apron 154 serves to guide and keep front-fed sheets S out of contact with the feed rolls 135 and their supporting structures.

The bottom feed-rolls 134 of which there are a series alongside of each other extending along the platen, are each rotatively supported at opposite ends by levers 156 upon a common pivot rod 157 carried on a generally Z shaped supporting web 158 which extends the full length of the carriage and is rigidly carried thereon. Said web 158 serves also to support the bottom end of the table 136. Springs 160 urge the individual feed-roll supporting levers 156 towards the platen. A flat-faced cam shaft 161 is provided to act, when turned, upon upreaching arms of the levers 156, to displace them forwardly and cast off the feed-rolls 134 a small distance away from the platen. Said shaft 161 is rotatable to throw off the feed rolls 134 by a rearward displacement of a finger piece 162, similar to the finger piece 148, see Figure 1, mounted upon an arm similar to the arm 150 and having an operating connection, not shown, with the shaft 161. The feed-roll supporting-levers 156 have tapered tongues 163 reaching forwardly of the feed-rolls 134 and slightly spaced from the platen, such tongues being instrumental to guide rear-fed sheets such as record sheets R, in a curved path towards the front of the machine. The rear-fed sheets as they emerge at the front of the platen can be manually directed rearwardly under the top feed-rolls 135, these rolls, if desired, being temporarily released for the purpose. In usual practice a record sheet R to be inserted, is presented to the machine next to the platen while the previously finished record sheet is still in place, such latter sheet being used to guide the newly introduced sheet around the platen and underneath the rolls 135. A deflector plate 164 at the rear of the top feed-roll 135 directs the leading end of any rear-fed sheet upwardly from the platen, thereby to prevent it from being drawn downwardly by the trailing end of the same sheet. Said deflector plate has end-ears by which it is pivotally hung on the rounded ends 143 of the T-shaped bar 141, rest legs 165 reaching from the plate to bear on the paper table 136.

6. *Front-feed table and throat*

The invention provides for efficient and convenient front-feeding of work-sheets, such as said statement sheets S, down the front-side of the platen and thereunder to the rear. Figure 3 shows a statement sheet in position for typing thereon, paper holding means, in the form of feed-rolls 168 being shown bearing against the front-bottom side of the platen 7 to hold such sheet. Above the typing line 13, a front-feed guide or table 170, preferably of transparent material, bears rearwardly against the statement sheet S, thereby causing the latter to be wrapped in close contact around the front-side of the platen at the typing line 13, suitable for receiving impressions from the types on the bars 10, 11 and 12. With the front-feed table 170 in the position described, the type-bars can rise freely for typing impressions. As has been stated, usually after one line-entry on a statement sheet, such sheet is removed and another is presented, the record sheet R remaining in the machine and being required to be line spaced. As illustrated in Figure 8, in order to facilitate removal of one statement sheet S, and the introduction of another in its place, the paper holding means or feed-rolls 168 are cast off the platen and the front-feed table 170 is displaced forwardly to occupy a forwardly tilted position. It will be seen from Figure 8 that the statement sheet S, in the shown position of the table 170 and the feed-rolls 168, is freely removable, and that another such sheet can be conveniently and freely inserted down the rear of the table 170 into the wide-open feed-throat formed between the platen 7 and the cast-off rolls 168.

The transparent front-feed table 170 may in most cases be co-extensive in length with the platen, and is secured along its upper margin by screws or rivets 172 to a stiff bar 171 of substantially square cross-section. This stiff bar, see Figure 3, has a scale strip 167 overlying it, which strip is headed by a rounded scale-magnifying molding 166 of transparent plastic material, giving a smooth, rounded face for withdrawing work-sheets thereover forwardly. The scale indicates the lateral position of the sheet and also the location of the carriage in association with the type-bars 10, 11 and 12. The bar 171 is carried on opposite ends of the carriage by plates 173 which are pivoted to the adjacent side walls 111 of the carriage by means of pivot studs 174 which are located preferably to render the front-feed table 170 displaceable about an axis that lies parallel to the platen and to the rear and below the platen axis. This provides that during the restoration of the table 170 its lower edge will glide upwardly over the front-fed paper to wrap it in tight contact with the platen. The bar 171 with its table 170 is removably mounted on the end plates 173 by means of screws 170a and provision is further made to provide for adjustment thereof towards and away from the platen in the plane in which the table lies, thereby to adjust the bottom or top edge of the table to a desired sheet gaging or line finding position.

Said feed-rolls 168 extend in a row along the platen and each is rotatively supported at the opposite ends thereof by arms 175 carried swingably upon a supporting shaft 176. Brackets 178 flank each pair of opposite feed-roll carrying arms 175 and are fastened behind the shaft 176 as at 179, see Figures 3 and 22, to the rail bar 113 of the carriage, and are fastened forward of said shaft to a carriage-frame-bar 181 which extends parallel to the platen and spans the space between the carriage end-walls 111. Said brackets 178 have the shaft 176 extend therethrough to afford bearing supports for the latter. Springs 177 attached to rearward extensions of the arms 175, and anchored to the adjacent brackets 178, urge said arms 175, and thus the feed-rolls, constantly towards the platen. The shaft 176 is non-circular in cross-section and carries intermediate each pair of feed-roll carrying arms 175 an element 182. Each of these elements 182 has opposite, apertured ears 183 to fit the shaft and to turn therewith, the spaced ears in conjunction with the brackets 178 serving to locate the feed-roll arms 175 properly spaced along the shaft 176. Said elements 182 reach under the aforesaid feed-roll arm extensions, from which they are normally slightly spaced to allow good feeding contact of the rolls 168. For release of the feed-rolls 168, the shaft 176 is given an anti-clockwise movement as viewed in Figure 8, so that the elements 182 thereon will engage and move the feed-roll arms to cast off the rolls 168.

The sheets S which are front-fed down between the platen and feed-rolls 168, see Figure 8, take a wide sweep around the underside of the platen, rearwardly well below the tapered tongues 163 of the rear feed-rolls 134. Such wide sweep is given the sheets by guiding elements 185 situated between the feed-rolls 168, and below which the latter withdraw when released. The said guiding elements 185 are augmented in their function by a paper shelf 186, see Figure 3, which has only a slight upward tilt to the rear and which extends the full distance between the opposite carriage ends 111. The wide sweep of introduction which the shown and described structure provides, facilitates introduction of all commonly used weights of paper with extreme ease and without detrimental buckling tendency; yet the bend given the work-sheets produces just enough friction to cause them to remain in position upon introduction. Said paper shelf is fastened at the rear to a square bar 187 fast on the carriage, and ends at the front in spaced sections 184 having vertically bent tabs 184a for securement to the square bar 181 by shouldered screws 188, see Figures 3 and 22. The said guiding elements 185 are situated between the gaps 191 formed between the sections 184, see Figure 22, and are laterally intermediate the feed-rolls 168. They, as seen in Figures 22 and 30, are formed at the rear with upwardly and downwardly offset tines 190 to clip onto the paper shelf 186, and at the front they have each a sharp angular bend downwardly and rearwardly for securement to the front of the bar 181 by screws 189, see particularly also Figure 27.

The feed-rolls 168 are withdrawn slightly below the guiding elements 185, but because the work-sheets S in being front-fed have a tendency to flex downwardly between said guiding elements 185, they tend to get caught or fouled on the front sections 184 of the paper shelf 186. Moreover, they also tend to contact with the feed-rolls 168, the latter of which if contacted obviously offer considerable resistance. Especially work sheets which are of light weight, and/or notched or punched along the introductory edge, as for accommodation into binders or files, have the above tendencies, but even straight-cut work sheets when their edges become curled, nicked or torn, as from repeated handling, will tend to be troublesome. Provision is therefore made to assure, in all cases, smooth, substantially resistless guidance of front-fed work-sheets S rearwardly underneath the platen and onto the paper shelf. Drawing attention especially to Figures 22 and 27, to this end there is accommodated at a circumferentially reduced, intermediate section 168a of each feed-roll 168, a deflector element 192, each such element having a narrow sheet-deflecting shelf 192a nested closely to the platen when said feed-rolls 168 are in applied position, but moving an appreciable distance from the platen when the feed-rolls are cast off, that is when the carriage is conditioned for front-feeding work-sheets as seen in Figure 8. The deflector shelves 192a move downwardly a lesser distance than the feed-rolls 168, and in fact said shelves will come to lie slightly above these feed-rolls and will thus guide the paper with some clearance over the rolls. The deflector elements 192 are formed of narrow strips of sheet metal and comprise each a main vertical leaf 193 which at the top has a four-sided cage bent therefrom, in which is accommodated the reduced feed-roll section 168a. A top side of said cage consists of said deflector shelf 192a, and another side 192b underlies directly the reduced feed-roll section 168a. Each of the deflector elements 192 has a vertical slot in the vertical portion 193 thereof, and the screws 188 which fasten the front-end of the paper-shelf to the bar 181, are shouldered to provide guides and mount the various deflector elements 192 for vertical sliding movement. To keep said elements 192 in straight position they have each at the bottom-end thereof, see Figure 27, a lug 193a piloted in a vertical slot 194a provided in a plate 194 overlying one of the bent-down tabs 184a of the paper-shelf 186, said plates 194 and tabs 184a being firmly clamped to the bar 181 by the shoulders of said screws 188. Preferably the vertical leaf 193 is slightly bowed to enable the screw 188 to keep the element 192 frictionally in whatever position it is moved to, and to prevent rattling thereof. In operation, when the feed-rolls 168 are being applied, the reduced sections 168a thereof contact the shelf 192a within said cage to lift the deflectors upwardly to the position seen in Figure 3. During the release of said feed-rolls 168, the deflector elements 192 will be imparted a downward movement by engagement of the reduced feed-roll sections with the lower wall 192b of said cage, but such downward movement will commence only after the feed-rolls have withdrawn below the deflector shelves 192a, the final relative positions of the parts being as illustrated in Figure 8, affording smooth guidance to front-fed sheets clear over the rolls 168, and without any possibility of getting fouled.

There are instances where the work calls for introduction of very short forms, such as checks, behind a statement sheet with a portion thereof projecting to one side of the statement sheet. If the projecting portion of the short form does not reach underneath the feed rollers 168, the lower edge thereof has the tendency to flex away from the platen. In such case there may be applied one or more guide fingers 199, such as one shown in Figure 6 near the left end of the front-feed table 170. The finger 199 is preferably made of transparent, thin flexible material and may be carried on a clamp 199a for ready application and adjustment along the bar 171 on which the front-feed table is carried. The fingers 199 constitute flexible extensions of the front-feed table downwardly around the front of the platen and a short distance rearwardly. The fingers 199 find useful application also in many other circumstances.

7. *Manual front-feed conditioning*

The front-feed table 170 and the feed-rolls 168 are movable to front-feed position by an operating handle 195, see Figures 1 and 5, carried upon a composite slide structure generally designated by the numeral 196, Figures 5, 6, 8 and 11, and consisting of a flat stamped-out slide 197 and a stiffening angle member 198 riveted or spot welded to the former as indicated in Figure 5 at 200. The composite slide 196 is carried upon the right side wall 111 of the carriage, slightly spaced therefrom, by means of three headed screw-studs 201 extending through slots 202 in the slide 197. Accommodated between the slide 197 and the carriage side wall 111 is a link member 203 which at its forward end has a pivotal connection, as at 204, with a stud 205 projecting from and rigid with the right end-plate 173 of the front-feed table 170, said stud 205 reaching through a clearance aperture 206 in the right carriage end 111, see Figure 5, and in conjunction with said aperture affording limits for opposite movement of the front-feed table and the operating slide. Near the rear end, the link 203 is slotted as at 207 for guidance upon a shouldered stud 208 having a retainer head. In the rearward position of the front-feed table, see Figure 5, a laterally bent-off rear-end 210 of the link 203 is directly in front of an operating pin 209 projecting from the slide 197. Therefore when the operating handle 195 is imparted a forward movement, said link 203 will be displaced forwardly by the pin 209 to swing the front-feed table 170 to front-feed position seen in Figure 8. In order to release the feed-rolls 168 from the platen at the same time that the front-feed table 170 is displaced forwardly, the aforesaid feed-roll releasing shaft 176 extends and has affixed thereto, outside of the right carriage end, as seen in Figure 5, an upright arm 211 having a forked end 212 embracing a projecting pin 213 on the slide 197. The composite slide 196 is resiliently retained in its rearward position by means of a spring 214 anchored to the adjacent carriage wall 111. In turn the link 203, and therefore also the connected front-feed table 170 are resiliently urged rearwardly by a spring 215.

To retain the front-feed facilities in front-feed condition after movement thereto, there is provided a latch arm 216, pivotally supported upon the carriage as at 217, and having a bent lug 218 thereon to catch behind a shoulder 219 on the slide 197 as such slide approaches its forward limit position. The aforesaid stud 208, aside from giving guiding support to the link 203, gives also guiding support to the rear-end of the latch arm 216, the latter being provided with a guiding slot 220 cooperative with said stud 208.

Forward movement of the slide 196 has the effect of immediately beginning the cast-off of the feed-rolls 168, wherefore front-fed work sheets S are free for removal at the earliest possible moment, and, as will be pointed out later herein, the front-fed work sheets are also freely removable if the front-feeding device is moved only partially toward front-feed position.

8. *Manual restoration of front-feed device*

The front-feed device is restorable to normal condition under control of a carriage supported key 221 constituting a part of a lever 222 pivoted as at 223 to the adjacent carriage wall 111, and having a rearwardly extending arm 224 underlying a lateral tab 225 on the latch arm 216. Said lever 222 is given guiding support and is limited in its motion near its key-end, by means of a pin and slot connection 226 with the adjacent carriage end. A spring 227 resiliently maintains the key 221 in the normal position as seen in Figures 5 and 6. It will be seen that depression of key 221 will cause the restoration of the front-feed device to normal condition by effecting an upward displacement of the latch 216 and thus giving the slide 196 over to the power of its restoring spring 214, the front-feed table 170 being resiliently drawn rearwardly by the springs 215.

9. *Locking and timing devices for front-feed device*

Provision is made whereby the front-feed table cannot be moved into conflicting range with the type-bars 10, 11 and 12 by manual force applied directly thereto. This is to prevent injury to said type-bars and/or the table 170. To the above ends, see Figure 5, the operating link 203 for the front-feed table 170 has a shoulder 231 which is normally blocked by an ear 233 on the rear-end of a blocking arm 230 pivotally mounted on one of the studs 201 which guides the composite slide 196. The shoulder 231 is normally slightly to the rear of the ear 233, as in Figure 5, to allow some forward displacement of the front-feed table, but not into the operating range of the type-bars. A spring 234 normally holds the blocking arm in potentially effective position with the ear 233 engaging the underside of the link 203. Provision is made so that incident to initial forward movement of the slide 196 by the handle 195, or by power, said blocking arm 230 is cammed downwardly to an ineffective position. Such provision consists of a lug 235 on the blocking arm 230, engageable by a protuberance or swell 236 on the slide 197 during the initial forward movement of the latter to displace the blocking ear 233 clear of the moving path of the shoulder 231.

In restoring the front-feeding device to normal condition under control of said key 221, or automatically in a manner yet to be described, it is desired that the feed-rolls 168 be applied in advance of the rearward restoring movement of the front-feed table. This is to assure clamping of the front-fed work-sheet or sheets S in the positions in which they are presented by the operator down the rear-side of the front-feed table, and particularly to prevent the front-feed table 170 from disturbing the paper while the lower edge thereof glides rearwardly and upwardly over the paper. For this purpose, the blocking ear 233 of the arm 230 snaps at the end of the forward displacement of the slide 197 behind a rear shoulder 238, the protuberance 236 and the slide 196 having by this time moved clear of the lug 235 to permit this. See Figure 8. It will now be seen that freeing of the slide 196 for rearward movement, as by depression of the key 221, will first result in a rearward movement of the slide 196 under the power of the restoring springs 214, while the operating link 203 connected to the table 170 is temporarily detained by the blocking arm 230 at 238. As the slide 196 approaches its rearmost position, the protuberance 236 cams the blocking arm 230 free of the link shoulder 238 to allow it to be drawn rearwardly by the spring 215. The restoring movement of the front-feed table thereon is further delayed and impeded by the provision of an air dash-pot 240, not only to assure that the front-feed table 170 will move softly and noiselessly to normal position but also to assure that it will practically not move until after the worksheet S has been firmly gripped between the platen and the feed-rolls 168. For soft and controlled action, also the slide 196 has a dash-pot associated therewith. This dash-pot is numbered 241 and allows faster movement than the dash pot 240. Each dash-pot has an adjustable air-vent 242 for giving it the desired movement impeding action.

To assure always full restoration of the front-feed device, an arm 250 of a bail-structure at the rear of the machine not yet described, carries a roll 243 wherewith there is associated a pivoted element 244 having a short cam-face 244a for contact with the roll 243. Said element is under tension of a spring 245, and the face 244a is designed to act on the roll only as the slide 196 approaches its normal rear position seen in Figure 5, the cam-face having a dwell continuation 244b.

10. *Automatic front-feed conditioning*

The front-feeding mechanism is also movable to front-feed condition under the control of the carriage through action of the machine cycling mechanism, as will be described presently. Referring more especially to Figures 3 and 5, and 11 to 19, the carriage 2 carries along the rear thereof a bail comprising a bar 246 of generally right angular cross section, being at its ends rigidly carried on the lower ends of two spaced arms 247, the latter having pivotal supports on the opposite carriage ends 111, as at 248. The arm 247 at the right end of the carriage is part of a lever having an upreaching arm 250 operatively associated with the rear end of the slide 196 by a pin-and-fork connection 251. The said bail is normally positioned as shown in Figures 3, 5 and 15, and automatic actuation thereof, for conditioning the front-feeding device, rearwardly, is effected through rearward actuation of a roller 253 by the machine cycling mechanism, subject however to carriage control of the roller 253 into cooperative range with the bar 246. Such carriage control of the roller is exercised by one or more cam elements 280 provided on the bail bar 246, through the medium of a coupling device generally designated by the reference numeral 252. Said coupling device includes a roller 281 carried on the rear end of a lever 283 which, as considered with regard to Figure 15, is adapted to be rocked clockwise by any cam element 280 passing or riding onto the roller 281. The lever 283 is pivoted on a stud 284 provided upon a bracket 285 attached to the framework of the machine. The same stud 284 gives also pivotal support to another lever 286 which by a spring 287a arranged intermediate both levers is resiliently urged to move unitarily with the lever 283 in clockwise direction, the lever 283 having an ear 288 whereagainst the other lever is resiliently urged by the spring 287a. From the front end of the lever 286, there projects laterally a guiding stud 278 for an actuating link 256, the latter having an elongate slot 279 for accommodating the stud. The aforesaid roller 253 is mounted in upright position upon an element 254 that is carried on a pivot pin 255 projecting laterally from the link 256. For a purpose to be brought out later, the element 254 is limited in its pivotal motion by a pin 290, and a spring 291 having anchorage oppositely on the link 256 and the element 254 keeps the latter normally clockwise turned into stopping contact with said pin. See Figure 15. The link 256 is at its front end linked to an upstanding arm 259 of a rocking structure 257. The normal position of the parts just described is as in Figure 15, in which the gravity of parts 253, 254, 281, 286, etc., assisted by a spring 256a locates the roller 253 below the bar 246 with the front end of the lever 286 resting on a spring stop 286a. The rocking structure 257 comprises additionally two laterally spaced arms 258 rigidly connected by a web 260, one arm 258 forming a downward continuation of the arm 259, and the other arm being located appreciably to the left. The entire rocking structure 257 is pivoted as at 261 upon two spaced bearing elements 262 of a bracket 263 fast on the framework of the machine. The roller 253 and the parts leading thereto from the rocking structure 257 are disposed substantially at the middle of the machine, but operating means for the rocking structure, presently to be described, is disposed to the left of the system of type-bars, substantially in the plane of the crank disk 101 of the cycling mechanism. The left arm of the rocking structure 257 has connected thereto, as at 264, a slide 265 provided near its front end with a slot 266 giving it sliding guidance upon the machine frame in conjunction with a frame-supported stud 267. The forward end of the slide 265 carries an upright extension 268 which reaches into the orbit of an actuating roller 270 on the crank pin 102 of the cycling mechanism. During a later part of each machine cycle, when the type-bars have nearly receded to normal position, the cycle actuated roller 270 wipes forwardly and upwardly against a flange 274 integral with the extension 268 and padded for silent action by a leaf spring 273. In doing so, the slide 265 is given a forward displacement resulting in a rearward movement of the roller 253, with the effect that an operation of the bail bar 246 rearwardly by the roller 253 will result if the rear of the link 256, and therefore the roller 253, has preparatorily been raised by action of a cam element 280 on the roller 281. The link extension 268 which reaches into the orbit of the actuating roller 270 is pivotally mounted on the link, but, for the reason of a lug 271 underlying the link, moves during all normal operations of the machine unitarily with the slide, a spring 272 serving to maintain the abutment 271 in contact with the underside of the link. The reason for the pivoted extension 268 is to provide for idle yield in case a repair man should turn the crank disk 101 backwardly. The slide 265 and associated parts are yieldingly urged to their normal positions, shown in Figure 15, by a spring 275, such normal position being determined by a stop pin 277 on one of the bracket elements 262. To provide for quiet, shockless return of the just described cycle-actuated parts, the rocking structure 257 has connected thereto a return impeding air dash-pot 291a, see Figure 15.

It is conceived to latch the roller 253 in actuating range with the bar 246 as the cam element 280 rides onto, or over the roller 281. As depicted in Figure 17, the front-feeding device may thus be conditioned for opening operation as or before the carriage reaches a position in which the cycle mechanism is to be activated for opening the front-feeding device. To this end the roller 253 has a top rim 307 which as the roller is raised, see Figure 17, engages and glides upwardly, transversely over a beveled edge 308, to latch or catch over the bar 246. It will be remembered that the roller-supporting element 254 is under clockwise urge of the spring 291, and the pin 290 limits turning of such element. In being lifted into operating range with the bar 246, the said spring 291 allows the roller and its supporting element 254 to yield forwardly, and finally is instrumental to cause the roller flange 307 to catch over the bar 246 and maintain the roller 253 coupled to the bar, for subsequently operating the latter rearwardly during a machine cycle as illustrated in Figure 18. At the end of each machine cycle in which said bar 246 is actuated, and providing there is then no cam element 280 operative on the roller 281, the normal position of the roller 253 and operating parts therefor, depicted in Figure 15, will become re-established, the flange 307 at the very beginning of the restoring movement of the roller clearing the bar 246 and allowing the dropping off of the roller 253 therebelow.

Figure 16 illustrates the actuating mechanism for the bar 246 operated idly, the roller 281 having not been contacted by a cam 280, and the roller 253 consequently not having been raised and coupled to the bar, there having resulted an idle rearward actuation of the roller 253 below the bar.

The cam elements 280 are constructed as best seen in Figures 12, 13 and 18, and comprise each, a main body 292 struck up from sheet metal and having a vertical wall 293, a wide top flange 294, and two spaced bottom flanges 295, said flanges being bent horizontally from the vertical wall 293. To the wall 293 there is riveted, as shown, a cam-block 298 which has a bottom face 296 sloping downwardly and rearwardly, and has also side faces 297 beveled toward said bottom face, said vertical wall 293 conforming substantially with said faces 296, 297 at the rear of the cam block 298. The said flanges 294 and 295 have at spaced points along the bar 246, studs 300 reaching towards each other into longitudinal grooves 301 provided oppositely in the top and bottom side of the bar 246. In a space formed between the said flanges 294 and 295 at the rear of the bar 246, the control element 280 carries a folded-over spring-leaf 302, see Figure 12, that is movable therewith by reason of thumb screw 303 which is threaded into one leg of the spring leaf. It will be seen that the control element 280 can be moved along the supporting bar 246 to any desired position and that the thumb screw 303 can be tightened to press the spring 302 into firm element-holding contact with the bar. As will become evident during further description of the machine, it is sometimes desirable that more than one element 280 be provided along the bar. Also it is desirable to provide for convenient removal and application of the elements 280. To this end, the bar 246 has transverse grooves 304 near opposite ends of the bar, see Figure 12, providing exit clearances for the studs 300, rendering the elements 280 removable if moved to bring the pins 300 thereon opposite said grooves 304. A scale 305 aids in locating the elements 280 in proper positions along the bar, the elements being provided with pointers for cooperation with the scale.

The requirement in different business systems varies as to when in the course of the preparation of records, front-fed sheets require removal from the machine, and/or as to when and under what conditions the machine should become conditioned for front-feeding sheets. The present machine is constructed with a view of taking care of a virtually unlimited variation of requirements and so that some simple adjustments adapt it readily for these different requirements. Where it is desired to open the front-feeding device automatically substantially incident to the return of the carriage, a cam element 280 may be provided in the last active printing column, so that a machine cycle instituted in this last printing column will automatically open the front-feeding device, giving the operator the opportunity to remove one front-fed sheet and substitute another during the ensuing carriage return. Other work requires the opening of the front-feed throat in one or more intermediate positions of the carriage. In such cases the cam element 280 may be arranged to raise the roller 253 into cooperative relation with the bar 146 during advance travel of the carriage to the columnar position or positions in which the throat is desired to be opened upon the next succeeding cycle.

As will be brought out in a special chapter, the machine of the invention includes mechanism for effecting return of the carriage optionally to any one of several columnar positions defined by certain columnar control dogs 107. If the nature of the work requires, the front-feeding devices may be conditioned automatically as a result of only such carriage returns which are beyond a certain columnar position. For such a requirement, the coupling control element 280 is given a position on its supporting bar to couple the actuator roller 253 to the bail bar 246 only in the event the carriage is returned beyond the said position. Where the nature of the work requires the carriage to be returned always to the same position, and where such work calls for throat-opening at the end of the return, the coupling action may occur at any time during the return movement of the carriage. Regardless of when in the course of return travel the cam control 280 may function, the carriage is always given an excess return movement, and settles finally back to the position defined by a control dog 107. In doing so there may be instituted an automatic cycle by automatic cycle instituting tappet 106 on the active dog 107, thereby to effect an automatic opening operation of the throat during a late part of the cycle. Incidental to such throat-opening cycle the carriage will tabulate in the usual manner to the next columnar position, in which the first printing and/or computing operation may occur.

The machine of the invention preferably includes also provision, not shown, for arbitrary selection of different programs of tabulating jumps for the carriage, substantially in accordance with said Patent No. 2,194,270 to Sundstrand. In association with such provision, a throat-opening control 280 may be so positioned as to couple the roll 253 to the bar 246 incidental to advance travel of the carriage past a certain point, but the actual opening operation of the front-feed device may ensue later when the machine is cycled in the next tabulating column reached in accordance with the selected program of tabulations. The machine may also embody provision for express tabulation of the carriage to a specific column, idly past other columns, under control of an express tabulator key, as exemplified in the patent to Anderson, 2,330,660, dated September 28, 1943.

The cam elements 280 are adapted to act upon the coupling mechanism while the carriage travels in either direction, for which reason in some machine set-ups the front-feed mechanism will open in consequence of carriage advance as well as carriage return movement. Obviously, the controls 280 may be constructed to by-pass in one or the other direction of carriage travel if this should be desirable.

The above examples of use to which the machine may be put are only illustrative, and in fact the machine is adaptable for innumerable other conditions and/or requirements.

The beveled side faces 297 and the bottom face 296 on the cam-block 298 are provided to make possible full closure of the front-feed throat in the event a cam-block should be moving forwardly while approaching a coupling position opposite to the roller 281.

The bottom face has a further purpose which will be disclosed in a chapter entitled: "Normalizer key, and heading balances."

11. *Automatic restoration of front-feed device*

It is an important feature of the invention to provide for automatic restoration of the front-feeding device fully independently of the control mechanism which conditions the front-feeding device for opening operation. In the embodiment of the invention shown, the front-feeding device is restored under the supplemental control of the carriage and the cycle-instituting means, the latter of which may be automatic and manual. It will be recalled that the front-feeding device is detained in open condition by a latch arm 216 on the right carriage end in cooperation with a shoulder 219. Said latch arm 216, see especially Figures 5, 8 and 20, has a downwardly reaching branch 312 integral and pivoting therewith, and constituting a part of a unitary bail-structure including at the left carriage end an arm 313 and including further a bail-bar 314 extending parallel the full length of the carriage. The arm 313 is pivoted to the left carriage end as at 315 so that the bail 314 is swingably displaceable rearwardly. This is in order to cause restoration of the front-feeding device to normal position. The entire bail structure tends to assume the normal position seen in Figures 3, 5 and 20, under the tension of a spring 216a, see Figure 20, pulling forwardly on the arm 313. The bar 314 is grooved along its front and back, as at 317, for attachment and adjustment of clips 318 therealong. The clips 318 are provided in desired positions along the bar to afford projecting faces 322 on the bar and thereby to render the bar operable under positional control of the carriage by an operating pin 321 on a horizontally disposed lever 320. Said lever is pivoted as at 323, see Figure 20, to the framework of the machine and is actuatable by another lever 324 which lies in a vertical plane, is pivoted to the framework as at 325, and is forcibly actuated at the beginning of each machine cycle by a stud 326 on the aforedescribed disc 101 which in response to each cycling tripping operation is given one complete revolution. Said stud 326 wipes against a cam face 327 at the outset of the machine cycle but it will be evident that a rearward displacement of the bail bar 314 and a consequent liberation of the slide 196 for rearward movement by the spring 214 to effect restoration of the front-feeding device will only ensue in those carriage positions in which a clip 318 is opposite the lever pin 321. In such carriage positions wherein no clip 318 is present opposite the lever pin 321, the lever 320 will be operated idly, and should the front-feed device be open at the time, it will continue to remain open. The lever 320 is urged to its normal position by a spring 330 and normal position of both the levers 320 and 324 is established by a stop 331. The lever 324 receives its displacement by the pin 326 at the very beginning of the cycle so that the front-feed table 170 will get out of the way of the type-bars 10, 11 and 12 in ample time. A dwell continuation 328 of the cam 327 gives ample opportunity for the slide structure 196 to start its restoring movement. The clips 318 are provided along the bar 314 to lie opposite the operating pin 321 in all those carriage positions in which the type-bars are liable to rise in the particular set-up of the machine called for in each instance. In some applications the front-feed table 170 need extend only along the carriage for a distance substantially equal to the width of front-fed sheet and the types are liable to conflict with the front-feed table only in those positions of the carriage wherein the type-bars are opposite the table, wherefore no clip or clips 318 need to be provided for the other carriage positions.

In Figure 5a is shown a front-feed table 170 which only extends for a portion along the carriage, and the type-bars 10 are indicated as having risen to printing position at the left of the front-feed table, as for typing on the portion of the indicated record sheet R which extends leftwardly of the statement sheet S. The type-bars may also rise to the right of the indicated statement sheet while the front-feed table is in a forward position. So long as the front-feed table 170 is not in or is not advancing into the operating range of the type-bars 10, 11 and 12, such table can be moved to, or can remain in front-feed position, facilitating removal and introduction of front-fed sheets without loss of time and while other operations are in progress. A cutaway front-feed table such as shown in said Figure 5a may also be used, for example, where the machine is outfitted to perform automatic multiplication in accordance with the patent to Atwater No. 2,308,259, of January 12, 1943. In this Atwater machine a succession of adding cycles occur in different columns, automatically under carriage control, to the end of effecting multiplication. There is no cause for the front-fed sheet to include the columns in which the multiplication process is being carried out, so that the front-feed table 170 may be narrow, and may be moved and may remain forward in all those columnar positions where the multiplication process is taking place. Most advantageously, a change of front-fed sheets can thus be effected while the multiplication process takes place, it being understood that a cam 280 may be provided for rendering the front-fed device open at or immediately after the carriage has entered the multiplying zone, and that the front-feed device may be caused to close under control of a clip 318 at the conclusion of the multiplying operation.

Referring to Figures 20 and 21, the clips 318 are of channel-like form, comprising, a bottom wall 333 and a top wall 334, joined by a front wall affording said projecting face 322. The bottom wall 333 ends in a goose-neck spring finger 335 for engagement in the rear groove 317 of the bar 314. The clip is applied to the bar by setting the rear edge of the wall 334 into the front groove 317, and then imparting an upward thrust to the rear portion of the clip until the spring finger 335 detents in the rear groove 317.

To satisfy various requirements, clips of different lengths are supplied for attachment, and several of these clips may be attached in line to afford a continuous projecting face of any desired length on the bar.

As a guide for properly locating the clips 318 along the bar, a front cover 319, see Figures 1 and 6, has a scale 319a impressed thereon in appropriate co-relation with the scale 109 for the control dogs 107, see Figure 3, and the scale 305, see Figure 12, for the throat opening control elements 280.

From the foregoing it will be seen that the front-feed device can be caused to open automatically, and also can be caused to close automatically, in whatever carriage positions such operation may be desirable in accordance with the particular requirements of each installation. Always the front-feed device opens during the last part of the cycle, and closure always occurs at the very beginning of the cycle before the type-bars rise.

12. *Normalizer key, and heading balances*

The machine includes a normalizer key 382 and mechanism controlled thereby, substantially as disclosed in said patent to Sundstrand No. 2,194,270. This normalizer key, when depressed, is effective to incapacitate the mechanism whereby usually in response to each machine cycle there ensues a tabulating step of the carriage from one columnar dog 107 to another, as explained with reference to Figure 7. The normalizer key, see Figure 7, is mounted for vertical movement from a normal to a depressed position by means of frame-supported pins 383 reaching into slots 384 of the key, one of the slots being widened at the top to form a key-locking shoulder 385 for catching underneath one pin 383 under the tension of a key-restoring spring 386. The key 382 is operative on a lever 387 which by means, not shown, but fully described in said Sundstrand patent, operates upon a transversely disposed lever 388 to swing the left lever-end rearwardly. Whenever this takes place the rearwardly swinging end of the lever 388 operates on the lever 126 of the cycle-operated tabulating mechanism to swing its left end rearwardly out of range of the cyclically operated vertical slide 125. Thus the cycling mechanism is then unable to induce a tabulating motion of the carriage. The normalizer key is releasable by giving it a slight rearward thrust. Operation of the normalizer key deprives the machine of some of the functions which are normally performed under control of the tappets on the columnar dogs 107, particularly those whereby certain of the registers are automatically selected for operation.

It is the practice in many business establishments to forward the balances of a group of accounts to new sheets from time to time successively, sheet after sheet and without intermediate postings. Since such forwarding balances are always to be entered in the same column, it is advantageous to have the carriage localized while doing such work. Obviously the normalizer key aforedescribed can be utilized to do this conveniently and expeditiously, it being merely required that a dog 107 be set in the required columnar position, and to station the carriage under control of this dog, and that the normalizer key 382 be set to locked position.

Inasmuch as for such work the introduction of the work-sheet requires opening of the front-feed device, and inasmuch as after each posting of the forwarding balance the sheet requires removal, the operator sees to it that after localizing the carriage a throat opening clip 318 and a throat closing control element 280 are respectively opposite the pin 321 and the roller 281. This is easily done by merely setting the clip 318 and the element 280 opposite the positions on the scales 319a and 305 corresponding to the position of the active control dog 107 indicated by the scale 109.

The machine having been so conditioned it will be evident that upon each successive cycling operation instituted by a depression of the cycle key 5, the front-feed throat will always open near the end of the cycle when the roller 270 on the cycling disk 191 wipes past the spring-leaf-faced flange 274, and that the throat will always close when the stud 326 wipes along the cam face 327 at the beginning of the cycle and before the type-bars rise to printing position.

It should be noted that at the end of each cycle the rimmed actuating roll 253 for the throat opening control bar 246 drops and restores to forward position but that the bar 246 is held in rearward position under control of the open throat latch 216, 218. Thereafter when the throat is automatically closed at the beginning of the cycle, the bar 246 restores forwardly and the cam face 296 on the underside of the cam block 298 will reclutch the rimmed roller 253 to the bar to subsequently operate it again towards the end of the machine cycle.

It is thus evident that the operator in forwarding a balance to each sheet is merely required to insert the sheet down the open front-feed throat, index the balance amount to be forwarded, operate the cycle key, and remove then the sheet, the front-feed device automatically closing and opening respectively at the beginning and end of each cycle without the least attention by the operator.

13. *Partial opening of front-feed device*

In many record making systems a record sheet R receives some entries after all entries on the statement sheet S have been completed. To expedite the work it may thus be desirable to provide for removal of front-fed sheets S while entries on the record sheet are still continuing on a line. To provide for such removal of front-fed sheets, it is conceived to open the front-feed device partially as the carriage passes through a certain zone, but insufficiently to place the front-feed table 170 into obstructing relation with the type-bars which might rise. More particularly, the invention provides that such partial opening of the front-feed device be effected automatically as the carriage passes a certain point in its travel and that restoration occur thereafter automatically as the carriage passes a succeeding point. This partial opening feature is brought out in Fig. 11, in which a cam plate 337 on the bail bar 246, see also Figure 12, at the rear of the machine, has been rearwardly displaced by contact with a roller 338 mounted on an upright extension 340 of the stationary bracket 285. Said cam plate 337 is carried on a body 341 similar to the body 292 of the cam element 280, for adjustment along the bar 246 and, as seen in Figure 12, includes cam-ends 342 joined by a straight edge or dwell 343 that is parallel with the carriage. Whenever in the course of carriage travel the cam-plate 337 rides on the roller 338, the bail bar 246 becomes partially displaced rearwardly, see Figure 11, causing sufficient forward displacement of the slide structure 196 to throw the feed-rolls 168 slightly off the platen, and to displace also the front-feed table 170 slightly forward through operation of the link member 203. Two spaced pointers 339, in association with the scale 305 indicate the range over which the cam plate is active. With the front-feed table 170 and the feed-rolls 168 positioned as shown in said Figure 11, there is substantially no resistance offered to the removal of front-fed sheets, and removal may be effected at will and without the platen being turned by the drag of the sheet, and without disturbance to any record sheet that might be underlying it. The mere partial opening action imparted to the front-feed device does not dislocate the front-fed sheet with relation to the typing line inasmuch as the inherent tendency of such sheets to straighten, causes them to bind against the front-side of the platen by reason of the relative positions the feed-rolls 168 and the front-feed table occupy with respect to the platen. Thus, the front-feed device may open partially for optional removal of a front-fed sheet, and moreover, no special provision is necessary to prevent partial, idle opening during travel of the carriage in the direction opposite to that in which the front-feed device is required to be opened partially.

Whenever the carriage passes out of the zone defined by a cam plate 337, the restoring spring 214 for the slide 196 will cause the front-feed device to return to normal position, it being noted that incident to partial opening, the front-feed device will not be detained by the latch 216 against restoration. Moreover, in accordance with the arrangement of the lug 235 and the protuberance 236 seen in Figures 5, 8, and 11, the front-feed device upon partial opening thereof to the Figure 11 position can be moved to fully open position by drawing the front-feed table 170 forwardly. This may be objectionable in some applications, inasmuch as it does not assure against clash of the type-bars against the table. With this in view, a slightly modified form of the invention has been devised as illustrated in Figure 10, in which a lug 235a and a protuberance 236a respectively on the blocking arm 230 and the link 203 are so arranged relatively and trimmed that with the front-feed device partially opened by the cam plate 337, as in Figure 11, the blocking ear 233 is still positioned in front of the shoulder 231, blocking forward opening movement of the front-feed device by force directly applied to the front-feed table.

Certain business applications call for two front-feed sheets to be placed alongside of each other substantially in the manner depicted in Figure 31. Since the invention provides for partial opening of the front-feed mechanism without creating a condition obstructing the type-bars 110, 111 and 112 against operation, and since front-fed sheets are held in position upon partial opening of the device, it is possible to remove one front-fed sheet S while other data is entered on another front-fed sheet. This is schematically illustrated in said Figure 31, in which the left front-fed sheet S is shown in the process of being removed, and in which the right front-fed sheet S is shown as being printed upon by type-bars 10, 11 and 12, it being understood that all the feed-rolls 168 are slightly spaced from the platen, but that the right front-fed sheet that is being printed on, is nevertheless bound to the platen.

14. *Line spacing*

It has been stated that the record sheets R which are engaged by the feed rolls 134, 135 receive many successive line entries, whereas the front-fed sheets S usually receive only a single line entry. It is thus required to line space the platen from time to time to advance the record sheet. A line spacing mechanism in the machine operates in principle the same as the one described in the aforesaid patent to Sundstrand 2,194,270 but some modifications in the design of the parts have been made to accommodate the modified, low slung carriage structure of the invention.

Referring to Figures 3 and 5, there extends for a full length of the carriage a blade 345. This blade is pivotally supported at its ends in the opposite walls 111 of the carriage by pintles 346. Outside of the right carriage end a lever 347 carrying a line space pawl 348 is fast on one of the pintles. A spring 350 tends to give a rearward swinging movement to the pawl 348, and the arm 347, but such movement can take place only incidental to machine cycling, and then only under certain circumstances. Specifically, a roller 351 is given at the end of the first half cycle a downward motion, followed later by a return motion. During downward motion of the roller 351 the blade 345, under the tension of the spring 350, tends to follow the roller, and will do so if a movement suppressing prop 352 is moved clear of obstructing relation with the blade. Assuming the prop 352 to have been clear of the blade 345 during the first half cycle, it follows that it will be forcibly returned incidental to the upward movement of the roller 351, this resulting in a line spacing advance of the platen 7 through feeding engagement of the pawl 348 with a line spacing wheel 353. The prop 352 is movable clear of the blade 345 under a number of different controls and circumstances, fully disclosed in the said Sundstrand Patent, No. 2,194,270, to provide for line spacing of the platen at appropriate points in the record preparing procedure. The arm 347 has a uniform sweep, but whether or not and what number of line spaces the pawl 348 is capable to impart to the platen is regulated by a lever 354 which is adjustable to any one of three positions by a controller 355, having graded steps for cooperation with the lever, the latter having a control piece 355a, see Figure 1, and line space indicating tabs 356. A spring-pressed line-space detent 357 cooperates with the teeth of the wheel 353, while knobs 258 at either end of the platen, see Figure 1, may be employed to turn the latter at will.

15. *Provision for line-feed of one sheet independently of others*

Some methods of keeping records require use of laterally spaced front-fed sheets and that only one be imparted a line-spacing movement. Where such operation is required, the line-spaceable sheet S usually receives a group of successive entries on successive lines, subsequent to which the quiescent sheet or sheets will receive total or balance entries on a single line with respect to said group of entries, the quiescent sheet then requiring removal. Before this invention it was customary to employ split or sectional platens to take care of this type of requirement. The platens had to be split at many different locations to suit the forms of the individual customer and it was necessary to build these machines to special order, which raised the cost of these machines. The invention eliminates the use of a split platen for such work, and having now special reference to Figures 32 to 36, a front-fed sheet S required to remain stationary is adapted to be gripped between companion clamp elements afforded by the tongues 163 extending forwardly from the feed-rolls 134 and one or more clamp leaves 361 hingedly movable upwardly for clamping action against said tongues. Said clamp leaves are attachable wherever required between the sheet-guiding elements 185 which underlie the platen, said elements 185 having pintles 332 extending oppositely therefrom at their folded forward ends, and the clamp leaves 361 being formed with socket-forming ears 363 for ready attachment to the pintles 362. The rear feed-rolls 134 and their supports 156 are arranged symmetrically behind the front-feed rolls 168 as depicted in Figure 35. The clamp leaves are applied to the pintles along that portion of the platen where a front-fed sheet S is required to be held during line-spacing operations. In Figure 32 they are applied along the space where the right hand sheet S is situated. They directly overlie the feed-rolls 168. Whenever the front-feed device is conditioned for front-feeding, and the feed-rolls 168 are thus released, said leaves, as seen in Figure 33, are out of contact with said tongues 163 and afford a wide-open front-feed path. Whenever the machine is operated for restoration of the front-feed device, as described hereinbefore, the feed-rolls 168 will be urged to rise under tension of the springs 177, but wherever clamp leaves 361 overlie such feed-rolls, the latter will force the leaves resiliently upwardly into clamping engagement with said tongues 163, for holding the front-fed work-sheet independently of the platen, as seen in Figures 32 and 34. Moreover, such feed-rolls 168 as are underlying the clamp leaves 361, are prevented from rising into contact with the platen, but all the other such rolls will rise as is diagrammatically illustrated in Figure 32, wherein the left sheet S is clamped against the platen and wherein the sheet S to the right is held independently thereof. Viewing Figure 32, it will thus be evident that line spacing motion imparted to the platen will line space the left front-fed sheet S but not the sheet S at the right. The clamping elements 331 have clearances 364 for accommodation of the deflector elements 192.

Use of the clamping leaves is not restricted to the feeding of one front-fed sheet to the exclusion of another, but, obviously, a front-fed sheet may be held stationary by clamp leaves 361 while a record sheet R may be given movements independently thereof.

16. *Tally roll paper supply*

The machine of the invention has facilities for supporting a tally roll 365 at the rear of the sheet supporting table 136, see Figure 3. Said tally roll supporting facilities comprise opposite brackets 366 having studs 367 reaching towards each other for pivotal support of the tally roll, the brackets being slidably carried upon a rod 368 extending between the opposite carriage ends 111, and moreover having legs 370 at their rear to rest against a ridge 371 extending parallel to the carriage and formed on a cover plate 372 which is secured to the carriage above the paper shelf 186. Means, not shown, are provided to lock the brackets 366 to the rod 368 in desired locations therealong as required. Said cover plate curves upwardly at the rear and is removably sprung over studs 273 at opposite ends of the carriage. The tally paper, with or without interleaved carbon paper, as the work may require, is passed over the rod 368, downwardly over the table 136 around the bottom of the platen, and upwardly underneath the top feed-rolls 135. It can be torn off by pulling it against a paper severing edge provided along the rear of the apron 154 which, it will be remembered, shields the supporting mechanism for the feed-rolls 135.

17. *Carbon paper supply and related features*

All work-sheets not exposed at the printing line receive preferably printing impressions thereon through the medium of carbon paper. In some instances cut carbon sheets are employed, but for desired minimum of handling, a continuous carbon paper supply, as from a roll is desirable. Accordingly, there are mounted adjustably along a rod 375 on the carriage, see Figure 3, opposite carbon roll supporting brackets 376 having pintles 377 reaching toward each other for supporting a carbon roll 378. From said roll the carbon paper or ply 379 may be drawn upwardly over the paper table 136 to take the same path as the record sheet R and to face toward it at the printing line. Or, the carbon paper may be passed forwardly and downwardly from the roll, underneath the bottom feed-rolls 134, and upwardly behind the front-feed table 170 and either under or over the top feed-rolls 135.

Preferably the carbon paper is supplied from said roll 378 forwardly underneath the feed-rolls 134, and upwardly for anchorage of a leading end on a removable carbon anchorage fixture generally designated by the numeral 391, see Figures 24 to 26. The fixture 391 comprises a removable unit consisting of two widely spaced end-plates 392 connected by a bar 393 having ends 394 rectangularly bent therefrom and rigidly united with the end plates 392 by screws 395 and 396. A plate 397 is secured to the back of the bar 393, as by rivets, and rises thereabove a short distance to afford a clamping surface for engagement by a carbon-ply clamping rod 398 that is substantially co-extensive with the bar 393. This rod is supported at its opposite ends on members 400 which, as at 399, are pivotally carried on the adjacent end-plates 392, the rod and the members forming a unitary, pivoted bail structure and a contractile spring 401 associated with each opposite member 400 is adapted to urge the rod 398 into clamping association with the plate 397, the leading end of the carbon ply having previously been passed over the bar 393 and between the rod 398 and the plate 397, In certain business applications it is impractical and sometimes unnecessary to use the carbon holding fixture. For that reason it is constructed as a removable fixture. Moreover, for reasons to be pointed out, it is desirable that the fixture swing forwardly incidental with the forward displacement of the front-feed table 170, but in a path and to a degree different than the latter. Accordingly, the end-plates 392 are formed with open saddles 403 to fit over pivot pins 404 projecting inwardly from the opposite side walls 111 of the carriage. Additionally said end-plates 392 are each formed with an open slot 405 for operative association with pins 406 extending inwardly from the opposite plates 173 which support the front-feed table 170. The slots 405 are at the bottom open-mouthed as at 405a, so that the fixture can be dropped readily into position on the carriage, the plate portions forming the saddles 403 at the opposite ends of the carriage being directed downwardly just in front of the usual mounting collars 407 of the platen. See Figures 24 and 25. Detent levers 408, shaped at the bottom to reach at least partially underneath the pivot pins 404, and urged by springs 401 to so reach underneath, serve to hold the entire fixture 391 assembled on the carriage. The end-plates 392 and the detent levers 408 have tapered entrance faces facilitating placement of the fixture upon the pivot pins, the detent levers 408 during such placement being momentarily yielding. The fixture can be removed readily and conveniently by exerting upward pressure thereon and thereby forcing said detent levers 408 from under the pivots 404. Pivotal support for the detent levers 408 is afforded by the screws 396, which for this purpose are shouldered.

When the front-feeding device is in normal position, that is in writing position, as seen in Figure 24, the carbon ply may be in a condition stretched tightly around the bottom and front-side of the platen. When the front-feed device is moved to open position as seen in Figure 25, the carbon anchorage fixture 391, through the pins 406, is also moved forwardly, and slightly slackens the carbon to bulge from the platen, thereby to relieve pressure from the underlying work-sheets S¹ and R, and to prevent smudging of such sheets when they are removed, inserted, line-spaced or otherwise readjusted. The carbon ply is slackened by reason of the particular path through which the fixture swings during the opening movement of the front-feed device. The slackening of the carbon is moderate but yet effective. The carbon ply 379 may serve to make impressions upon an underlying record sheet, or, as illustrated in Figures 24 and 25, may serve to make transfer impressions upon a work sheet S¹ which is front-fed down behind the plate 397, between the carbon ply and the platen, it being understood that the slackening of the carbon provides feeding clearance for introduction of such extra front-fed sheet.

Where several line entries are successively made, and thus the carbon web 379 and the front-fed sheet therebehind are advanced upwardly, some carbon web is drawn off the roll 378. However, when the front-feed device thereafter is opened, and a new sheet is inserted behind the carbon anchorage fixture, the carbon web will become tucked below the platen and the rear feed-rolls 134 by the introduction of such new sheet.

The spring 401, which serves the dual purpose of pressing the rod 398 into clamping contact upon the carbon ply 379 and urging the lever 408 into fixture-holding position, exerts its force below the pivot stud 399 when the rod 398 is in carbon holding position. The clamping rod 398 can be thrown off the plate 397 as indicated in dot-and-dash lines, by pushing finger tabs or flanges 410 of the members 400 rearwardly. In so doing a pin 411 on each member 400 rides over a hump on the upper end of the adjacent lever 408, and is finally caught in a detent notch 413 under the tension of the spring 401. To again apply the rod, forward pressure is applied to the tabs 410, forcing the pin 411 out of detent notch 413 and over the said hump.

The clamp comprising the rod 398 and the plate 397 is released at intervals to draw the carbon ply a short distance upwardly and thereby to secure an unused transfer field for use, the used carbon being torn off against the top-edge of the plate 397.

Usually carriages are of necessity of considerable length, and the rod 398 being relatively thin, the latter preferably is arched to the rear slightly for better clamping contact. To improve the clamping contact of the rod further, spring clips, generally designated by the numeral 414, see especially also Figures 26 and 28, are applicable to the fixture 391. The clips are formed of flexible sheet material and comprise a main body portion or web 415, from which there are bent to double over the web, a main spring prong 416 and two flanking spring prongs 417. The clips are applied to the fixture downwardly over the rod 398 and the plate 397, the lower end of the prong 416 finally bearing resiliently against a beveled bottom edge of the bar 393, and the lower ends of the prongs 417 being forwardly bent to exert rearward pressure on the rod 398. So many of the clips 414 are attached as may be required to firmly anchor the carbon web 379.

18. *Lateral positioning facilities for the work sheets*

The front-fed sheet or sheets S introduced immediately behind the front-feed table 170 are positionable laterally in correct relation to other work-sheets by a left and/or right side edge gage 421, such gages being readily attachable and embodying clamping devices 424, see Figures 1 and 3, including a clamping screw 422 engageable in a groove 423 of the square bar 171. The scale 167 at the top of the front-feed table aids in properly locating these gages.

For locating such work-sheets S¹ as are front-fed down behind the carbon anchorage device 391, see Figures 26 and 28, one or both of the extreme clips 414 are provided with side edge guides 418 which are bent rearwardly from the main web 415 of the clip.

The rear paper shelf 136, see Figures 1 and 3, has overlying it a left and/or right side edge gage 425 of conventional design for laterally locating the rear-fed record sheet R.

19. *Locating work sheets at desired writing line*

The rear-fed sheets R are shoved or rolled into the carriage from the rear thereof while the front-feeding device is preferably in the open throat position seen in Figure 8. For locating such rear-fed sheets at the proper writing line, the bottom edge of the front-feed table 170 may be used as a line finder.

There are a number of methods by which front-fed sheets may be located at their desired writing lines, and the best method chosen often depends on the nature of work which is to be done on the machine, and sometimes also on the choice of the operator.

Front-fed sheets which are to receive a first entry at a fixed distance from the top edge of the work-sheet may be pushed down behind the front-feed table to come even with the top edge of the front-feed table 170. Similarly a work-sheet or form front-fed behind the carbon anchorage fixture 391 may be pushed down to come even with the top edge of the plate 397 of this fixture. Where a sheet S is to receive one or more lines of entries from time to time underneath a previous line-entry and therefore in different line positions, such sheet is preferably positioned by matching the last previous line-entry with the lower edge of the front-feed table 170, such edge for this purpose being the required distance above the writing line when the front-feed table is in the front-feed position seen in Figure 8. At the restoration of the front-feed device, the feed-rolls 168 become applied before the front-feed table swings rearwardly and upwardly to wrap the sheet around the front side of the platen.

If the particular nature of work calls for front-feeding of sheets always to the same position, there may be employed one or more bottom edge gages 428, such as illustrated in Figures 29 and 30. These gages 428 may be in the form of generally V-shaped clasps 429 which are snapped onto as many of the paper guiding elements 185 as may be desirable. The clasps 429 are made of resilient material and include each a detent formation 430 for detenting entrance into a hole 431 provided in the front wall of each element 185. Sheets front-fed behind the carbon anchorage fixture may also be positioned by such gages 428.

For front-fed sheets which are of considerable depth and require to be located variably at different writing lines, it is advantageous to employ adjustable rear-edge stop-means, such as illustrated in Figures 3 and 22, and designated generally by the reference numeral 432. Several of such means 432 may be used at laterally spaced locations and for different sheets. These stop-means 432 comprise each a flexible strip 433 extending fore and aft of the machine and having at a front extremity an upreaching sheet stopping lip 434. Each of the flexible strips 433 is guided in a channel structure comprising, as seen in Figure 23, a wide sheet metal strip 436 upon which there are riveted or spot welded, as at 435, two spaced narrow strips 437, which together with the wide strip 436 form a guide-way indicated by the numeral 438 in Figure 23. Each wide strip 436 has at its forward end below the feed-rolls 168 a downwardly bent portion for securement of the entire channel structure to the carriage by means of any of the screws 188, and in underlying relation to the plates 194.

Each channel structure 435 is carried at the rear on a bracket 440 having two upright, spaced ears 441 wherethrough a shaft 442 extends longitudinally of the carriage, such shaft being turnably carried upon the opposite carriage ends 111. Said shaft 442 carries between the ears 441, a drum 443 having radial teeth 444 for engagement in perforations 445 of the strip 433, to slide said strip and adjust the sheet-gaging lip 434 fore and aft in the carriage to the desired position. The strips 433 are anchored to their respective drums and are adapted to be wound thereon. Each drum has opposite hubs 446 filling the space between the bracket ears 441, and said hubs have set-screws 447 to fasten them in desired positions along the shaft and turnably therewith. The shaft 442 is conveniently turnable by knobs, one being shown at 448 at the right end of the carriage in Figure 1. The channel structures are made to closely overlie the paper shelf 186. To give the channel structure added support the bracket 440 is formed at 450 to reach under the bar 187. From the foregoing it will be seen that the sheet stopping means 432 are conveniently locatable longitudinally of the carriage in different desired positions.

20. *Power return mechanism for carriage*

The work-sheet supporting carriage 2 may be caused to return under the power of the same electric motor 81 that cycles the machine, and such power returns may be instituted either automatically or under manual control. The carriage return mechanism of the invention is an improvement over the one disclosed in the aforementioned Sundstrand Patent No. 2,194,270, to the end of making possible a much greater selection of carriage return runs, and to the end of providing for improved operation, and particularly also shock and noise reduction.

The return drive will first be described. Referring to the plan view of Figure 41, a worm shaft 452 carries on one end a V-belt pulley 453 which, during use of the machine, is constantly driven by the aforedescribed impositively driven element 87 of the machine cycling drive, by a V-belt 454, the element 87 having a belt groove 455. Referring now also to Figure 42, a worm 456 on the worm shaft 452 is in mesh with a gear 457 and drives the latter constantly clockwise as indicated by the arrow. The gear 457 is fast on a vertically disposed shaft 458 which supports slideably splined thereon a toothed clutch member 460 for engagement with another toothed clutch member 461 which is part of a gear 462 rotatively loose on the shaft 458. Said clutch members are normally separated as seen in Figures 42, 50, 51, so that normally no motion is transmitted to the gear 462, which, as seen in Figures 41 and 50, is in constant mesh with a carriage return rack 463 carried on the underside of the carriage rail 114. A horizontal shelf 467 forming part of the machine frame work supports rotatively the shaft 458 at the bottom, whereas the upper end of the shaft turns in a bearing provided in the rail 116. The shelf has an upright branch 466, see Figure 42, wherein the rear end of the worm shaft 452 is turning, the front-end being turning in a frame part not shown.

The clutch member 460 may be shifted into engagement with the companion clutch member 461 by depression of a carriage return key 468, see Figures 1, 2, 48 and 50. The key 468 is on the forward end of a lever 469 which is pivoted intermediate its ends at 470 and which is urged upwardly to normal position by a spring 472 attached to the lever slightly to the rear of the key, see Figure 50. Well to the rear of the pivot 470, as seen in Figure 50, the lever 469 underlies a horizontal part 471 of a member 473 having support for upward sliding movement on an upright branch 474 of the shelf 467, proper guidance being provided for by shouldered guide-pins 477 fast on said shelf branch 474 and situated in slots 476 of the slide. The aforesaid part 471 reaches into an annular groove 479 in the clutch member 460, and it will thus be seen that operation of the carriage return key 468 results in the meshing of the clutch members 460 and 461 and consequently causes the carriage to be motor driven in return direction, that is towards the right as viewed in Figures 1, 41 and 42. The slide 473 remains in closed clutch position independently of whether or not the operator withdraws the finger from the key 468, but description of the manner in which this is accomplished will follow later. It will also become evident that carriage returns instituted under the control of the return key 468 are automatically terminated under carriage control.

Drawing now attention to Figures 43 to 52, at the rear of the machine, there are means provided to close and open the clutch 460, 461 automatically under carriage control. A stud 480 fixedly supported in a bracket 481, see Figures 48 and 50, has rockably supported thereon a unitary structure designated by the general reference numeral 482, and comprising a bail structure consisting of a horizontal arm 484, a vertical leg 485, and connecting web 486. Said unitary structure 482 comprises further a three-armed member 489 having a leg 487 substantially contiguous with the arm 485, and having moreover a horizontal arm 488, the member 489 being riveted fast to the leg 485, as at 491. The said unitary structure 482 includes moreover a stud 493 fast on and projecting forwardly from the arm 484 and operatively connected as at 494 with the vertical slide 473, see Figure 48. A third arm 495 of the member 489 has a stiffening connection with the arm 484, and lends more rigidity to the rocking structure 482. The limits to which the entire structure 482 is rockable is established by the opposite ends of the slide slots 476. From the foregoing it will be seen that if the rocking structure 482 is rocked clockwise as seen from the front, it will close the clutch 460, 461. Conversely, it will be seen that if the rocking structure 482 is rocked anti-clockwise, the clutch 460, 461 will be opened.

The structure 482 is oppositely rockable under carriage control, and to this end the arm 488 thereof carries a rearward projection 500, having an unreaching lug 501, and also a downreaching lug 502, such lugs being respectively engageable for downward and upward displacement by return instituting elements $R^1$, $R^2$, $R^3$, and return terminating elements $RT^1$, $RT^2$, $RT^3$, and $RT^4$, see Figures 43 to 47 inclusive. The elements $R^1$, $R^2$, $RT^1$ and $RT^2$ lie in individual traveling paths, and as can be seen in Figures 43 and 44, the elements $R^2$, and $RT^2$ are normally cooperatively associated with the rocker lugs 501 and 502 for opposite clutch controlling operation to the exclusion of the elements $R^1$ and $RT^1$. In order to associate the lugs 501, 502 respectively with the elements $R^1$, $RT^1$, the rocking structure is mounted upon the stud 480 for rearward sliding movement, to position the lugs in vertical registration with these elements, as indicated in full lines in Figures 45 and 46.

The control elements are preferably carried on a single supporting bar 504 extending lengthwise of the carriage and fixed to the opposite carriage ends 111, the bar having a scale 506 overlying it and correlated to the scales 167, 395 and 319a. Preferably each control element is part of an individual body and each such body may comprise a channel member 505, clearly illustrated in Figure 43 in connection with the element $RT^3$, and fitting the bar 504 around the front, back and bottom for sliding adjustment therealong, the various channel members 505 being each equipped with pins 507 that reach towards each other into grooves 508 provided along the front and rear of the bar 504. Each adjustable body includes moreover, a releasable detent in the form of a slide 511 having a tooth 512 for locking engagement in rack-forming notches 513 of the bar 504. The return instituting elements $R^1$ and $R^2$ and the return terminating elements $RT^1$ and $RT^2$ reach respectively towards each other transversely of the carriage and form each a part of a U bent plate 514 that is riveted or integral with the channel bodies 505. The plates 514 are formed so that the elements $R^1$ and $R^2$ and the elements $RT^1$ and $RT^2$ lie in the aforesaid individual traveling or controlling paths. The elements $R^3$, $RT^3$ and $RT^4$ have preferably wide camming shelves 516 so that they are in controlling association with the rocker 482 in both the forward and the rearward position of the latter. The final return terminating element $RT^4$ is to assure opening of the return drive as the carriage reaches the extreme of possible travel in return direction. It is similar to the element $RT^3$ but, it not needing to be adjusted, it is fixed directly to the bar 504.

The various bodies 505 carrying the control elements are applicable to and adjustable on the bar 504 to any position therealong, and in any desirable order or combination which may include several control elements of the same form. To render the bodies readily applicable and removable, the bar 504 has at the front and rear, at one or both carriage ends, transverse grooves 518, see right end of Figure 43, merging into the longitudinal grooves 508, the grooves 518 constituting entrance and exit clearances for the pins 507.

It will be perceived from Figures 43 to 47, inclusive, that the return instituting elements $R^1$, $R^2$ and $R^3$ are formed for camming engagement with the lug 501 to cam the latter downwardly during advance travel of the carriage, and that the control elements $RT^1$, $RT^2$ and $RT^3$ and $RT^4$ are formed to displace the lug 502 upwardly during return travel of the carriage. Thus with the rocker 482 in forward position, as in Figure 43, there will ensue a carriage return when the element $R^2$ rides over the lug 501 and depresses it. The lug 502 consequently is depressed so that it is in the path of the element $RT^2$ as depicted in Figure 44. Thereafter when the control element $RT^2$ after institution of a carriage return engages and displaces the lug 502 upwardly, the carriage return clutch will be opened again, the carriage settling or advancing thereafter to a columnar position defined by one of the columnar control dogs 107. When the rocking structure 482 is shifted to the rear as depicted in Figures 45 and 46, the carriage return clutch 460, 461 is similarly controlled to close in response to engagement of the return instituting element $R^1$ with the lug 501, and is similarly controlled to open during the ensuing return, by the engagement of the return terminating stop $RT^1$ with the lug 502.

Detenting means are provided to hold the rocking structure 482 in either of its two rocked positions. Moreover, said detent means are constructed to throw the rocking structure slightly beyond the opposite positions to which the return instituting and return terminating elements are capable to displace it. This provides for clear passage of the control elements $R^1$, $R^2$ and the elements RT¹, RT², RT³ when the clutch has been respectively closed and opened.

It is thus evident that the control elements allow overtravel of the carriage beyond the return instituting and the return terminating positions. Thus at any return institution the motion of the carriage is brought to stop and is reversed by the return driving mechanism, such reversal being cushioned by means to be described under a subsequent chapter entitled "Shock cushioning of carriage return mechanism," and being substantially shock-and-noiseless. The reversal of carriage motion at the end of the return is also smoothly accomplished in that the carriage merely outruns its momentum against the usual carriage feed spring, and then settles to the proper columnar position, conventional columnar control dogs 107 being provided to gain control over the carriage after a short settling-back movement of the carriage, but the settling-back movement being insufficient to bring that return terminating element which was just active below the lug 502. This allows reengagement of the clutch. The carriage return instituting elements are usually arranged to function as the carriage is tabulated out of a column defined by one of the columnar control dogs 107.

Referring to Figures 48 and 50 in which the rocking structure 482 is shown in normal, forward position, a detent arm 520 pivoted on a stud 521 has an upreaching angled nose 522 having, as seen from the front, a right face contacting a left face 485a of an angled nose on the lower part of the arm 485 of the rocking structure. The detent arm 520 has a bail extension 524 giving it more stable pivotal support on the stud 521, and collars 526 locate it on the stud 521. A spring 525 constantly urges the detenting nose 522 upwardly. When the clutch is closed, either by actuation of the carriage return key 468, or under control of one of the return instituting elements R¹, R², or R³, the detent nose 522 is displaced downwardly by the face 485a and will thereafter snap upwardly to engage a right face 485b of said angled nose, see the rear view of Figure 52, it being understood that the tension of the detent forces the structure 482 to complete the rocking motion.

Figure 2:
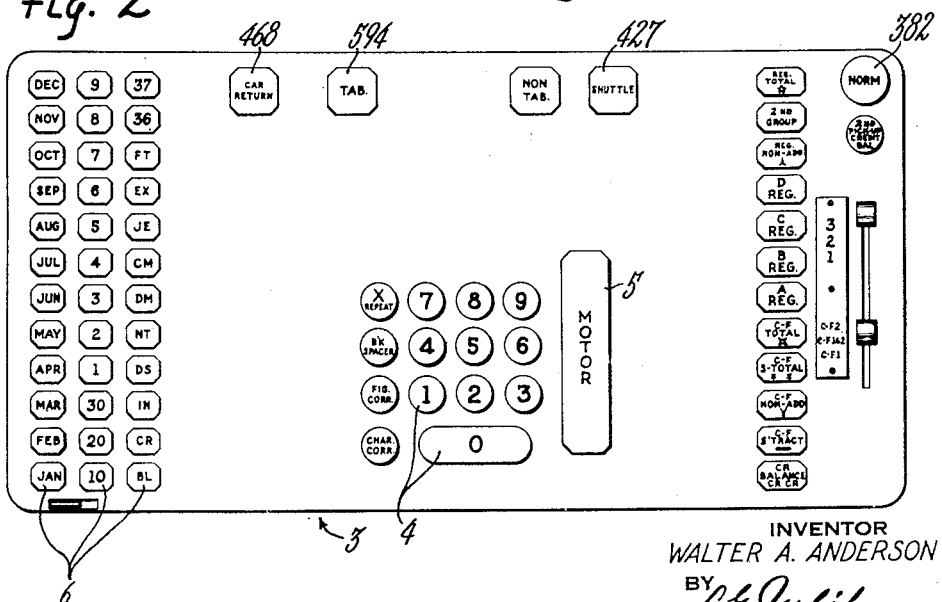
Figure 2 shows in plan the keyboard of the machine seen in Figure 1.

When it is desired to place the clutch controlling rocker 482 into the controlling paths in which the elements R¹ and RT¹ lie, there is operated a key 527, see Figures 1, 2 and 48. This key 527, although marked Shuttle Key in the drawings, serves a much broader purpose than this name implies, and may be more properly named Return Control Modifier. The key 527 is provided on the front-end of a lever 528 that is fast on a pivoted shaft 529 having at the left a down-reaching arm 531, see Figure 48. An arm 533, loosely pendent from a shaft in the machine, carries a pin 534 which reaches to one side in front of the arm 531, and to the other side into a slot 535 in a rearwardly extending link 536, the pin 534 having a retainer head for the link. At the rear, the link 536 is supported for sliding movement in the frame, in a manner not shown, and has a rightward reach 537 into a notch in the clutch shifting stud 493 of the rocker 482. A light spring 540, shown in Figure 48, constantly urges the arm 533 rearwardly, and thereby also the rocker. A relatively stronger spring 541 associated with the key lever 528 is capable of overcoming the spring 540, so that if the key lever 528 is in the normal position of Figure 48, the arm 533 is in forward position, either tending to move or keeping the rocking structure 482 in forward position under the tension of a spring 542 resiliently connecting the arm 533 with the link 536. The normal position of the lever 528, and also the arm 533, is established by a frame-supported pin 544. Operation of the key 527 results in a rearward displacement of the link 536, through the action of a spring 540, and thus results also in rearward displacement of the rocker 482. Assuming that the rocker 482 at the time of operation of the key 527 is in an open-clutch position, as shown in the side view of Figure 50 and in the rear view of Figure 51, the angled detent nose 522 will as a result of such key operation snap from the left face 485a upwardly to engage a left face 487a on the lower end of the arm 487, see Figure 53, the face 487a being upwardly offset a little from the face 485a to provide a catch shoulder. The arm 487 has similarly a right face 487b which is upwardly offset from the face 485b, for the detent to catch therebehind. It will thus be seen that if rearward shift of the rocker 482 is effected with the same being in open-clutch position as seen in Figure 51, the lugs 501 and 502, as illustrated in Figures 45 and 46, will become associated for opposite operation by any return instituting and return terminating control element which respectively lies in the same paths as the elements R¹ and RT¹.

Directing now attention temporarily to Figure 49, the angled nose of arm 485 is recessed at the right side thereof to form a slight rearward extension 547 of the face 487b, this extension providing a catching shoulder 550, and forming a ridge or apex 548 at the juncture with the left face 485a. Whenever after operation of the shuttle key 527 a return has been instituted, either by depression of the carriage return key 468 or under control of one of the return instituting elements, the left face of the detent nose 522 will come to lie in front of the shoulder 550, against the right face 487b, see the rear view Figure 54. Providing now that the operator releases the shuttle key 527 before conclusion of the return, the rocker will be moved slightly to the front by the spring 542 until the rear of the detent nose 522 is contacted by the shoulder 550. During the ensuing carriage return any one of the return terminating elements RT¹, RT³ or RT⁴ that may engage the lug 502 will resultingly rock the structure 482 to open clutch position. If at this time the key 527 is in normal position, the ridge 548 will ride over the point of the detent nose 523 and the rocker will consequently reassume its normal forward position of Figure 48 under the tension of the spring 542.

Whenever at the end of a power return with the rocker in rearward position it is desired to keep the rocker in such rearward position, it is merely required to operate the shuttle key 527 as the power return is being automatically concluded. This will cause the detent nose to glide again onto the face 487b, in front of the shoulder 550, to retain the rocker in rearward position. It is possible also to shift the rocker rearwardly from normal position at any time during an instituted power return, thereby to cause termination of such return by one of the terminating elements in the rear path.

Innumerable carriage returns of different extents and of different ranges may be obtained by use of various arrangements and different positional combinations of the aforedescribed return instituting and terminating elements. This is particularly true in view of the carriage return key 468 and the shuttle or return modifier key 527. Some examples of arrangement will be related merely to demonstrate the versatility of the described carriage return mechanism.

In the control-element organization shown in Figure 43, the normal range of carriage advance and return travel is governed by the return instituting element $R^2$ and the return terminating element $RT^2$. If after a return termination of the carriage under control of the stop $RT^2$, in the manner illustrated in Figure 44, it is desired to extend the return, the operator need merely depress the carriage return key 468. It is to be understood that the momentum of the carriage carries the carriage considerably beyond the active return terminating element, and that the columnar dog 107 related to it is positioned to take control over the carriage without the control element dropping back sufficiently to block clutch closing. The extended return will then be terminated by the element $RT^3$. The same operation may be repeated to extend the return still further to the final return terminating stop $RT^4$. To bring the return instituting element $R^1$ and the return terminating element $RT^1$ into use, the operator may depress the return control modifier key 527 while the carriage is in such a position that the rocker lugs 501 and 502 are intermediate the elements $R^1$, $RT^1$, see Figures 45 and 46. Or, the modifier key may be depressed while the control element $R^1$ is to the right of the lugs 501, 502. The rocker will automatically restore to its forward position upon the first termination of the return by the element $RT^1$, but if it is desired to stay within the range of the elements $R^1$, $RT^1$, the operator need merely depress the shuttle key 527, at the time of or after the return termination, this causing the rocker to be latched in rearward position. Having operated the shuttle key as stated it is subsequently possible to extend the return by operation of the return key 468 for termination by the element $RT^3$. The return may be further extended by again operating the key 468. A return run terminated by the element $RT^1$ and having caused the rocker to reassume normal forward position, can also be repeatedly extended by depression of the return key 468.

The carriage advance travel may be extended beyond the element $R^2$. To do so the operator operates the shuttle key 527 while the rocker lugs 501, 502, as depicted in Figure 47, are past the elements $R^1$, but are not yet in contact with the element $R^2$. This will put the lug 501 into the rear path, for the element $R^2$ to bypass it during further carriage advance and for possible engagement by the return instituting element $R^3$ at such further advance. Subsequently when a return run is instituted, by the carriage return key 468 or by the element $R^3$, the lug 501 will have free passage past the return instituting element $R^1$. This is because closure of the carriage return clutch places the lug 501 always below and clear of any return instituting element. It is possible at any time also to operate the carriage return key 468 and the shuttle key 527 while the element $R^1$ is to the left or in front of the lug 501.

It is thus evident that with the illustrated arrangement many divergent requirements can be filled.

Obviously, if desired, several of the return terminating elements $R^1$ may be provided in advance, that is to the left of the element $R^2$, and the power return mechanism may be made potentially responsive to any of such several elements by judiciously depressing the shuttle key 527 in selected carriage positions. Also here, under no circumstances will any of the elements $R^1$ interfere with return travel of the carriage.

Wherever the work may make it desirable, the control elements can be arranged to give a short normal range and a long abnormal range.

The control elements may be arranged to give adjacent or overlapping ranges of carriage travel. For example, the elements may be arranged in the following order from left to right: $RT^1$, $RT^2$, and $R^2$, and possibly with other desired elements flanking these. In this arrangement it is possible to switch the rocker 482 from the front to the rear position to get into the range of the elements $R^1$, $RT^1$. To provide for advance of the carriage beyond the element $R^2$, the operator merely shifts the rocker to the rear after passing the element $R^1$. In such a setup the elements $R^1$ and $RT^2$ obviously allow respectively free return and advance travel of the carriage.

The above examples of arrangement of the return control elements are, of course, only exemplary and the different actual arrangements possible are practically unlimited.

The shuttle key 527 may have associated therewith other mechanism as set forth in connection with the shuttle key in Patent No. 2,194,270. For instance, at the time the shuttle key 527 is operated the carriage is usually standing in a certain columnar position, and it is usually desired to cycle the machine and tabulate the carriage. Accordingly, see Figure 48, the shuttle key 527 may actuate, as in the patent, a pin 552 which is carried for pivotal movement about the shaft 528 by an arm 553, the pin 552 being in communication with a lever 554 that is associated with the cycle-tripping mechanism disclosed in said patent. Moreover, if desired, said shuttle key 527, through actuation of the arm 553, as in said patent, may capacitate the line-spacing mechanism for operation during the ensuing machine cycle. A keylock for the shuttle key 527 may also be optionally provided.

21. *Carriage return shock cushioning*

The setting in motion of the carriage 2 requires a considerable effort, and it is an objective to start the carriage on its return smoothly and without objectionable shock and noise. Referring particularly to Figures 55 to 58, inclusive, all of which are views showing the mechanism turned over in the direction of the carriage, the carriage return rack 463 is set in motion rather abruptly by the carriage return gear 462 after the clutch 460, 461 has been closed. This is despite the slip-clutch 87, 89 in the motor drive which will slip if the resistance to carriage travel is abnormal. However, the heavy carriage 2 is set in motion relatively gradually by reason of the rack 463 being slidably mounted on the carriage and by reason of it having an elastic motion transmitting connection with the carriage, in the form of heavy springs 560. More particularly, the carriage return rack 463 is provided with a series of slots 561 at spaced locations therealong for guiding movement longitudinally of the carriage by bushings 562 that are carried and held fast on the carriage by means of screws 563 and 563a. By reason of the springs 560, the rack is normally movable on the carriage in carriage return direction only, as seen in Figures 55 and 56. Each of the springs 560 has one end anchored to a pin 564 on the return rack 463, and has the other end attached to an anchorage plate 565 which is connected with the carriage by a shouldered bushing 566 underlying one of the bushings 562 and firmly united with the latter and the carriage by one of the screws 563. A reduced portion of the bushing 566 is contained in a hole of the plate and spaces the head of the screw 563 with a slight clearance from the plate so that the plate is not clamped tight. From the drawings it will be seen that there are fewer springs 560 and plates 565, than there are rack-guiding slots 561. The bushings 562 are of eccentric form and have enlarged hexagon heads 568 for turning them and thereby adjusting the rack transversely of the carriage, at spaced locations, into proper mesh with the carriage return gear 462. The normal lengthwise position of the rack on the carriage is determined under the influence of the springs 560 by stop-forming bushings 571 of fibrous or other sound-deadening material contained in slots 572 provided in the plates 565, and held fast on the carriage rail bar 114 by screws 570. The limits of movement established by the bushings 571 in conjunction with the slots 572 prevent the rack-guiding bushings from ever contacting the opposite ends of the slots 561.

When the carriage return is instituted, either with the carriage at rest or in tabulating motion, the carriage will not immediately commence to travel in carriage return direction, but the springs 560 will stretch to some extent until the inertia of the carriage has been overcome. This is after the rack has been drawn an indefinite but short distance along the carriage, as illustrated in Figures 57 and 58. Then gradually the carriage recovers its normal position relatively to the rack under the urge of the strained springs 560, the latter of which are carefully chosen to strain initially but to recover thereupon as the inertia of the carriage is gradually overcome.

It has hereinbefore been made clear that the return instituting elements R¹, R², R³ never obstruct movement of the carriage in advance direction, but merely are instrumental to cause closure of the carriage return clutch. The carriage therefore reaches no definite stopping position and return movement of the carriage commences at a point where the force of the stretched springs 560 is balancing the combined force of the usual carriage advancing spring and the inertia of the carriage, the reversal of motion being effected smoothly and without objectionable and harmful jar.

Several friction elements 574 are associated with the carriage rack 463 to slow down or impede the movement of the carriage as the latter reassumes normal relation with the rack after the springs 560 start to recover. This is to reduce shock and noise at this reverse phase of operation. The friction elements 574 are in the form of bowed spring leaves clamped to the carriage by the screws 563a along with the associated bushings 562. Said friction elements bear under tension against the carriage return rack, as at 573. The aggregate friction exerted causes the carriage to recover its normal position relatively to the rack at a pace slow enough to minimize the impact of the plates 572 against the fiber bushings 571. The friction element 574 has lugs 575 in slidable contact with the rack 463 to prevent turning on the screw. Inasmuch as the inertia of the heavy carriage is considerable, the relatively light friction of the elements 574 against the rack exerts no appreciable influence to urge the carriage to move with the rack at the outset of the carriage return operation.

22. *Carriage tabulating speed control*

The speed of the carriage during all tabulating runs, whether instituted automatically or by depression of a tabulating key 534, is governed by the speed of the electric motor 81 never to exceed a certain desirable maximum speed. This is to prevent excessive shock incident to arrest of the carriage after extensive tabulating runs. The principle employed is broadly the same as disclosed in the patent to Pitman No. 2,236,608 but certain simplifications have been effected in the structure, particularly in combination with the carriage return power drive, these simplifications having resulted in noise and cost reduction.

Directing now attention to Figures 41 and 42, the continuously driven worm 456 for driving the worm gear 457 of the carriage return drive, has at the side opposite to the worm gear 457 another worm gear 575. This other worm gear and the worm gear 457 are continuously driven, but in opposite directions. A vertical shaft 576 turnably supported at the bottom and top respectively by the shelf 467 and the rail bar 116, carries the worm gear 575 fixed thereon together with an element 577 having an internal cylindrical clutch face 579. Near the upper end of the shaft 576, freely rotatable thereon, is a gear 578 in constant mesh with the carriage return rack 463. Said gear 578 is unitarily rotatable on the shaft with a clutch element 580 having a portion thereof accommodated with clearance within the clutch drum face 579. Several roller elements 581 are accommodated in recesses 582 of the element 580. The recesses 582 are so formed, and the several rollers 581 are under influence of springs 584, to constitute with the elements 577, 580 a one-way grab-clutch, the so constituted clutch grabbing whenever the speed of anti-clockwise rotation of the pinion 578 resulting from tabulating runs slightly exceeds the speed of rotation of the motor-driven worm gear 575. Thus the tabulating speed of the carriage will be held to the speed of the motor-driven worm gear 575, the spiral tooth of the worm 452 preventing speed-up of the electric motor 81 under the power of the carriage draw spring. Of course the size of the worm gear 575 and its rotating speed is such as to hold the carriage to a non-excessive tabulating speed. In the present machine a tabulating speed of about 1 foot per second has been found suitable. The grab clutch 577, 580, 581 releases automatically as the tabulation is concluded. It will also stay released during carriage returns, at which time the clutch element 580 will turn clockwise and the element 577 anti-clockwise, thus loosening the grip of the rollers 581. It will be seen that the organization of the worm gears 457 and 575 and related mechanisms is highly efficient, and that the speed governing drive, due to its directness and the gliding action of the worm, generates substantially no noise. The carriage and the return rack 463 will move in unison during all tabulating runs for the reason that the springs 560 are of sufficient strength to prevent the carriage from being drawn along faster than the rack.

23. *Control plate mounting*

It is desirable to provide for convenient substitution of different dog supporting control plates 108, in order that a machine may be conveniently and expeditiously converted for doing different work. In Figure 4 an improved structure to this end is illustrated with the control plate 108 in the process of being placed upon the carriage, while in Figure 3 the same plate is shown in operative position on the carriage. The plate 108 is of a length to fit closely between the opposite carriage walls 111, and when such plate is in position as shown in Figure 3, it rests on shelves 585 which are in the form of plates riveted to the insides of said carriage walls. Moreover, the plate 108 underlies along its front a ledge 586 of the carriage rail bar 114, and the rear of the plate at opposite ends of the carriage is held down by anchorage pins 587 which are carried on the opposite carriage ends and which can be projected or withdrawn from holes 588 provided in vertical ears of the plate 108 in a convenient manner not shown by the turning of the knobs 589, see Figure 1. The plate is firmly and accurately located by the construction just described and can be conveniently placed upon the carriage by dipping its front down and sliding it forwardly underneath deflecting faces 590 that reach forwardly from the ledge 586, the shelves 585 being formed to provide proper clearance for a dog-locating-rack 591 on the underside of the plate 108. Since usually substitution of one control plate 108 for another also requires a change in the set-up of the carriage return controlling elements and the front-feed opening and closing controlling elements, etc., the plate 108 carries or has inscribed thereupon, a chart with proper indicia for setting such elements to required locations along the appropriate scales.

24. *Improvement for load equalization during machine cycles*

In an earlier part of the description it has been brought out that towards the conclusion of each machine cycle there are usually stressed a great number of springs 61, 78 which are associated with the drive racks of the crossfooters and rear registers to effect tens transfer operations under control of the blocking elements 64. Since tens transfers are usually only occurring with respect to a few register wheels, the aggregate upward force exerted by the strained springs at the beginning of each cycle is very considerable. In fact the force is so great that the type-bars or register actuators 10 have been found to jerk upwardly after the rollers 31 on the crank-arms 26 passed off the dwells 49 on the levers 33 at the very beginning of the machine cycle. This jerk was often so violent that the levers 33 and the cycling mechanism were driven in advance of the motor speed, with the result that in many instances the usual register engaging mechanism, as well as other mechanisms failed to perform their assigned work properly. Aside from the above, the jerky, uneven action has been objectionable from the standpoint of machine wear and noise. Moreover, the load variation having been very great, it has been impractical to use successfully in the cycling drive an overload clutch such as the one earlier described and numbered 85.

It is old in the art to control the operating speed of reciprocating type-bars or register-actuators during certain phases of the cycle, but usually this has been accomplished by placing a load or strain on the machine cycling mechanism, and subjecting the machine to increased wear and tear.

According to the feature of the invention to which this chapter is directed, and with particular reference to Figures 37 to 40, inclusive, there is applied to the type-bars or actuators 10, at the end of each machine cycle and for an initial part of the next cycle, a resilient force that counterbalances at least in part the aggregate force that the transfer springs 61 and 78 exert on the type-bars at the end and at the beginning of each cycle. This resilient force is applied and removed under control of the cycling mechanism without such mechanism having to work thereagainst.

Referring now specifically to Figure 37, the laterally spaced links 35, which connect the upper and lower type-bar restoring rods 25, carry each a roller 596. In the full cycle position of Figure 37 there bears normally upon each of these rollers a spring-load-shifter or link 597, each of which at its front end has connected thereto a strong, downwardly pulling spring 598. These springs are accorded anchorages as at 600 on the machine framework. Said links 597 are pivotally carried by pivot studs at their rear, as at 601, upon two spaced guide arms 602 that are pendant from pivotal supports 603 on the frame for swinging movement fore and aft. They are guided for swinging movement at lower points by pin and slot connections 604 with the framework of the machine. The arms 36 that carry the lower bail rod 25, constitute levers with arms 599 that afford cam-slots 606 whereinto there project rollers 607 that are carried on the aforesaid pivot studs 601. The positions of the rollers 607 as governed by the slots 606 determine the fore and aft position of the links 597 at the various stages in the machine cycle and provide that the faces 608 on the links 597 bear normally on rollers 596 and that upwardly recessed portions 610 in the links 597 are normally slightly spaced above a rest-roller 611, which may be flanged as shown in Figure 37 to keep the link 597 in operative alignment therewith. It will be seen that normally the springs 598 are active through the links 597 upon the lower and upper restoring rods 25 for the type-bars to counteract the aggregate tension of the stressed springs 61, 78. The counteracting force being applied to both the lower and upper universal bars 25, it follows that the strain on the long type bars 10 and their extensions is taken up at two points and reduces the tendency of these bars to flex and bind.

The force of the springs 598 remains active upon the type-bar restoring rods 25 during the initial part of the cycle, but substantially long enough only until the type-bars 10 have risen the equivalent of one unit space, that is until the register wheel driving racks 54, 55, 68 and 71 have assumed their normal lower positions on the type-bars as facilitated by the openings 60. This is illustrated in Figure 39 in which the type-bar 10 and extension 10a have risen the equivalent of about one unit space, and in which the face 608 of the spring load shifters 597 at the next moment will become positioned to the rear of the rollers 596 due to the action of the cams 606 on the rollers 607. As this takes place a more forwardly disposed face 617 on each of the links 597 will come to rest on the rest-roller 611, as seen in Figure 40, and during the remainder of the cycle, except the very last portion thereof, the rollers 596 will ride upwardly in front of the face 608 into a bight 612, the links 597 remaining stationary, and the rollers 607 thereon being in idle contact with a dwell 613 provided at the rear end of the arm. It will be seen that while the spring-load shifters or links 597 are resting upon the rollers 611, the springs 598 are totally idle and in no manner place any load upon the cycling mechanism. This condition prevails until the parts during the return stroke of the cycle near again the position seen in Figure 39. As the cycle progresses still further, the links 597 are forced forwardly under the control of the cams 606 and cause the forward ends of the faces 608 to ride onto the rollers 596 and lift the links 597 off the rest rollers 611 and finally place the recessed portions thereof thereover. This throws the tension of the springs 598 onto the rollers 596 associated with the type-bar restoring mechanism. The latter happenings can be clearly perceived from Figure 39. The work done in shifting the spring tension from the roller 611 to the roller 596 is very little in that the springs 598 in this operation are extended only a little, they having been extended during the very initial phase of the cycle partly by the power of the carry-over springs 61 and 76. In fact, it is apparent that the forces of the springs 598, in being shifted or transplanted onto the rollers 596, assist in turn the restoration of the parts including the type-bars, and the energy lost is merely that which is lost in friction to effect the shift. Preferably the combined power of the two springs 598 is less than the aggregate power of the springs 61, 76, and to assure completion of the cycles, the crank arms 26 of the cycling mechanism, are under the influence of a strong spring 615, see Figures 37 and 41, so oppositely connected to an arm 618 fast on the main rock-shaft 27, and a point on the frame work of the machine, that its force will be thrown over center with respect to the shaft 27, to assist and oppose movement of the crank arms 26 in each case as they respectively move to and from their oppositely rocked positions. It will be observed that the springs 598 are distended during the first part of each cycle and remain so distended for nearly the remainder of the cycle without exerting any load whatever on the cycling mechanism. As the cycle approaches home position, the power of the springs 598 is automatically applied again to counteract the power of the carry-over springs, and the springs 598 will contract until the type-bars have moved fully to their home positions. In other words the energy stored in the springs 598 while counteracting the carryover springs in the initial phase of the cycle, is available and expended to help drive home the parts during the last phase of the cycle.

25. *Rebound prevention of differentially movable elements*

It has been stated that the differentially movable type-bars 10, 11 and 12, are capable of movement to different digit or character representing positions under the tension of the lifting springs 22, during machine cycles and in accordance with stopping conditions preparatorily set up in a field of stop pins 21. Inasmuch as present-day business machines are required to operate at great speed, the differentially movable bars 10, 11 and 12, have a tendency to rebound as their associated rods 45 encounter the stop pins 21. This is not only bad from the standpoint of vibration, noise and strain to the parts, but in practice has occasionally caused the type-bars to assume improper positions at the printing and register-engaging phase of the cycle. In this connection it must be understood that the type-bar aligner blades 46 just prior to the printing phase of the cycle will enter whatever notch 47 of any type-bar may be posed behind it. Should any type-bar, due to rebounding, have not found its proper position, it will be evident that the aligner blade 46 is liable to enter the wrong notch 47, so that an erroneous character may be printed, and so that faulty computations may be also the result. Chances for improper positioning of the differentially movable type-bars, due to rebounding, as above stated, are of course particularly prevalent when any type-bar rises to the highest position and there is relatively little time for the type-bars to come to rest.

Referring now particularly again to Figures 37 to 40, inclusive, the above deficiency is reliably cured by the provision of a series of resiliently active cam-arms 619, one being provided for each type-bar and being associated with a roller 620 on the type-bar lifter lever 23. These cam-arms 619 are instrumental to exert an impositive, rebound-counteracting force on their associated type-bars when each type-bar arrives in its appropriate raised position determined by a stop pin 21. Said cam-arms 619 are carried upon a common rod 621 which extends intermediate the two spaced lever arms 599 that are integral with the bail-rod-supporting-arms 36. Spacing collars on the rod, not shown, appropriately locate the individual cam-arms in operative alignment with their rollers 620. Said cam-arms 619 are pivotally loose on said rod 621 and, as viewed in Figures 37 to 40, inclusive, are constantly urged clockwise by springs 622 having anchorage on a common rod 623 extending between the arms 599. Short tails 624 of the cam-arms 619 bear normally against the underside of the rollers 620 under the tension of the springs 622, it being noted, however, that these tails have no moving tendency upon the rollers. In the normal state of the machine, as shown in Figure 37, short cam-shoulders 625 reach upwardly from the tails behind the rollers 620, each such cam-shoulder 625 continuing in a rearwardly extending dwell face 626.

During each machine cycle as the type-bars are being allowed to rise by the lifting of the bail rods 25, and so long as the type-bars do not become arrested, the cam-arms 619, with their shoulders 625 behind the rollers 620 follow in their normally existing relations. However, as viewed in Figure 38, just as soon as each type-bar is arrested under control of one of the stop pins 21, the cam-shoulders 625, due to continued upward motion of the lower bail-rod 25, will contact the roller 620 and will wipe downwardly therealong to suppress type-bar rebounding, the rebound suppressing action of each shoulder 625 persisting transitorily until the cam-arm 619 is sufficiently depressed for the roller to ride along the dwell 626. The dwell is then concentric with the axis of the pivot rod 38. The cam-shoulders 625 have an angle of attack on the rollers 620 to afford sufficient resistance against rebounding action of the type-bars, but to yield readily under the superior power of the cycling mechanism. After each type-bar is arrested and rebounding has been overcome, the roller 620 rides along the dwell 626 to whatever degree this is prescribed by the particular extent of rise of the type-bar. It will be noted from Figure 37 that the cam faces 625 are normally slightly spaced from the rollers 620. This is to eliminate the need for accuracy of manufacture but the space is under no circumstances large enough to permit entrance of the aligner blade 46 into a wrong notch 47.

26. Conclusion

Although the various portions of the invention illustrated and described, when embodied in one machine complement each other in many respects to enhance the usefulness and efficiency of the machine, it is to be understood that these portions are capable of beneficial embodiment, singly, or in any combination that may be desirable, and in many different kinds and types of business machines. The invention, moreover, is susceptible of modification and change, and comprehends other constructions and details without departing from the substance or spirit of the invention.

What is claimed is:

1. In a business machine the combination of a platen, typing means operable to rise above a typing line at the front of the platen, feed-roll means associated with the platen, means mounting said platen and feed-roll means for relative movement, to provide an openable and closeable front-feed throat for receiving and holding work-sheets, front-feed guiding means normally clear of the operating range of the typing means, but displaceable thereinto to facilitate introduction of work-sheets into the opened front-feed throat, apparatus, to move said platen and feed-roll means relatively to open said throat, and in association therewith also to displace said front-feed guiding means, and means to effect a partial throat opening movement of the feed-roll means relative to the platen without displacing the front-feed guiding means into the operating range of the typing means whereby front-fed work-sheets are freely removable.

2. In a business machine the combination with a carriage adapted to traverse a frame, of a platen on the carriage, typing means operable to rise above a typing line at the front of the platen, feed-roll means associated with the platen, means mounting said platen and feed-roll means for relative movement, to provide an openable and closeable front-feed throat for receiving and holding work-sheets, front-feed guiding means normally clear of the operating range of the typing means, but displaceable thereinto to facilitate introduction of work-sheets into the opened front-feed throat, apparatus, to move said platen and feed-roll means relatively to open said throat, and in association therewith also to displace said front-feed guiding means, and carriage-controlled means to effect a partial throat opening movement of the feed-roll means relative to the platen without displacing the front-feed guiding means into the operating range of the typing means whereby front-fed work-sheets are freely removable.

3. In a machine having a cylindrical platen, typing means operable to rise above a typing line at the front side of the platen to type on said line, and a carriage supporting said platen for movement of different platen portions opposite said typing means, work sheet clamping means normally cooperative with the platen below and to the rear of said typing line and relatively separable therefrom to provide a wide-open front-feed throat, a table mounted for displacement into and out of obstructing range with said typing means, said table when in obstructing range facilitating work-sheet presentation into the wide-open front-feed throat, said table having capacity for a partial displacement without getting into obstructive range with said types, means to separate said platen and clamping means to open said front-feed throat widely and concomitantly to move said table to said front-feed position, and means to displace said table only to said partial extent and to separate in association therewith, at least partially, said platen and clamping means, the relative positions of the platen, the table and the clamping means, upon operation of said partial displacing means being such that a front-fed work sheet may be conveniently removed during an operation of the typing means while the carriage is not in position for typing on such sheet.

4. In a machine having a cylindrical platen, and typing means operable to rise above a typing line at the front side of the platen to type on said line; work-sheet clamping means normally cooperative with the platen below and to the rear of said typing line and relatively separable therefrom to provide a wide open front-feed throat, a table mounted for displacement into and out of obstructing range with said typing means, said table when in obstructing range facilitating presentation of work-sheets in laterally neighboring positions into wide-open front-feed throat, said table having capacity for a partial extent displacement without getting into obstructive range wih said types, means to separate said platen and clamping means, to open said front-feed throat widely, and concomitantly to move said table to front-feed position, means to displace said table to said partial extent and to separate to a partial extent said platen and clamping means, and means to render said clamping means cooperative with the platen and to move said table out of obstructing range with said typing means, the relative positions of the platen, the table and the clamping means, upon operation of said partial displacing means being such that the front-fed work-sheets retain their correct typing positions due to tension of the sheets against the platen at the typing line, but are readily removable independently of each other against moderate resistance.

5. In a business machine having a frame, and a carriage adapted to traverse said frame; a front-feed mechanism on said carriage, means to power-operate said front-feed mechanism to a fully open position by power derived independently of carriage travel, and means comprising means oppositely on the carriage and the frame co-acting to effect a partial opening of the front-feed mechanism by motion supplied by the carriage in travelling through a certain zone.

6. In a business machine having a normally quiescent machine-cycling means and means to institute machine cycles, a frame, a carriage adapted to traverse said frame, front-feed means on the carriage normally holding a work-sheet, means conditioned under carriage control so as to respond in a certain position of the carriage to the machine-cycling means at a late phase of the cycle to move said front-feed means to an open position, and means to move said front-feed means automatically from said closed to an open position and vice-versa respectively responsive to mere travel of the carriage into and out of a certain position or zone, and independently of the machine-cycling means.

7. In a business machine having a normally quiescent machine-cycling means and means to institute machine cycles, a frame, a carriage adapted to traverse said frame, front-feed means on the carriage normally holding a work-sheet, means conditioned under carriage control so as to respond in a certain position of the carriage to the machine-cycling means at a late phase of the cycle to move said front-feed means to a fully open position, and means including an element on the carriage operable by engagement with an element on the frame as the carriage travels to a certain other position, and thereby to supply a partial opening movement to said front-feed means independently of the machine-cycling means.

8. In a business machine having a normally quiescent machine-cycling means and means to institute machine cycles, a frame, a carriage adapted to traverse said frame, operable front-feed means on the carraige normally holding a work-sheet, and operating means for the front-feed means comprising, means conditioned under carriage control to respond to the machine-cycling means in particular carriage positions respectively at an early and a late cycle-phase to move said front-feed means from an open to closed position and vice-versa, and means to move said front-feed means from said closed to an open position and vice-versa respectively responsive to mere travel of the carriage into and out of a certain zone.

9. In a business machine having a frame and a carriage adapted to traverse said frame; a front-feed mechanism on the carriage, a bar extending lengthwise of the carriage and displaceable thereon transversely thereof to move said front-feed mechanism either to a fully or a partially open position, frame-supported power means associated with said bar for operating the front-feed mechanism to one of said positions by power derived independently of carriage travel, and means comprising cam-means oppositely on said bar and said frame co-acting to effect opening of the front-feed mechanism to the said other position by movement supplied by travel of the carriage through a certain zone, and independently of said power means.

10. In a business machine having a frame, and a carriage adapted to traverse said frame, a front-feed mechanism on said carriage, means to power-operate said front-feed mechanism to a fully open position by power derived independently of carriage travel, said front-feed mechanism being then conditioned for front-feeding work-sheets thereto, means urging said front-feed mechanism to restore, means to detain releasably the front-feed mechanism upon its being operated to said fully open position, but not if it is operated only partially, and means comprising cam-means oppositely on the carriage and the frame coacting to effect a partial opening of the front-feed mechanism by movement of the carriage through a certain zone, whereby front-fed work-sheets are then freely removable, said cam-means allowing closure of the front-feed mechanism by said urging means by further carriage movement.

11. The combination in a business machine, of a front-feed table mounted for displacement from an out-of-way to a front-feed position, of means to restrict displacement of the table to a partial extent if displacement is effected by force applied directly to the table, means to displace the table to no more than said partial extent, and means to incapacitate said restricting means and displace said table fully to front-feed position.

12. The combination in a business machine having machine cycling means, and typing means operable by the cycling means before a late phase of the cycle; of a front-feed table mounted for displacement from an out-of-way position of said typing means to a front-feed position in which it is in conflicting range of the typing means, said table having capacity for a partial displacement without getting into conflicting range of the typing means, and a control mechanism for said table, including, means adapted to respond to the cycling means during said late cycle-phase to displace said front-feed table to said front-feed position, means to effect a partial displacement of said table short of bringing it into conflicting range of the typing means, and including also means operative when said table is displaced by manual force applied directly thereto to restrict such displacement to an extent short of bringing the table into conflicting range of the typing means, said table when partially displaced facilitating work-sheet removal.

13. In a business machine having a frame and having a carriage movable across said frame to different positions; releasable paper-holding means on said carriage, normally idle power-means on the frame, means to activate said power-means, said power-means, when activated, being normally incapable of releasing said paper-holding means, means to provide an operative connection between said power-means and said paper-holding means under carriage control, whereby the paper-holding means is releasable by activation of said power-means under supplemental control of the carriage and the means for activating said power-means, and means including means oppositely on the frame and the carriage cooperative to effect a partial release of said paper-holding means by action of mere travel of the carriage into a certain zone, and independently of said power-means.

14. In a business machine having a frame and having a carriage movable across said frame to different positions; releasable paper-holding means on said carriage, normally idle power-means on the frame, means to activate said power-means, said power-means, when activated, being normally incapable of releasing said paper-holding means, means to provide an operative connection between said power-means and said paper-holding means under carriage control, whereby the paper-holding means is releasable by activation of said power-means under supplemental control of the carriage and the means for activating said power-means, and means including means oppositely on the frame and the carriage cooperative to effect a release of said paper-holding means by action of mere travel of the carriage into a certain zone and independently of said power-means.

15. In a business machine having a frame and having a carriage movable across said frame to different positions; releasable paper-holding means on said carriage, power-means, including a member on said frame power-operable transversely of the direction of carriage movement to release said paper-holding means, and means comprising cam-means oppositely on the frame and the carriage, the former stationary on the frame, cooperative to release partially said paper-holding means by the moving power of the carriage in bringing it into a certain zone.

16. In a business machine having a frame and having a carriage movable across said frame to different positions; releasable paper-holding means on said carriage, normally idle machine cycling means on the frame, cycle-instituting means, means oppositely on the frame and the carriage operative under positional control of the carriage to provide an operative connection from said cycling means to said paper-holding means for releasing the latter by machine cycling action, and means including cam-means oppositely on the carriage and the frame cooperative to release said paper-holding means partially by motion supplied by the carriage in travelling into a certain zone and independently of machine cycling power.

17. In a business machine having a frame and having a carriage movable across said frame to different positions; releasable paper-holding means on said carriage, normally idle machine cycling means on the frame, cycle-instituting means, means oppositely on the frame and the carriage operative under positional control of the carriage to provide an operative connection from said cycling means to said paper-holding means for releasing the latter by machine cycling action, and means oppositely on the carriage and the frame cooperative to release said paper-holding means partially by motion supplied by travel of the carriage into a certain zone and independently of machine cycling action or power.

18. In a business machine having a frame and having a carriage movable across said frame to different positions; a releasable paper-holding device on said carriage, normally idle machine cycling means on said frame, cycle-instituting means, means actuatable by said cycling means to release said device and comprising, coupling means capable of effective and ineffective conditioning, and a bar and an element oppositely on the frame and said carriage, one capable of operation by the other in any position of the carriage, means including means on said bar to exercise such control over the condition of said coupling means that action of the actuatable means on said paper-holding device during each machine cycle is subject to carriage control, other means on said bar, and means including means cooperative with said other means, incident to travel of the carriage through a certain zone, to cause partial release of said paper-holding device.

19. In a business machine having a frame-member and having a carriage-member adapted to be moved to different positions on the frame-member; a releasable paper-holding device on one of said members, means to release and means to restore said paper-holding device, each of said means comprising an individual carriage-member-carried control element to predetermine any position of the carriage-member in which either means may be rendered active, and means including means oppositely on said members to effect partial release of said paper-holding device under carriage control.

20. In a business machine having a carriage-member movable to different positions on a frame-member, paper-holding means on one of said members movable from applied to released position, and biased from one towards the other position, means to detain said paper-holding means automatically in open position upon movement thereto, and means to release said detaining means subject to carriage-member control, camming-means oppositely on said members, cooperating incident to travel of the carriage through a certain zone to move the paper-holding means to a partially open position without said detaining means taking a hold, said paper-holding means returning to applied position automatically under control of said camming-means as the camming-means move out of cooperation during further carriage travel.

21. In a business machine having a frame and having a carriage adapted to traverse said frame, releasable paper-holding means on said carriage, a bar extending parallel to the traverse of the carriage and being mounted on the latter for actuation transversely of said traverse, means to release said paper-holding means as a result of the actuation of said bar, a part on said frame movable into and out of cooperative association with said bar, and operable when associated therewith to actuate said bar, means including control means on said bar, to move said part into and out of cooperative association with said bar by reason of positional changes of the carriage, power-means to operate said part, cam-means carried on said bar, and means on said frame engageable by the cam-means incident to travel of the carriage through a certain zone to cause partial actuation of said bar, thereby to release partially said paper-holding means.

22. In a business machine having a frame and having a carriage adapted to traverse said frame, releasable paper-holding means on said carriage biased to paper-holding position, a bar extending parallel to the traverse of the carriage and being mounted on the latter for actuation transversely of said traverse, means to release said paper-holding means, and hold it released, as a result of the actuation of said bar, a part on said frame movable into and out of cooperative association with said bar, and operable when associated therewith to actuate said bar, means including control means on said bar, to move said part into and out of cooperative association with said bar by reason of positional changes of the carriage, power-means to operate said part, cam-means carried on said bar, and means on said frame engageable by the cam-means incident to travel of the carriage through a certain zone to cause partial actuation of said bar, thereby to release partially said paper-holding means, said paper-holding means returning to paper-holding position automatically as the cam-means moves out of range with the engageable means during further carriage travel.

WALTER A. ANDERSON.

REFERENCES CITED

The following references are of record in the file of this patent:

UNITED STATES PATENTS

| Number | Name | Date |
|---|---|---|
| 865,892 | Hess | Sept. 10, 1907 |
| 1,153,820 | Patten | Sept. 14, 1915 |
| 1,207,630 | Roebuck | Dec. 5, 1916 |
| 1,549,101 | Wales | Aug. 11, 1925 |
| 1,992,940 | Foothorap | Mar. 5, 1935 |
| 2,034,345 | Kottmann | Mar. 17, 1936 |
| 2,138,482 | Davidson | Nov. 29, 1938 |
| 2,202,595 | Muller | May 28, 1940 |
| 2,202,596 | Muller | May 28, 1940 |
| 2,236,589 | Anderson | Apr. 1, 1941 |
| 2,236,608 | Pitman | Apr. 1, 1941 |
| 2,357,571 | Anderson | Sept. 5, 1944 |
| 2,393,441 | Yaeger | Jan. 22, 1946 |